(12) United States Patent
Hirai

(10) Patent No.: US 7,596,071 B2
(45) Date of Patent: *Sep. 29, 2009

(54) OBJECTIVE LENS, OPTICAL PICKUP, AND OPTICAL INFORMATION PROCESSING APPARATUS USING THE SAME

(75) Inventor: Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/798,908

(22) Filed: May 17, 2007

(65) Prior Publication Data
US 2007/0223350 A1    Sep. 27, 2007

Related U.S. Application Data

(62) Division of application No. 10/875,304, filed on Jun. 25, 2004, now Pat. No. 7,313,074.

(30) Foreign Application Priority Data

Jun. 30, 2003 (JP) ............................. 2003-187423
Jul. 1, 2003 (JP) ............................. 2003-189462

(51) Int. Cl.
*G11B 7/135* (2006.01)

(52) U.S. Cl. ................................. 369/112.23

(58) Field of Classification Search ........................ None
See application file for complete search history.

(56) References Cited

U.S. PATENT DOCUMENTS 5,105,408 A    4/1992    Lee et al.

(Continued)

FOREIGN PATENT DOCUMENTS

EP    1022731 A2    7/2000

(Continued)

OTHER PUBLICATIONS

"Blue/DVD/CD Compatible Optical Head with three wavelengths and a wavelength selective filter" by Ryuichi Katayama et al., ISOM 2001, pp. 30-31.

(Continued)

*Primary Examiner*—Andrea L Wellington
*Assistant Examiner*—Nathan Danielsen
(74) *Attorney, Agent, or Firm*—Dickstein Shapiro LLP

(57) ABSTRACT

An optical pickup includes a first optical source producing a first optical beam having a wavelength λ1, a second optical source producing a second optical beam having a wavelength λ2 (λ1<2), and a single objective lens focusing any of the first and second optical beams to an optical recording medium, the first optical beam is incident to the objective lens as a parallel beam and the second optical beam is incident to the objective lens as a divergent optical, wherein an aperture is provided at a front side of the objective lens with offset from a principal point at the front side by a distance t given by an equation $$t = L - NA1 \cdot f / \tan(a\sin(NA2obj)),$$

wherein f represents a focal distance of the objective lens, NA1 represents the numerical aperture at the side of the image surface when the first optical source is turned on, NA2obj represents the numerical aperture at the front side when the second optical source is turned on, and L represents the object distance at the time when the second optical source is turned on.

3 Claims, 43 Drawing Sheets

U.S. PATENT DOCUMENTS

| | | |
|---|---|---|
| 6,515,955 B2 | 2/2003 | Takeuchi |
| 6,545,958 B1 | 4/2003 | Hirai et al. |
| 6,646,817 B2 | 11/2003 | Katsuma |
| 6,650,612 B1 | 11/2003 | Matsuzaki et al. |
| 6,667,943 B1 | 12/2003 | Maruyama et al. |
| 6,781,764 B1 | 8/2004 | Takeuchi et al. |
| 6,870,805 B1 | 3/2005 | Arai et al. |
| 7,075,880 B2 | 7/2006 | Honda et al. |
| 7,120,109 B1 | 10/2006 | Kim et al. |
| 2002/0093902 A1 | 7/2002 | Hirai et al. |
| 2002/0191502 A1 | 12/2002 | Hirai |
| 2003/0072247 A1 | 4/2003 | Hirai |
| 2003/0151999 A1 | 8/2003 | Hirai et al. |
| 2003/0185134 A1* | 10/2003 | Kimura et al. .......... 369/112.08 |
| 2003/0227859 A1 | 12/2003 | Hirai |
| 2004/0257958 A1 | 12/2004 | Kimura et al. |

FOREIGN PATENT DOCUMENTS

| | | |
|---|---|---|
| EP | 1 258 871 A2 | 11/2002 |
| EP | 1 341 165 A2 | 9/2003 |
| JP | 7-57589 | 3/1995 |
| JP | 8-55363 | 2/1996 |
| JP | 9-54977 | 2/1997 |
| JP | 9-73654 | 3/1997 |
| JP | 2000187870 | 7/2000 |
| JP | 2000-348376 | 12/2000 |
| JP | 2001-006203 | 1/2001 |
| JP | 2001-043559 | 2/2001 |
| JP | 2001-84632 | 3/2001 |
| JP | 2001-176109 | 6/2001 |
| JP | 2001-209966 | 8/2001 |
| JP | 2001-216676 | 8/2001 |
| JP | 2002-6210 | 1/2002 |
| JP | 2002-107617 | 4/2002 |
| JP | 2003-36559 | 2/2003 |
| JP | 2003-067972 | 3/2003 |
| JP | 2003-156681 | 5/2003 |
| JP | 2003-177312 | 6/2003 |

OTHER PUBLICATIONS

"Introduction to Diffraction Optical Elements", Optical Design Study Group. Optical Society of Japan (ed)., The Physical Society of Japan, pp. 118-121.

Katayama, et al., "Dual Wavelength Optical Head for 0.6 mm and 1.2 mm Substrate Thicknesses," Japanese Journal of Applied Physics, Tokyo, JP, vol. 36, part 1, No. 1B, 1997, pp. 460-466.

Katayama, et al., "Dual-Wavelength Optical Head With a Wavelength-Selective Filter for 0.6- and 1.2-mm-Thick-Substrate Optical Disks," Applied Optics, OSA, Optical Society of America, Washington, D.C., US, vol. 38, No. 17, Jun. 10, 1999, pp. 3778-3786.

* cited by examiner

INFINITE, NO PHASE COMPENSATION

INFINITE, NO PHASE COMPENSATION

FINITE, NO PHASE COMPENSATION

FINITE, WITH PHASE COMPENSATION

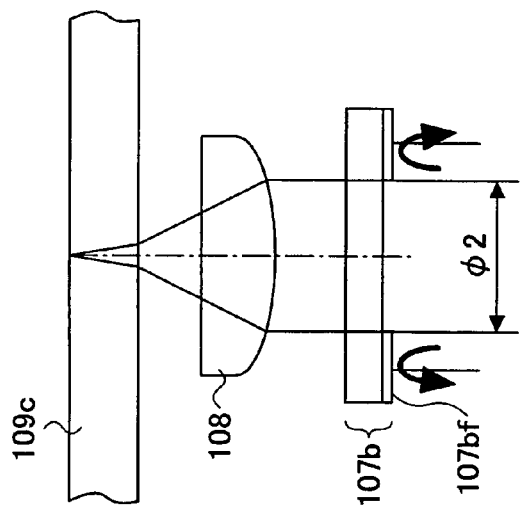
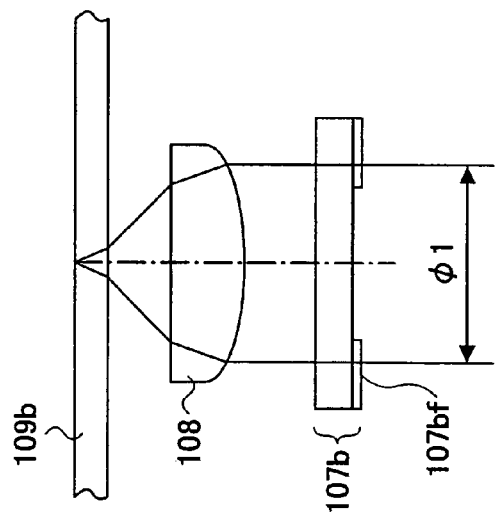
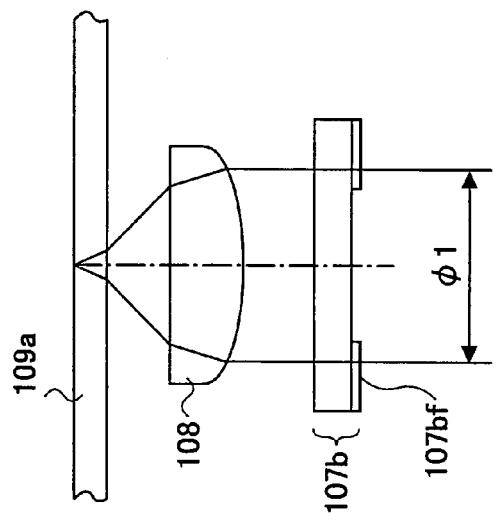

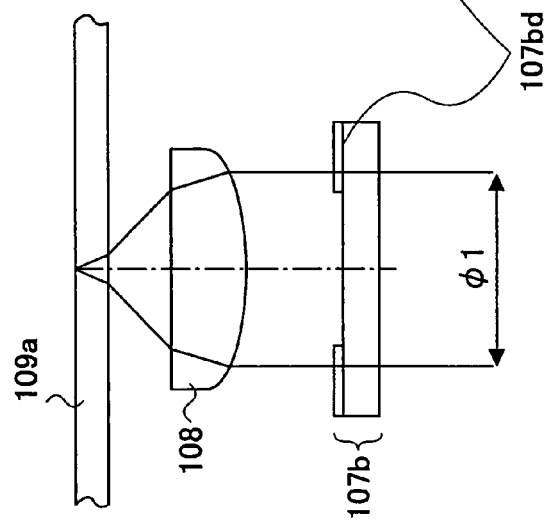
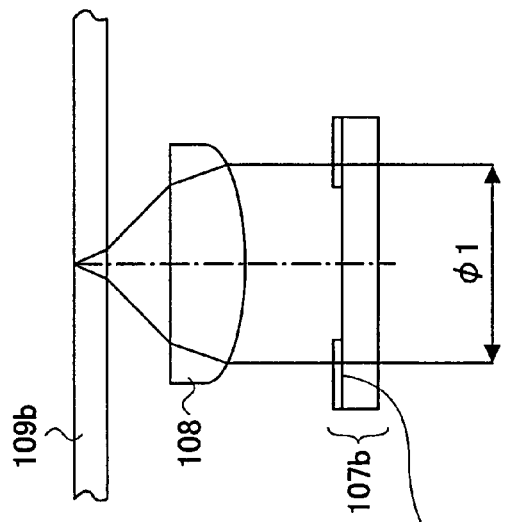
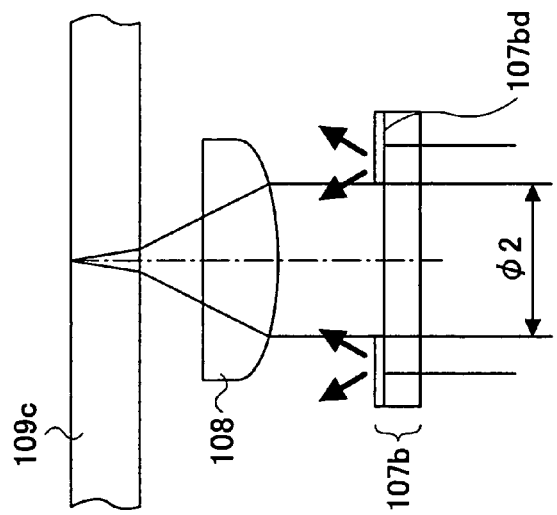

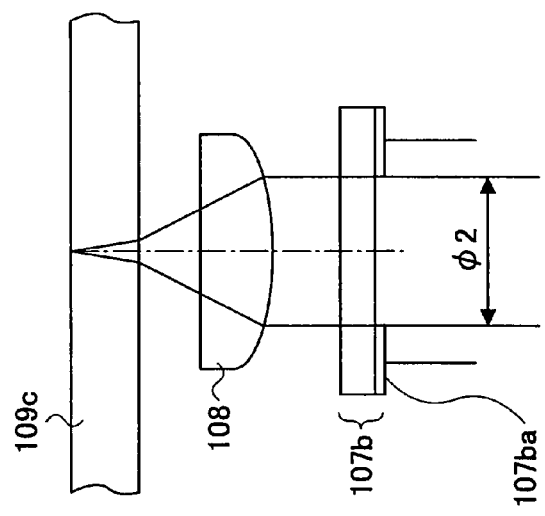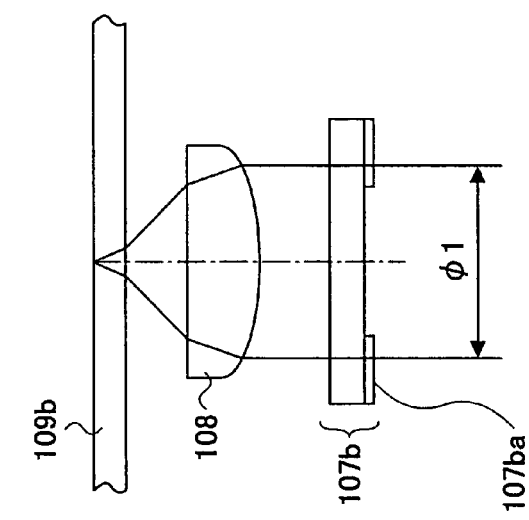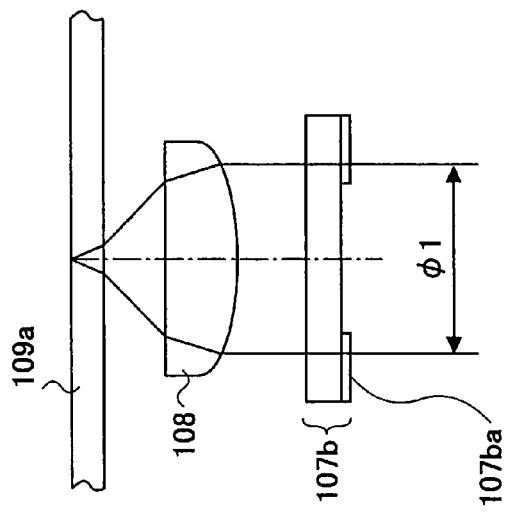

OBJECTIVE LENS, OPTICAL PICKUP, AND OPTICAL INFORMATION PROCESSING APPARATUS USING THE SAME

CROSS-REFERENCE TO RELATED APPLICATIONS

This application is a divisional of U.S. patent application Ser. No. 10/875,304, filed on Jun. 25, 2004 now U.S. Pat No. 7,313,074, the subject matter of which is incorporated in its entirety by reference herein.

BACKGROUND OF THE INVENTION

The present invention generally relates to optical information professing and more particularly to an objective lens and an optical pickup for conducting at least one of information recording, information playback and erasing of information to optical media designed for blue wavelength band, red wavelength band or infrared wavelength band, as well as the information processing apparatus that uses the same.

For the means for saving video information, audio information or data in a computer, the use of optical recording media such as a CD having a recording capacity of 0.65 GB, or a DVD having a recording capacity of 4.7 GB, is spreading. In these days, there is an acute demand for further improvement of recording density for more recording capacity.

In order to increase the recording density in such an optical recoding medium, it is necessary to increase the numerical aperture (NA) value of the objective lens or reduce the wavelength of the optical sources the optical pickup used for writing or reading information to and from the optical recording medium, such that the size of the beam spot formed on the optical recording medium by the objective lens is reduced.

In the case of the optical recording medium called CD, a numerical aperture of 0.40-0.50 is used for the objective lens and a wavelength of about 785 nm is used for the optical source. In the case of the recording medium called DVD, in which the recording density is increased over the CD, a numerical aperture of 0.60-0.65 is used together with the wavelength of the optical source of about 660 nm.

As noted before, there is a keen demand for improvement of recording density and increase of recording capacity in the optical recording medium in these days, and thus, there is a desire to increase the numerical aperture of the objective lens beyond the conventional value of 0.65 and/or to decrease the wavelength of the optical source to less than 660 nm.

Thus, there appears a situation in which a new specification of higher numerical aperture value or shorter wavelength appears every year for the optical pickup, while the users of the optical information processing apparatus maintain CDs and DVDs of conventional specification. Because of this, there is arising a demand that such conventional optical recording media can be processed also in the optical information processing apparatus designed for such novel optical recording media of novel specification.

While such compatibility between different specifications can be achieved by providing a conventional optical pickup in addition to the optical pickup designed according to the new specification, such a construction is contradictory to the requirement of downsizing and cost reduction.

It is preferable to provide a construction shown in FIG. 1A in which a blue optical source 100 and a DVD optical source 200 use a single objective lens 104 that focuses the exit beams of the respective optical sources to an optical recording medium 103, such that the optical pickup, designed for a large-capacity (blue) optical recording medium by using the optical source 100 of the blue wavelength band, is still compatible with the conventional CDs or DVDs. Alternatively, it is preferable to provide a construction shown in FIG. 1B in which a blue optical source 100, a DVD optical source 200 and a CD optical source 300 cooperate with the single objective lens 2 that focuses the exit beams of the respective optical sources to the optical recording medium 1.

On the other hand, in order to focus the optical beams to the optical media designed for various different specifications such as blue color systems, DVDs or CDs, there arise various problems in relation to the difference in the wavelength/substrate thickness of the optical recording medium 103 as will be explained hereinafter.

Japanese Laid-Open Patent Publication 2002-107617 describes the problem of aberration (see FIG. 3) arising in the case an objective lens 110 of FIG. 2 designed of the optical source wavelength of 405 nm is used in the wavelength range of 400-800 nm. In FIG. 2, the reference numeral 111 shows an optical recording medium.

As will be explained below, it is generally required that the wavefront aberration should be 0.02 λrms or less. On the other hand, FIG. 3 shows that there appears an aberration of 0.10 λrms or more at the wavelength of 660 nm or 785 nm used with a DVD system or CD system. In view of this situation, the foregoing Japanese Laid-Open Patent Publication 2002-107617 proposes the use of a compound lens for the objective lens. However, the use of such a compound lens raises the problems in that it requires a bonding process at the time of manufacturing of the objective lens and there arises the problem of increase of weight associated with the construction that uses two lenses.

As an alternative, there is a proposal in ISOM2001 Abstract, "BLUE/DVD/CD COMPATIBLE OPTICAL HEAD WITH THREE WAVELENGTHS AND A WAVELENGTH SELECTIVE FILTER", or in Japanese Laid-Open Patent Application 2003-67972 to construct the respective optical paths of DVD or CD by a finite optical system in view of the fact that there occurs a spherical aberration in the event an optical beam is focused to the optical recording medium of DVD or CD by the objective lens designed for a blue optical beam. In this proposal, there is further provided a phase compensation element such that the phase distribution is changed for the optical beam of DVD or CD while not causing any change of phase distribution for the blue optical beam of the blue wavelength band. By using a finite optical system, in which the incident optical beam to the objective lens is made divergent, an effect of reducing the spherical aberration is achieved. However, there still remains some spherical aberration, and compensation of this residual spherical aberration is achieved by inducing a spherical aberration of opposite phase by the phase compensating element.

For example, in the case of using a single objective lens, which is designed for minimizing the wavefront aberration when it is used with an infinite optical system (a parallel beam is incident to the objective lens) and with a blue optical recording medium ($\lambda 1$=407 nm, NA($\lambda 1$)=0.67, substrate thickness t1=0.6 mm), for focusing a beam spot on a DVD recording medium ($\lambda 2$=660 nm, NA($\lambda 2$)=0.65, substrate thickness t2=0.6 mm), there arises a spherical aberration shown in FIG. 12B due to the difference in the wavelength.

Such a problem was also noticed in the DVD/CD compatible optical pickup. Thus, in the case of using a single objective lens, which is designed for minimizing the wavefront aberration when it is used with an infinite optical system (a parallel beam is incident to the objective lens) and with a DVD recording medium ($\lambda 2$=660 nm, NA($\lambda 2$)=0.65, substrate thickness t2=0.6 mm), for focusing a beam spot on a CD recording medium (λ3=780 nm, NA(λ3)=0.50, substrate thickness t3=1.3 mm), there arises a similar spherical aberration shown due to the difference in the wavelength.

In order to attend to this problem, Japanese Patent 2,725, 653 or Japanese Laid-Open Patent Application 10-334504 teaches the construction in which there are provided two laser diodes of different wavelengths and a phase compensating element having wavelength selectivity, such that recording or playback is conducted for a DVD optical recording medium having the thickness of 0.6 mm by using a beam of 660 nm wavelength emitted from one of the laser diodes and carries out recording or playback for a CD optical recording medium having a thickness of 1.2 mm by using the beam of 780 nm wavelength emitted from the other laser diode. Thereby, the phase compensating element having the wavelength selectivity causes no change of phase distribution for the optical beam of the 660 nm wavelength, while the phase compensating element causes a phase distribution change for the optical beam of the 780 nm wavelength in such a manner that the spherical aberration caused by the difference in the thickness of the substrate is successfully compensated for.

As an alternative, there is generally known the means of compensating for the spherical aberration caused by difference in the thickness or wavelength between the DVD optical recording medium and the CD optical recording medium, by using an infinite optical system when the optical beam of the 660 nm wavelength for DVD is incident to the objective lens and by using a finite optical system (a state in which a divergent beam enters into the objective lens in the form of a divergent beam) for the case the optical beam for CD is incident to the objective lens.

Particularly, the ISOM2001 Abstract, op. cit., proposes the method of recording or playing back information to or from any of the three optical recording media of blue optical recording medium, DVD optical recording medium and CD optical recording medium while using a single objective lens. According to the teaching of this prior art, there is provided a system including three different laser diodes of the wavelengths of 405 nm, 650 nm and 780 nm and a wavelength-selective phase compensating element having wavelength selectivity, such that optical irradiation is made to a blue optical recording medium having a thickness of 0.1 mm with the wavelength of 405 nm by using an infinite optical system, and an optical irradiation is made to a DVD optical recording medium having a thickness of 0.6 mm with the wavelength of 660 nm by using a finite optical system, and optical irradiation is made to a CD optical recording medium having a thickness of 1.2 mm with the wavelength of 780 nm by using a finite optical system. Thereby, the wavelength-selective phase plate does not change the phase distribution for the optical beam of the wavelength of 405 nm while it changes the phase distribution for the optical beams of 660 nm and 780 nm. In this construction, the wavelength-selective phase compensating means and the finite optical system used for the case of the DVD/CD recording media constitute the wavefront compensating means compensating for the spherical aberration caused by the difference in the thickness of the substrate.

In addition to the foregoing problem of aberration, there arises another problem in that the numerical aperture value changes between the optical recording media of different specifications.

Generally, the numerical aperture values NA of 0.60 and 0.65 are used respectively for the playback system and recording system of a DVD optical recording medium, while the numerical aperture values NA of 0.45 and 0.50 are used respectively for the play back system and recording system of a CD optical recording medium.

Most of the optical information processing apparatuses currently sold are capable of recording for both of DVD and CD, and it is preferable to use the numerical aperture value NA of 0.65 for DVD and the numerical aperture value NA of 0.50 for CD.

On the other hand, with regard to the blue optical recording technology, there is proposed the use of the numerical aperture value NA of 0.65 in relation to the HD-DVD technology.

This means that there is a need of switching the numerical aperture value in response to the optical recording medium used for recording and playback.

Thus, in order to achieve two-generation compatibility between DVD and CD, there is proposed a technology that uses an aperture switching element as disclosed in the Japanese Patent 3,240,846, Japanese Patent 2,713,257, Japanese Patent 2,725,653, and Japanese Patent 3,036,314. Further, in order to achieve two-generation compatibility between a large-capacity optical recording medium and DVD, there is proposed a technology that uses an aperture switching element as disclosed in the Japanese Laid-Open Patent Application 2001-216676.

Further, with regard to the technology that achieves three-generation compatibility, there is proposed the use of a three-step aperture switching element in Japanese Laid-Open Patent Application 2000-187870 and Japanese Laid-Open Patent Application 2003-67972.

With regard to such a conventional technology, the phase compensating element disclosed in the foregoing ISOM Abstract, op. cit, or Japanese Laid-Open Patent Application has to be driven integrally with the objective lens in view of the possibility of comma aberration when there is caused a displacement between the objective lens and the optical axis. With regard to the actuator that drives the objective lens in the focusing direction and the track direction, there is a demand of reducing the number of the parts in order to achieve weight reduction and reduction of the number of assembling steps. In order to suppress formation of comma aberration, there is a need for the adjustment of alignment between the objective lens and the phase compensating element.

Further, according to the method described in the foregoing ISOM Abstract, op. cit., no satisfactory wave front performance is obtained when to achieve the compatibility between the DVD optical recording medium and the CD optical recording medium.

Generally, the reference value of 0.07 λrms, known as Marshal criterion, is used as the wavefront aberration for the case of the diffraction limit. In the case of an optical pickup, on the other hand, there exist various factors that may become the cause of the error such as the thickness error of the optical recording medium, the tilt error of the optical recording medium, the defocus error caused by displacement between the optical recording medium and the objective lens. Thus, it is preferred that the wavelength aberration (median value) is suppressed to 0.03 λrms or less in the state there is caused no error, in view of the fact that there may be caused deterioration of the wavefront aberration as a result of buildup of these errors.

Contrary to this, it should be noted that the wavefront aberration (median value) becomes about 0.05 λrms for a DVD optical recording medium in the technology described in the foregoing ISOM Abstract, op. cit. in view of the situation that it is not possible to minimize the wavefront aberration for both of DVD and CD by using a single element. Because of this, it was inevitable to make the design to target the intermediate point of phase compensation condition when to minimize the aberration in both of DVD and CD, while such an approach could not reduce the aberration sufficiently.

The same applies also to the numerical aperture switching elements. In the case of the numerical aperture switching element, it is preferable that it is driven integrally with the objective lens in view of the fact that the desired numerical aperture value is no longer attained when the optical axis of the objective lens is offset.

Generally, a numerical aperture switching element is mounted on an actuator such that the numerical aperture switching element is driven integrally with an objective lens so that the change of the numerical aperture value is avoided. On the other hand, an actuator is also required to include smaller number of parts for weight reduction and reduction of the number of the assembling steps. Thus, it is desired that such a numerical aperture switching element is removed from the actuator. Particularly, the numerical aperture switching element designed for three-generation optical recording and playback so as to operate in three steps has a complex structure, and design and manufacture thereof becomes difficult. Further, in spit of its complex construction, such a three-step numerical aperture switching element cannot provide sufficient compensation with regard to the wavefront characteristics and transmission characteristics.

SUMMARY OF THE INVENTION

Accordingly, it is a general object of the present invention to provide an objective lens, an optical pickup and an optical information processing apparatus that uses the same wherein the foregoing problems are eliminated.

Another and more specific object of the present invention is to achieve a two-generation compatibility between optical recording technology of different generations such as the blue optical recording and the DVD, without providing an aperture switching element and is simultaneously capable of simplifying the assembling process and achieving weight reduction of the actuator or reduction of the number of parts of the actuator.

Another object of the present invention is to achieve a three-generation compatibility between the optical recording technology of three different generations such as the blue optical recording, DVD and CD, while using a two-step numerical aperture switching element and the conventional art of the aperture switching element.

Another object of the present invention is to provide an optical component and an optical system capable of providing sufficient compensation of spherical aberration that arises at the time of achieving compatibility between different generations of optical recording technology.

Another object of the present invention is to provide an objective lens and an optical pickup sufficiently suppressing spherical aberration between two generations of optical recording technology such as the blue optical recording technology and DVD technology, or between three generations of optical recording technology such as the blue optical recording technology, DVD technology and CD technology, without the need of providing an aberration compensating element.

Another object of the present invention is to provide an objective lens and an optical pickup capable of reducing the cost and also the number of manufacturing steps by decreasing the number of the parts used therein, without the need of providing an aberration compensating element and an aperture switching element.

According to a first aspect of the present invention, there is provided an optical pickup carrying out at least one of recording, playback and erasing of information to and from an optical recording medium, comprising:

a first optical source producing a first optical beam having a wavelength $\lambda 1$;

a second optical source producing a second optical beam having a wavelength $\lambda 2$ ($\lambda 1 < \lambda 2$);

a single objective lens focusing any of said first and second optical beams to an optical recording medium, said first optical beam being produced in response to turning-on of said first optical source and being incident to said objective lens in the state of a parallel beam via an infinite optical system, said second optical beam being produced in response to turning-on of said second optical source and being incident to said objective lens in the state of a divergent optical beam via a finite optical system, an aperture being provided at a front side of said objective lens opposite to said optical recording medium with offset from a principal point of said objective lens at said front side by a distance t given by an equation $$t = L - NA1 \cdot f \tan(a \sin(NA2obj)),$$

wherein f represents a focal distance of said objective lens, NA1 represents a numerical aperture at a side of image surface in the state when said first optical source is turned on, NA2obj represents a numerical aperture at said front side in the state when said second optical source is turned on, and L represents an object distance at the time when said second optical source is turned on.

According to the present invention, it becomes possible to achieve the two-generation compatibility between the optical recording technology of two, different generations, such as the blue optical recording technology and DVD.

According to a second aspect of the present invention, there is provided an optical pickup carrying out at least one of recording, playback and erasing of information with regard to an optical recording medium, comprising:

a first optical source producing a first optical beam having a wavelength $\lambda 1$;

a second optical source producing a second optical beam having a wavelength $\lambda 2$;

a third optical source producing a third optical beam having a wavelength $\lambda 3$ ($\lambda 1 < \lambda 2 < \lambda 3$); and a single objective lens focusing any one of said first through third optical beams upon an optical recording medium, said first optical beam being produced in response to activation of said first optical source and being incident to said objective lens in the form of a parallel beam via an infinite optical system, said second and third optical beams being produced respectively in response to activation of said second and third optical sources, said second and third optical beams being incident to said objective lens in the state of a divergent beam via a finite optical system, an aperture switching element providing an optical beam diameter $\phi 1$ when any of said first and second optical beam is injected therethrough to said objective lens and an optical beam diameter $\phi 2$ ($\phi 1 > \phi 2$) when said third optical beam is injected therethrough to said objective lens, said aperture switching element being provided at a front side of said objective lens opposite to a side of said optical recording medium from a principal point of said objective lens at said front side with a distance offset t given by an equation $$t = L - NA1 \cdot f \tan(a \sin(NA2obj)),$$

where f is a focal distance of said objective lens, NA1 is a numerical aperture value at the side of an image surface in the state when said first optical source is turned on, NA1obj is a numerical aperture value at the side of said optical source in the state when said second optical source is turned on, and L is an object distance for the state in which said second optical source is turned on.

According to the present invention, there is provided an optical pickup capable of achieving compatibility for optical recording technology of three generations such as blue optical recording technology, DVD and CD, while using a two-step numerical aperture switching element, not a three-step numerical aperture element.

According to a third aspect, there is provided an optical pickup according to said second aspect of the present invention, wherein said aperture switching element carries out said switching of optical beam diameter between $\phi 1$ and $\phi 2$ by way of any of reflection, diffraction or absorption, depending on the wavelength band or polarization direction. According to the third aspect, it becomes possible to provide an optical pickup capable of achieving compatibility for optical recording of three generations such as blue optical recording technology, DVD and CD while using a two-step numerical aperture switching element, not a three-step numerical aperture element.

According to a fourth aspect of the present invention, there is provided an optical pickup according to any of the first through third aspects noted above, wherein there is provided a correction element that provides a predetermined spherical aberration to said second optical beam upon turning on of said second optical source, wherein said correction element induces said spherical aberration with opposite phase at the time when said second optical beam is incident to said objective lens. Thereby, the spherical aberration caused with the optical beam upon irradiation of said optical recording medium is successfully compensated for.

According to a fifth aspect of the present invention, there is provided an optical pickup according to said fourth aspect, wherein said correction element has a concentric pattern in a surface perpendicular to an optical axis, said correction element further having a cross-sectional from taken in the direction parallel to said optical axis such that said cross-sectional form is optimized for a particular wavelength.

According to a sixth aspect of the present invention, there is provided an optical pickup according to said fourth aspect, wherein said correction element has a phase pattern concentric in a surface perpendicular to an optical axis, said correction element further having a stepped phase pattern in a cross-section taken in the direction parallel to said optical axis.

According to a seventh aspect of the present invention, there is provided an optical pickup according to said fourth aspect, wherein said correction element comprises a liquid crystal element inducing a phase change in an optical beam passing therethrough in response to application of a voltage such that there is inducted a spherical aberration of opposite polarity in said optical beam upon incidence to said objective lens.

According to the present invention as set forth in any of the fifth through seventh aspects of the present invention, it becomes possible to compensate for the spherical aberration caused when the optical beam hits the optical recording medium.

According to an eighth aspect of the present invention, there is provided an optical pickup according to any of said first through third aspects, wherein said objective lens is formed of one group/two element construction in which a concave lens and a convex lens are bonded with each other.

According to a ninth aspect of the present invention, there is provided an optical pickup according to any of said first through third aspects, wherein said objective lens has a construction in which there is formed a diffraction pattern or in the form of a stepwise phase pattern on any of an incident surface or exit surface of said objective lens.

According to any of the eighth aspect and ninth aspect of the present invention, it becomes possible to provide an optical pickup that induces a spherical aberration of opposite phase to the incident optical beam when it is incident to the objective lens, without the need of using a correction element.

According to a tenth aspect of the present invention, there is provided an optical information processing apparatus capable of carrying out at least any one of recording, playback and erasing of information to and from any of an optical recording medium designed for blue optical recording technology that uses a blue optical beam and an optical recording medium designed for a red optical recording technology that uses a red optical beam while using an optical pickup, wherein said optical pickup according to any of said first aspect or said fourth through ninth aspects of the present invention is used for said optical pickup.

According to an eleventh aspect of the present invention, there is provided an optical information processing apparatus capable of carrying out at least one of recording, playback and erasing of information to and from any of an optical recording medium designed for a blue optical recording technology that uses a blue optical beam, an optical recording medium designed for a red optical recording technology that uses a red optical beam and an optical recording medium designed for an infrared recording technology that uses an infrared optical beam while using the same optical pickup, wherein an optical pickup according to any of the first through ninth aspects of the present invention is used for said optical pickup.

According to a twelfth aspect of the present invention, there is provided an objective lens focusing any of a first optical beam having a first wavelength $\lambda 1$ and a second optical beam having a second wavelength $\lambda 2$ ($\lambda 1 < \lambda 2$) incident to an incident side of said objective lens, to an optical recording medium provided at an exit side of said objective lens, said objective lens having a single-lens construction and defined by a non-spherical convex surface at said incident side and said exit side, wherein there is satisfied a condition:

$$\nu d > 35 \tag{1}$$

$$1.58 > nd \tag{2}$$

$$0.58nd - 0.29 \leq R1/f \leq 0.62nd - 0.31 \tag{3}$$

where nd and vd represent respectively the refractive index and Abbe number for a D-line, R1 represent the paraxial radius of curvature and f represents the focal distance.

According to a thirteenth aspect of the present invention, there is provided an objective lens according to said twelfth aspect, wherein said conditions (1), (2) and (3) are set for an optical beam incident from an infinite distance when said optical beam has said wavelength $\lambda 1$, and wherein said conditions (1), (2) and (3) are set for an optical beam incident form a finite distance when said optical beam has said wavelength $\lambda 2$.

According to a fourteenth aspect of the present invention, there is provided an objective lens according to any of said twelfth or thirteenth aspect, wherein said optical beam incident to said objective lens with said wavelength $\lambda 1$ is an optical beam of a blue wavelength band, and wherein said optical beam incident to said objective lens with said wavelength λ2 is an optical beam of a red wavelength band, and wherein said conditions (1), (2) and (3) are set for said optical beams of said wavelengths λ1, λ2 and λ3.

According to a fifteenth aspect of the present invention, there is provided an objective lens focusing any of a first optical beam having a wavelength λ1, a second optical beam having a wavelength λ2 and a third optical beam having a wavelength λ3 (λ1<λ2<λ3) incident to an incident side of said objective lens to an optical recording medium provided at an exit side of said objective lens, said objective lens having a single-lens construction and defined by a non-spherical convex surface at said incident side and said exit side, wherein there is satisfied a condition:

$$vd>35 \quad (1)$$

$$1.58>nd \quad (2)$$

$$0.58nd-0.29 \leq R1/f \leq 0.62nd-0.31 \quad (3)$$

where nd and vd represent respectively the refractive index and Abbe number for the D-line, R1 represent the paraxial radius of curvature and f represents the focal distance.

The objective lens according to the twelfth or fifteenth aspect of the present invention is a positive lens focusing a parallel beam incident to said objective lens at said incident side. Because the objective lens for the optical pickup of the present invention has a single lens construction and is defined by a non-spherical surface at both sides, the objective lens can be configured in the form of a convex lens or meniscus lens, wherein the use of the convex lens is most preferable in view of the possibility of reducing the curvature at the incident side and in view of the easiness of manufacture. Thereby, it should be noted that the foregoing conditions (1), (2) and (3) are the conditions for focusing the optical beam on the optical recording medium with the best state of wavefront aberration for the case of conducting two-wavelength optical recording or three-wavelength optical recording.

In the case the condition (2) is not satisfied, for example, the refractive index of the objective lens becomes too small, and it becomes necessary to increase the curvature of the lens surface at the incident side for achieving the desired numerical aperture value. However, formation of such a lens surface with high precision is difficult and the cost of the objective lens is increased inevitably.

When the conditions (1) and (2) for the refractive index nd and the Abbe number vd is not satisfied, on the other hand, there arises the problem of excessively large chromatic aberration, and the compatibility between two wavelengths or three wavelengths becomes difficult.

In the case where the lens surface of the objective lens at the incident side is convex, there is caused an increase of positive refracting power at this surface with increase of the paraxial curvature radial R1. Because the objective lens for an optical pickup has a large numerical aperture NA of about 0.65, it is necessary to increase the positive refracting power at the lens. Thus, in the case of increasing the paraxial curvature radius R1 as noted above while maintaining a large numerical value, it becomes necessary to increase the refractive index of the lens material. Thus, there exists a relation ship "the refractive index nd of the lens increases with increase of the paraxial curvature radius R1.

According to a sixteenth aspect of the present invention, there is provided an objective lens according to said fourteenth aspect, wherein said conditions (1), (2) and (3) are set for an optical beam from an infinite distance when said optical beam has said wavelength λ1 and wherein said conditions (1), (2) and (3) are set for an optical beam from a finite distance when said optical beam has any of said wavelength λ2 or λ3.

According to a seventeenth aspect, there is provided an objective lens according to any of said fifteenth or sixteenth aspect, wherein said optical beam incident to said objective lens with said wavelength λ1 is an optical beam of a blue wavelength band, and wherein said optical beam incident to said objective lens with said wavelength λ2 is an optical beam of a red wavelength band, and wherein said conditions (1), (2) and (3) are set for said optical beams of said wavelengths λ1, λ2 and λ3.

Thus, in the objective lens of the present invention, an incident optical beam is incident to the objective lens in the form of an optical beam of a finite system in the case the optical beam is an optical beam of long wavelength.

In the case an objective lens designed for use in the blue wavelength band with an incident optical beam of the infinite system is used with the wavelength and substrate thickness of DVDs or CDs, there arises a spherical aberration because of the difference of substrate thickness (06 mm, 06 mm, 1.2 mm) and the difference of wavelength (405 nm, 660 nm, 785 nm).

This spherical aberration can be compensated for by using a divergent optical beam as the incident optical beam incident to the objective lend when conducting any of recording, playback or erasing to or from a DVD or CD. In other words, the. objective lens is used as the lens of a finite optical system when carrying out any of recording, playback or erasing to and from a DVD or a CD.

Hereinafter, these inventions will be examined closely.

In order to form an optical spot on a recording surface with a "desired spot size" with a predetermined wavelength through a substrate of predetermined thickness, it is necessary to set the "upper limit value of the wavefront aberration permitted for formation of satisfactory optical spot" to be 0.04 λms, where λ represents the wavelength. It should be noted that this value of 0.04 λms includes the effect of deviation of curvature radius at the front lens surface and the rear lens surface, deviation of the thickness, deviation of the non-spherical form, shifting of the front and rear lens surfaces, tilting of the front and rear lens surfaces, and the like, caused by the manufacturing error of the lens.

Thus, the appropriate median value set for the degradation of wavefront is thought to be about 0.02 λms. Hereinafter, explanation will be made by using the foregoing value of 0.2 λrms as the approximate medium value.

Because the present invention achieves at least one of recording, playback and erasing for the three generations of blue optical recording media, DVDs and CDs, there is a need of achieving the wavefront aberration of 0.2 λms or less for each of the wavelengths.

FIGS. 30A-30C show the wavefront aberrations respectively for the case of using an infinite optical system together with the numerical aperture value NA of 0.65-0.75 for a blue incident optical beam having the wavelength of 405 nm together with the optical recording medium having a substrate thickness of 0.6 mm, the case of using a finite optical system of DVD together with the numerical aperture value NA of 0.65 for the incident optical beam having the wavelength of 660 nm with the optical recording medium having a substrate thickness of 0.6 mm, and the case of using a finite optical system of CD together with the numerical aperture NA of 0.50 for the optical beam having the wavelength of 785 nm with the optical recording medium having a substrate thickness of 1.2 mm, wherein the lens material is represented in terms of the refractive index nd and the Abbe number vd.

It should be noted that the condition that the wavefront aberration becomes 0.02 λrms or less for any of the blue system, DVD and CD is the range shown in FIG. 31 by hatching, wherein this range corresponds to the foregoing conditions (1) and (2). Further, FIG. 31 shows the compositional range of commercially available glasses by a broken line.

It should be noted from FIG. 30B that when these conditions (1) and (2) are not met, there appears an excessively large chromatic aberration due to the different wavelength band of DVD, and the required aberration of 0.02 λrms or less cannot be satisfied.

FIG. 32 shows the relationship between the paraxial curvature radius R1 and the refractive index nd of the objective lens of an optical pickup that has a lens surface of larger curvature at the incident side, under the condition that the wavefront aberration of 0.02 λrms or less is achieved. In the relationship, it was assumed that the focal distance f is 3.05 mm and the numerical aperture value NA is 0.65. Here, it should be noted that the marks ●, ■, ▲, ×, *, ○ and + represent the Abbe number of 65, 60, 55, 50, 45, 40 and 35, respectively.

As can be seen, the Abbe numbers fall within the region defined by the lines a and b. Because the refractive index depends not only on the refractive index nd of a D-line but also on the Abbe number νd, the relationship between the paraxial curvature radius R1 and the refractive index nd is not determined uniquely. Nevertheless, it is possible to achieve the wavefront aberration of 0.02 λrms or less, by satisfying the condition (3) with regard to the paraxial curvature radius R1 and the refractive index nd determined by the range between the lines a and b and simultaneously satisfying the condition of the refractive index nd determined by the condition (1).

Thus, according to the objective lens of the twelfth through seventeenth aspect of the present invention, it becomes possible to achieve compatibility between two or three wavelengths used in the blue optical recording, DVDs and CDs, without using a conventional compound lens or adding phase compensation elements.

As noted before, the optimum numerical aperture value is different in constructing an optical pickup between the blue optical recording medium, DVD recording medium and CD recording medium. Thus, there is a need of changing the diameter of the incident beam to the objective lens according to the type of the optical recording medium used.

Thus, according to an eighteenth aspect of the present invention, there is provided an optical pickup comprising:

a first optical source producing a first optical beam having a first wavelength $\lambda 1$;

a second optical source producing a second optical beam having a second wavelength $\lambda 2$; and an objective lens according to any of the twelfth, thirteenth or fourteenth aspect of the present invention, said objective lens focusing any of said first and second optical beams on an optical recording medium, said objective lens having a first effective numerical aperture value $NA(\lambda 1)$ for said first optical beam and a second effective numerical aperture value $NA(\lambda 2)$ for said second optical beam, said first optical beam incident to said objective lens having a first beam diameter $\phi 1$, said second optical beam incident to said objective lens having a second beam diameter $\phi 2$, said first and second effective numerical aperture values $NA(\lambda 1)$ and $NA(\lambda 2)$ and said first and second beam diameters satisfying a relationship $$NA(\lambda 1) = NA(\lambda 2) \tag{4}$$

$$\phi 2 > \phi 1. \tag{5}$$

Generally, the effective numerical aperture value NA is represented by $$NA = \phi/2f$$

where $\phi$ represents the diameter of the optical beam incident to the objective lens, while f represents the focal distance.

The focal distance increases with increasing wavelength. Thus, by satisfying the conditions (4) and (5) noted above, it becomes possible to achieve the compatibility between the blue optical recording technology known as HD-DVD that uses the numerical aperture value NA of 0.65 and the DVD optical recording technology that uses the numerical aperture value NA of 0.65.

According to a twentieth aspect of the present invention, there is provided an optical pickup comprising:

a first optical source producing a first optical beam having a first wavelength $\lambda 1$;

a second optical source producing a second optical beam having a second wavelength $\lambda 2$; and an objective lens according to any of the twelfth, thirteenth or fourteenth aspect of the present invention, said objective lens focusing any of said first and second optical beams on an optical recording medium, said objective lens having a first effective numerical aperture value $NA(\lambda 1)$ for said first optical beam and a second effective numerical aperture value $NA(\lambda 2)$ for said second optical beam, said first optical beam incident to said objective lens having a first beam diameter $\phi 1$, said second optical beam incident to said objective lens having a second beam diameter $\phi 2$, said first and second effective numerical aperture values $NA(\lambda 1)$, and $NA(\lambda 2)$ and said first and second beam diameters satisfying a relationship $$NA(\lambda 1) > NA(\lambda 2) \tag{6}$$

$$\phi 2 = \phi 1. \tag{7}$$

For example, by setting the numerical aperture value NA for the blue beam to 0.67, which is slightly larger than the numerical aperture value for the DVD technology, it becomes possible to use the same beam diameter ($\phi 2 = \phi 1$) for the incident optical beams, and the switching of the numerical aperture can be omitted.

Generally, the degradation of wavefront caused by the thickness error of the transparent substrate forming an optical recording medium increases with fourth power of NA, while the degradation of wavefront caused by the tilt error of the transparent substrate increases with third power of NA. Thus, increase of capacity cannot be achieved simply by increasing NA.

On the other hand, in the case the degree of degradation of wavefront is such that the use of the numerical aperture value NA of 0.65 for HD-DVD is allowed also in the technology that uses the numerical aperture value NA of about 0.67, the degradation of such a margin is sufficiently small and the use of the numerical aperture value NA of 0.65 is possible without problem.

According to a twenty second aspect of the present invention, there is provided an optical pickup comprising:

a first optical source producing a first optical beam having a first wavelength $\lambda 1$;

a second optical source producing a second optical beam having a second wavelength $\lambda 2$;

a third optical source producing a third optical beam having a third wavelength $\lambda 3$; and an objective lens according to any of the fourteenth, fifteenth or sixteenth aspect of the present invention, said objective lens focusing any of said first, second and third optical beams on an optical recording medium, said objective lens having a first effective numerical aperture value $NA(\lambda 1)$ for said first optical beam, a second effective numerical aperture value $NA(\lambda 2)$ for said second optical beam, and a third effective numerical aperture value $NA(\lambda 3)$ for said third optical beam, said first optical beam incident to said objective lens having a first beam diameter $\phi 1$, said second optical beam incident to said objective lens having a second beam diameter $\phi 2$, said third optical beam incident to said objective lens having a third beam diameter $\phi 3$, said first, second and third effective numerical aperture values $NA(\lambda 1)$, $NA(\lambda 2)$, $NA(\lambda 3)$ and said first, second and third beam diameters $\phi 2$, $\phi 1$, $\phi 3$ satisfying a relationship $$NA(\lambda 1) = NA(\lambda 2) > NA(\lambda 3) \tag{8}$$

$$\phi 2 > \phi 1 > \phi 3. \tag{9}$$

With this, it becomes possible to achieve the optimum numerical aperture values NA for each of the generation of the blue optical recording technology, DVD optical recording technology and CD optical recording technology.

According to a twenty third aspect of the present invention, there is provided an optical pickup comprising:

a first optical source producing a first optical beam having a first wavelength $\lambda 1$;

a second optical source producing a second optical beam having a second wavelength $\lambda 2$;

a third optical source producing a third optical beam having a third wavelength $\lambda 3$; and an objective lens according to any of the fourteenth, fifteenth or sixteenth aspect of the present invention, said objective lens focusing any of said first, second and third optical beams on an optical recording medium, said objective lens having a first effective numerical aperture value $NA(\lambda 1)$ for said first optical beam, a second effective numerical aperture value $NA(\lambda 2)$ for said second optical beam, and a third effective numerical aperture value $NA(\lambda 3)$ for said third optical beam, said first optical beam incident to said objective lens having a first beam diameter $\phi 1$, said second optical beam incident to said objective lens having a second beam diameter $\phi 2$, said third optical beam incident to said objective lens having a third beam diameter $\phi 3$, said first, second and third effective numerical aperture values $NA(\lambda 1)$, $NA(\lambda 2)$, $NA(\lambda 3)$ and said first, second and third beam diameters $\phi 1$, $\phi 2$, $\phi 3$ satisfying a relationship $$NA(\lambda 1) > NA(\lambda 2) > NA(\lambda 3) \tag{10}$$

$$\phi 2 > \phi 1 > \phi 3. \tag{11}$$

With this, it becomes possible to achieve the optimum numerical aperture values NA for each of the generation of the blue optical recording technology, DVD optical recording technology and CD optical recording technology.

According to a twenty fourth aspect of the present invention, there is provided an optical pickup comprising:

a first optical source producing a first optical beam having a first wavelength $\lambda 1$;

a second optical source producing a second optical beam having a second wavelength $\lambda 2$;

a third optical source producing a third optical beam having a third wavelength $\lambda 3$; and an objective lens according to any of the fourteenth, fifteenth or sixteenth aspect of the present invention, said objective lens focusing any of said first, second and third optical beams on an optical recording medium, said objective lens having a first effective numerical aperture value $NA(\lambda 1)$ for said first optical beam, a second effective numerical aperture value $NA(\lambda 2)$ for said second optical beam, and a third effective numerical aperture value $NA(\lambda 3)$ for said third optical beam, said first optical beam incident to said objective lens having a first beam diameter $\phi 1$, said second optical beam incident to said objective lens having a second beam diameter $\phi 2$, said third optical beam incident to said objective lens having a third beam diameter $\phi 3$, said first, second and third effective numerical aperture values $NA(\lambda 1)$, $NA(\lambda)$, $NA(\lambda 3)$ and said first, second and third beam diameters $\phi 1$, $\phi 2$, $\phi 3$ satisfying a relationship $$NA(\lambda 1) > NA(\lambda 2) > NA(\lambda 3) \tag{12}$$

$$\phi 1 = \phi 2 > \phi 3 \tag{13}$$

With this, it becomes possible to achieve the optimum numerical aperture values NA for each of the generation of the blue optical recording technology, DVD optical recording technology and CD optical recording technology.

It should be noted that beam diameter of the optical pickup according to any of the sixteenth through twenty sixth aspects of the present invention is determined by the aperture or a wavelength-selective aperture switching means moving integrally with the objective lens.

Thus, according to a twenty sixth aspect of the present invention, there is provided an optical pickup according to any of the eighteenth through twentieth aspect of the present invention, wherein there is provided an aperture having a diameter generally identical with a maximum diameter of the incident optical beam, said aperture being movable integrally with said objective lens.

According to a twenty-sixth aspect of the present invention, there is provided an optical pickup according to any of said eighteenth, twenty first, twenty second and twenty third aspects of the present invention, wherein there is provided an aperture having a diameter generally identical with a maximum diameter of the incident optical beam and a wavelength-selective aperture switching means, said aperture and said wavelength-selective aperture switching means being movable integrally with said objective lens.

According to a twenty seventh aspect of the present invention, there is provided an optical pickup according to any of the nineteenth or twenty third aspects of the present invention, wherein said first optical beam is incident to said objective lens via an infinite optical system when said first optical source is turned on, said second optical beam is incident to said objective lens via a finite optical system when said second optical source is turned on, wherein there is provided an aperture having a diameter generally equal to said first diameter of said first optical beam incident to said objective lens at a predetermined distance t $$t \approx L - NA1 f / \tan(a \sin(NA2obj))$$

as measured from a principal point of said objective lens located at an incident-side lens surface in the direction opposite to an exist-side lens surface, wherein f represents a focal distance of said objective lens, NA1 represents a numerical aperture at a side of image surface in the state when said first optical source is turned on, NA2obj represents a numerical aperture at said front side in the state when said second optical source is turned on, and L represents an object distance at the time when said second optical source is turned on.

According to the present invention, it becomes possible to provide optimum numerical aperture values for two generations by using the aperture only (no aperture switching means). Further, it becomes possible to provide optimum numerical aperture values for three generations by merely using the aperture and one step switching (not two-step switching).

According to a twenty eighth aspect of the present invention, there is provided an optical pickup according to the twenty sixth aspect, wherein the aperture switching means comprises a wavelength-selective coating or a wavelength-selective diffraction grating and is formed on any of the incident-side surface or exit-side surface of said objective lens.

Thus, it becomes possible to eliminate a dedicated element for aperture switching and the weight of the actuator is reduced. Thereby, the number of steps for assembling the actuator is reduced.

According to a twenty-ninth aspect of the present invention, there is provided an optical information processing apparatus that carries out at least one of recording, playback and erasing of information to and from an optical recording medium while using the optical pickup according to any of the twelfth through seventeenth aspect or eighteenth through twenty eighth aspect of the present invention.

BRIEF DESCRIPTION OF THE DRAWINGS

FIG. 1A is a diagram showing the construction of an optical pickup capable of achieving compatibility between the large-capacity optical recording technology that uses a blue wavelength band and a conventional DVD recording technology, while

FIG. 11A is a diagram showing focusing of an incident optical beam having a wavelength of 407 nm by an objective lens and a phase compensation element, while

FIGS. 27A-27C are diagrams showing the construction of an aperture switching element that changes the beam diameter of an incident optical beam in response the wavelength of the optical beam by causing reflection according to a second embodiment of the present invention;

FIGS. 28A-28C are diagrams showing the construction of an aperture switching element that changes the beam diameter of an incident optical beam in response the wavelength of the optical beam by causing diffraction according to a second embodiment of the present invention;

FIGS. 29A-29C are diagrams showing the construction of an aperture switching element that changes the beam diameter of an incident optical beam in response the wavelength of the optical beam by causing absorption according to a second embodiment of the present invention;

FIG. 30A is a diagram showing the focusing action of an optical system including an aperture switching element for the wavelength of 780 nm and an objective lens, while

FIG. 31A is a diagram showing the focusing action of an objective lens having the one group/two element construction, while

DETAILED DESCRIPTION OF THE INVENTION

First Embodiment

Figure 7:
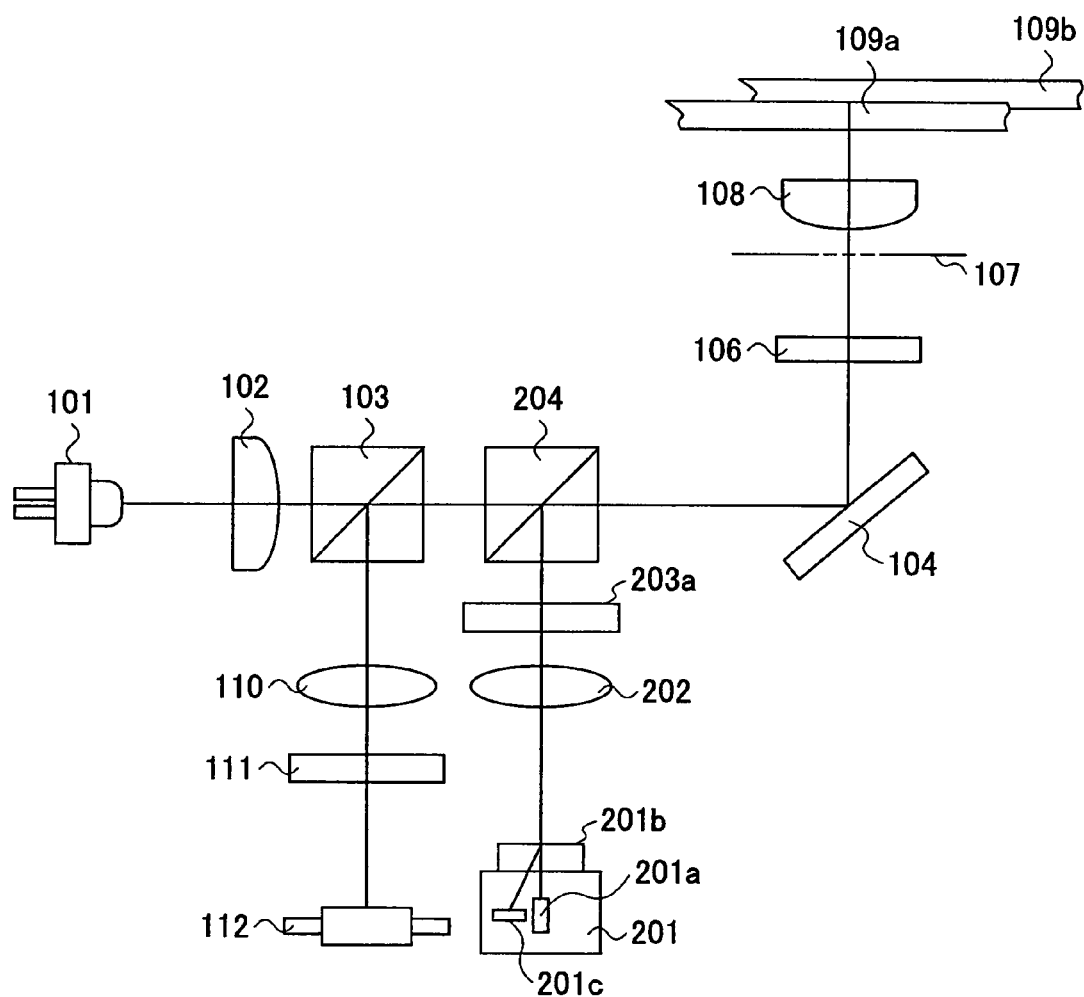
FIG. 7 is a diagram showing the outline construction of an optical pickup according to a first embodiment of the present invention.

FIG. 7 is a diagram showing the schematic construction of an optical pickup according to a first embodiment of the present invention capable of carrying out any of recording, playback and erasing of information to and from any of: a blue optical recording medium having a substrate thickness of 0.6 mm at the side where an optical irradiation is made and designed for use with an optical source having a wavelength of 407 nm and an optical system having a numerical aperture value NA of 0.67; and a DVD optical recording medium having a substrate thickness of 0.6 mm at the side where an optical irradiation is made and designed for use with an optical source having a wavelength of 660 nm and an optical system having a numerical aperture value NA of 0.65.

While the technology of the blue generation optical recording technology addressed in the first embodiment of the present invention is still in the process of consolidation, the present embodiment will be explained for an exemplar construction that uses the wavelength of 407 nm and the numerical aperture value NA of 0.67. By satisfying these conditions, a capacity of about 2.7 times as large as the capacity of 4.7 GB of the conventional DVD optical recording medium is achieved.

Referring to FIG. 7, the optical pickup according to the first embodiment of the present invention comprises: a blue optical system formed of a laser diode 101 producing an optical beam of a blue wavelength band, a collimator lens 102, a polarization optical beam splitter 103, a dichroic prism 204, a deflection prism 104, a quarter-wavelength plate 106, a single aperture 107, an objective lens 108, a detection lens 110, an optical beam splitter 111 and a photodetection device 112; and a DVD optical system formed of a hologram unit 201, a coupling lens 202, a phase compensation element 203a, a dichroic prism 204, the deflection prism 104, the quarter-wavelength plate 106, the single aperture 107 and the objective lens 108, wherein the dichroic prism 204, the deflection prism 104, the quarter-wavelength plate 106, the single aperture 107, and the objective lens 108 are used commonly by the foregoing two optical system.

Here, it should be noted that the objective lens 108 is designed so as to minimize the spherical aberration when it is used with a blue optical recording medium having a substrate thickness of 0.6 mm at the side thereof where irradiation is made by a blue optical beam having the wavelength of 407 nm, provided that the blue optical beam is incident to the objective lens 108 in the form of a parallel beam by way of the optical system forming an infinite optical system.

Further, it should be noted that there are provided optical recording media 109a and 109b designed for different wavelengths, wherein the optical recording medium 109a represents the blue optical recording medium having the substrate thickness of 0.6 mm, while the optical recording medium 109b represents the DVD optical recording medium having the substrate thickness of 0.6 mm. At the time of recording or playback any one of the optical recording media is mounted to a rotating mechanism not illustrated that rotates the optical recording medium mounted thereon at a high speed.

It should be noted that the single aperture 107 restricting the incident optical beam may be provided on a bobbin, which in turn is provided on an actuator that holds the objective lens 108 in such a manner that the objective lens 108 is moved in the focusing direction or tracking direction, and thus, there is no need of providing a separate optical component for this purpose.

First, explanation will be made for the case of carrying out recording, playback and erasing of information to or from a blue optical recording medium having the substrate thickness of 0.6 mm at the side where the irradiation by the optical beam having the wavelength of 407 nm is made while using the optical system together with the numerical aperture value NA of 0.67.

The optical beam emitted from the laser diode 101 oscillating at the wavelength of 407 nm in the form of a divergent beam having a linear polarization is shaped by the collimator lens 102 in the form of a parallel optical beam, wherein the parallel optical beam thus formed is passed through the polarization beam splitter 103 and the dichroic prism 204 disposed along an optical path thereof consecutively, wherein the optical path of the optical beam thus passed through the polarization beam splitter 103 and the dichroic prism 204 is deflected by 90 degrees by the polarization prism 104. Thereafter, the optical beam is passed through the quarter-wavelength plate 106 and is converted to a circular polarization beam upon passage therethrough. Further, the optical beam is restricted by the single aperture 107 to the numerical aperture value NA of 0.67 and is incident to the objective lens 108, wherein the objective lens 108 focuses the optical beam on the optical recording medium 109a in the form of a minute beam spot. With this beam spot, the playback, recording or erasing of information is achieved.

The optical beam reflected back from the optical recording medium 109a forms a circular polarized beam opposite having an opposite rotating direction to the optical beam incident to the optical recording medium 109a and is shaped by the objective lens 108 in the form of a parallel optical beam. The parallel optical beam thus shaped travels in the opposite direction and passes through the foregoing quarter-wavelength plate 106 in the opposite direction. Thereby, the optical beam is converted to a linear polarized beam having a polarization plane perpendicular to the polarization plane of the optical beam traveling to the optical recording medium, wherein the optical beam is reflected by the polarization optical beam splitter to the detection lens 110. Thereby, the optical beam is converged by the detection lens 110 and is divided into plural paths leading to the photodetection element 112. Thereby, the photodetection element 112 detects an aberration signal, information signal and the servo signal from the optical beam thus, focused thereon.

Next, explanation will be made for the case of carrying out recording, playback and erasing of information to or from a DVD optical recording medium having the substrate thickness of 0.6 mm at the side where the irradiation by the optical beam having the wavelength of 660 nm is made while using the optical system together with the numerical aperture value NA of 0.65.

Today, a DVD pickup generally uses a hologram unit 201 having a construction in which a light emitting device and a photodetection device are accommodated in a single. Thereby, separation of the optical beam is made by using a hologram.

Figure 8:
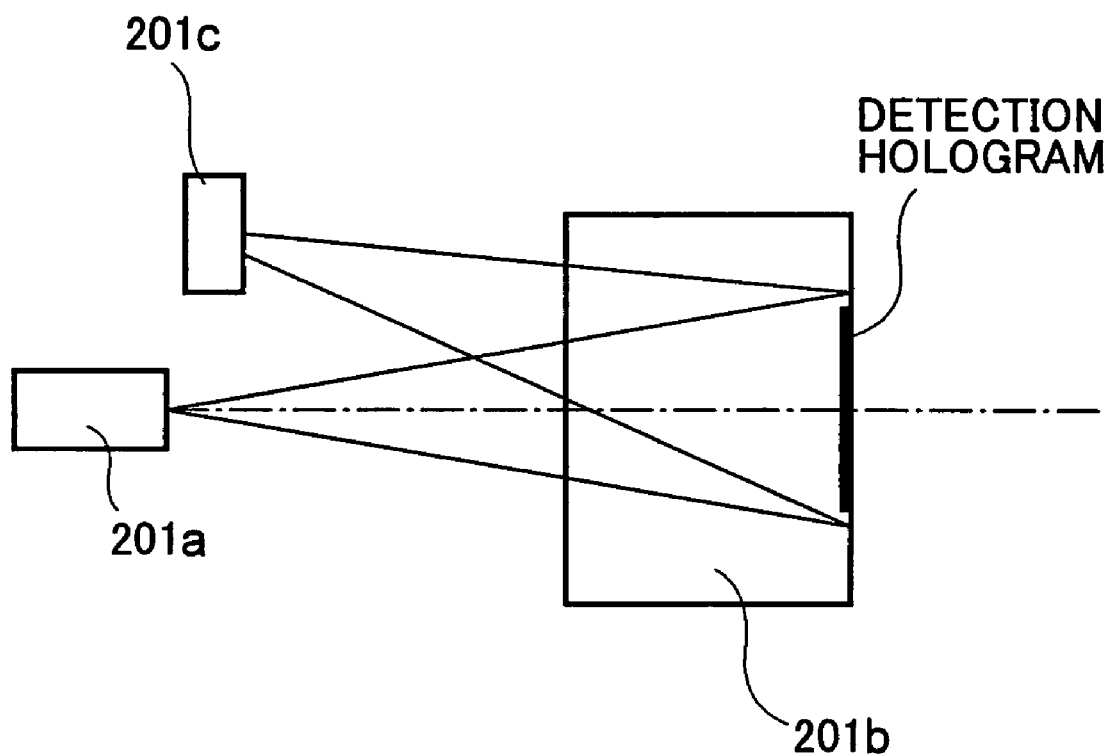
FIG. 8 is a diagram showing the construction of a hologram unit in which a laser diode, a hologram and a photodetection device are integrated.

Thus, as shown in FIG. 8, the hologram unit 201 has a construction in which a laser diode chip 201a, a hologram 201b and a photodetection device 201c are integrated.

The optical beam having the wavelength of 660 nm emitted from the laser diode 201a is caused to pass through the hologram 201b and is converted to a predetermined divergent beam of a finite optical system by the coupling lens 202.

The optical beam thus processed is added with a predetermined spherical aberration by the phase compensation element 203a as will be described later and is reflected toward the deflection prism 104 by the dichroic prism 204, wherein the dichroic prism 204 passes an optical beam of blue wavelength band therethrough while causes reflection in an optical beam of red wavelength band.

The optical beam thus incident to the deflection prism 104 is deflected by the angle of 90 degrees and is passed through the ¼ wavelength plate 106, and the optical beam is converted to a circular polarized optical beam upon passage through the ¼ wavelength plate 106.

Thereafter, the optical beam is restricted to the numerical aperture value NA of 0.65 by the single aperture 107 and is incident to the objective lens 108. The objective lens 108, in turn, focuses the optical beam upon the optical recording medium 109b in the form of a minute beam spot, and playback, recording or erasing of information is achieved with this beam spot.

The optical beam reflected from the optical recording medium 109b is then deflected by the deflection prism 104 and is reflected by the dichroic prism 204. Further, the optical beam thus reflected is converted to a converging beam by the coupling lens 202 and is directed to the photodetection device 201c inside the can that also accommodates the laser diode 201a by way of diffraction caused by the hologram 201b. Thereby, the photodetection device 201c detects the aberration signal, information signal and the servo signal.

Here, explanation will be made on the single aperture and the aberration compensating element of the present invention.

The optical pickup of the present embodiment is an optical pickup achieving so-called two-generation compatibility by providing two optical sources, one producing an optical beam in the wavelength band an the other producing an optical beam in the red wavelength band, wherein the optical pickup of the present embodiment does not require an aperture switching element for achieving the desired two-generation compatibility.

Figure 9:
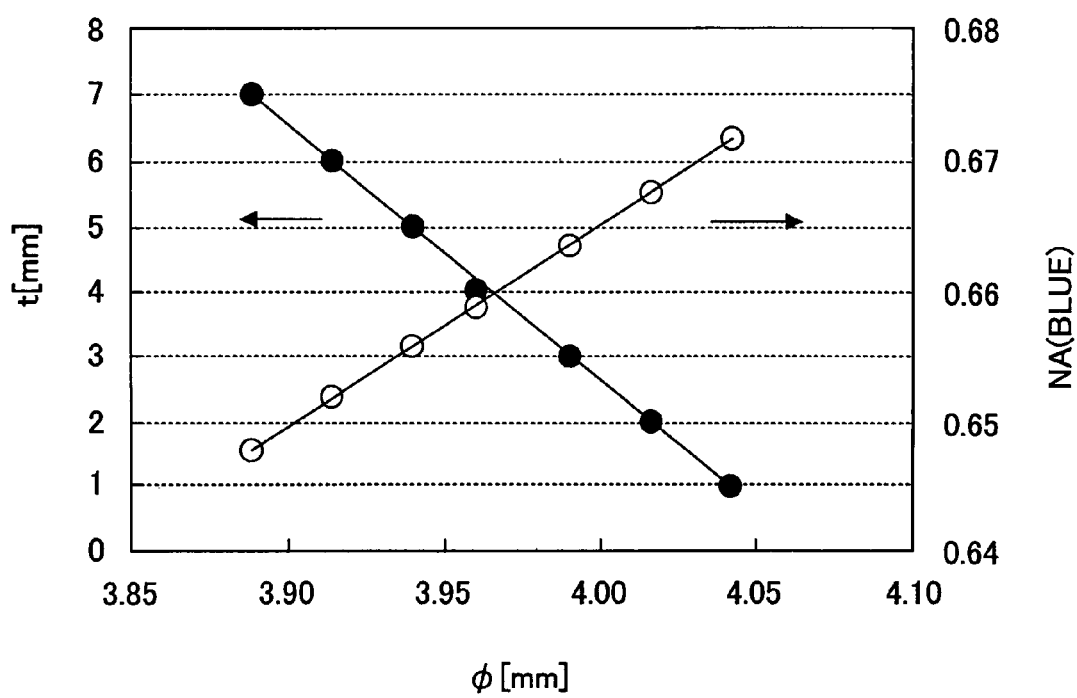
FIG. 9 is a diagram showing the relationship between the diameter of the incident optical beam and the distance between the aperture and the objective lens and further the relation ship between the diameter of the incident optical beam and the numerical aperture value.

FIG. 9 is a diagram showing the relationship between the incident beam diameter (X axis) for the case an optical beam of a red wavelength band of 660 nm is passed through an objective lens and the distance between the single aperture 107 and the front side (incident side) principal point of the objective lens (Y axis at the left) for the case of using a glass material of BaCD5 (provided by HOYA) and the substrate thickness of the optical recording medium of 0.6 mm. Further, the Y axis at the right of FIG. 9 represents the numerical aperture value NA for the incident optical beam diameter in the case an optical beam having a wavelength of 407 nm is caused to pass through the objective lens.

In the particular case of the present embodiment in which recording and playback is made for the blue optical recording media by using the numerical aperture value NA of 0.67, it can be seen from FIG. 9 that the optimum diameter φ of the incident optical beam to the objective lens is 4.03 mm and the optimum distance t between the single aperture and the front side principal point of the objective lens is 1.4 mm.

In the present embodiment, there is provided an optical pickup carrying out at least one of recording, playback and erasing of information to and from an optical recording medium, comprising: a first optical source producing a first optical beam having a wavelength λ1; a second optical source producing a second optical beam having a wavelength λ2 (λ2<λ2); a single objective lens focusing any of said first and second optical beams to an optical recording medium, said first optical beam being produced in response to turning-on of said first optical source and being incident to said objective lens in the state of a parallel beam via an infinite optical system, said second optical beam being produced in response to turning-on of said second optical source and being incident to said objective lens in the state of a divergent optical beam via a finite optical system, an aperture being provided at a front side of said objective lens opposite to said optical recording medium with offset from a principal point of said objective lens at said front side by a distance t given by an equation $$t = L - NA1 \cdot f / \tan(a \sin(NA2obj)),  \quad \text{Eq. (1.1)}$$

wherein f represents a focal distance of said objective lens, NA1 represents a numerical aperture value at a side of image surface in the state when said first optical source is turned on, NA2obj represents a numerical aperture value at said front side in the state when said second optical source is turned on, and L represents an object distance at the time when said second optical source is turned on.

With this, it becomes possible to achieve two-generation compatibility between the blue optical recording technology and the DVD technology, without providing an aperture switching element.

Figure 10:
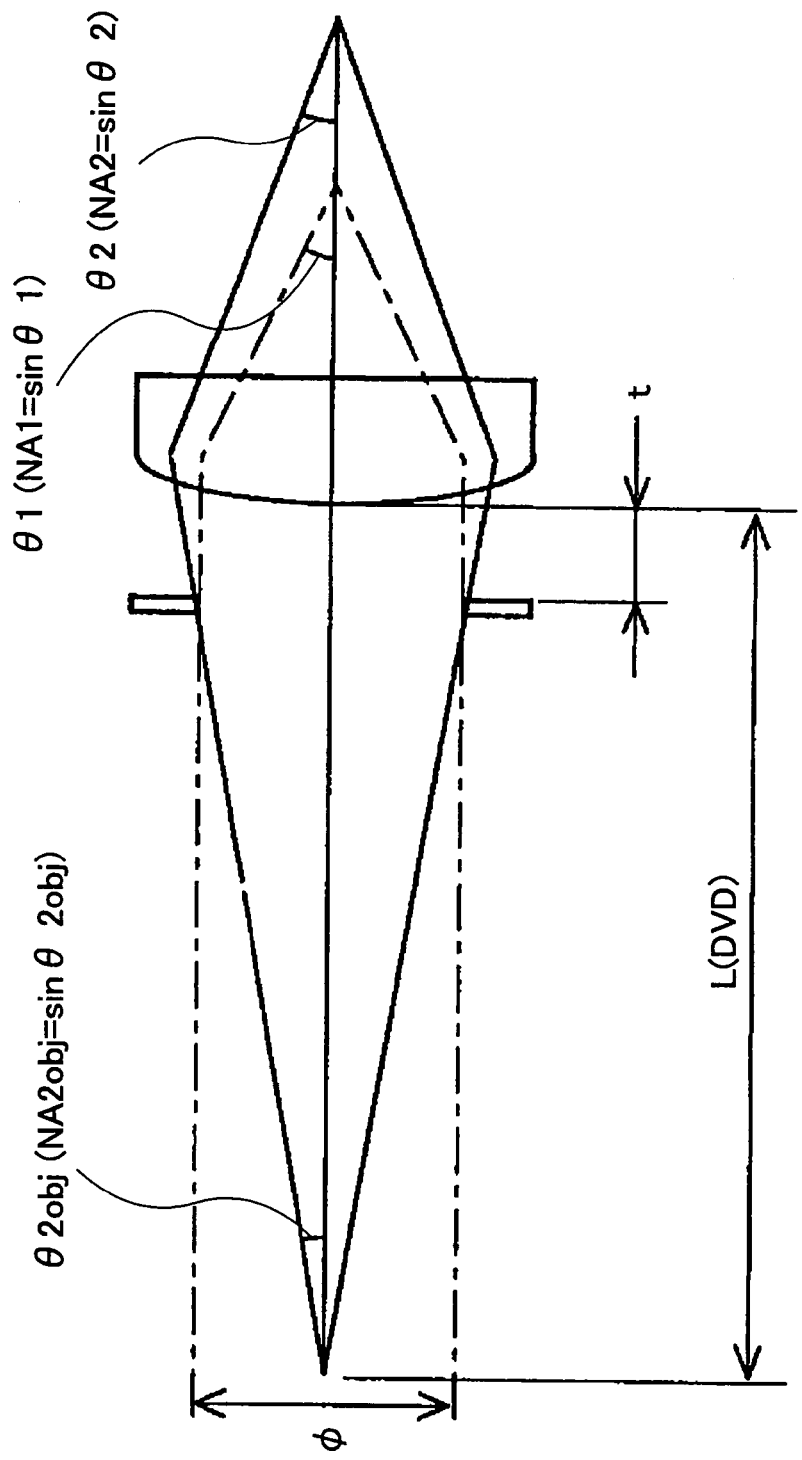
FIG. 10 is a diagram showing the focusing action of an objective lens focusing an incident optical beam for the case of an infinite optical system and a finite optical system.

FIG. 10 shows the optical path of the optical beam of an infinite system, which is produced at an infinite point and incident to an objective lens with the wavelength λ1 and the numerical aperture value NA1 by a one-dotted line.

On the other hand, it is known that there exists the relationship $$NA1 = \phi / 2 \cdot f \quad \text{Eq. (1.2)}$$

between the focal distance f of the objective lens, the diameter φ of the incident optical beam and the numerical aperture value NA1.

On the other hand, in the case of the finite optical system in which the optical beam has the wavelength λ2, the numerical aperture value NA2, the object distance L and the numerical aperture value NA2obj at the object side is represented in FIG. 10 by the continuous line.

In the case the first aperture is provided at the distance t offset from the principal point of the objective lens at the front side in the direction toward the optical source such that the beam diameter of the incident optical beam having the wavelength λ2 becomes φ, the following relationship is obtained $$\phi / 2 = (L - t) \times \tan(a \sin(NA2obj)). \quad \text{Eq. (1.3)}$$

The foregoing equation (1.1) is obtained by substituting the equation (1.2) into the equation (1.3).

In the present embodiment, the construction shown in FIGS. 12A-12D provides the relationship φ=4.03 mm and t=1.44 mm for the optical path condition of λ1=407 nm and NA1=0.67 for the: blue wavelength band and the optical path condition of λ2=660 nm, Na2=0.65, L=157 mm and NA2obj=0.013.

Further, it should be noted that the glass material of the objective lens is not limited to BaCD5 but other materials such as BaCD12, LaC1130, BaF41, NbF1, and the like, can be used. Thereby, it is preferable to choose the glass material allowing non-spherical molding process. The foregoing diameter φ of the incident optical beam or the distance t between the single aperture and the front side principal point of the objective lens is affected also by the glass material used for the objective lens.

EXAMPLE 1

Next, an optical pickup equipped with a phase compensation element that uses optical diffraction for the compensation element of the spherical aberration will be explained with reference to FIG. 7 as Example 1 of the present invention.

Figure 12A:
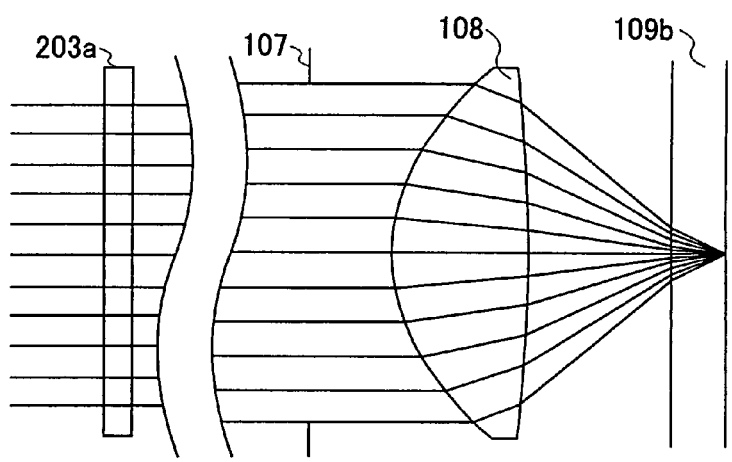
FIG. 12A is a diagram showing focusing of an incident optical beam having a wavelength of 660 nm by an objective lens and a phase compensation element.
Figure 12B:
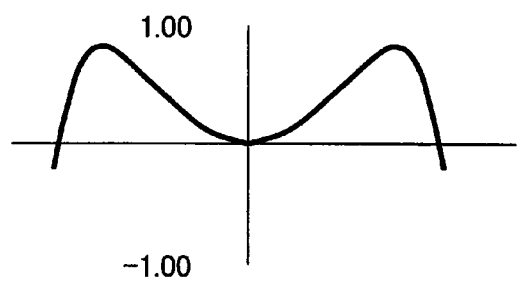
FIG. 12B is a diagram showing the spherical aberration caused in an optical beam of a 660 nm wavelength incident to the objective lens that is designed so as to minimize the aberration for the optical beam having the wavelength of 407 nm, via an infinite optical system.

In the case an optical spot is formed on a DVD recording medium 109 by using an optical beam having a wavelength of 660 nm together with the single objective lens 108, which is optimized such that the wavefront aberration becomes minimum for the optical beam having the wavelength of 407 nm, by supplying the foregoing optical beam of the 660 nm wavelength to the objective lens 108 via an infinite optical system, there arises a spherical aberration shown in FIG. 12B due to the difference in the wavelength. It should be noted that FIG. 12B shows the wavefront aberration at the wavelength of 407 nm.

Thus, in Example 1, the optical pickup uses a finite optical system for DVD and further provides the phase compensation element 203a in such a manner that the phase compensation element 203a induces a spherical aberration of opposite phase for canceling out the spherical aberration caused in DVD shown in FIG. 12B.

It should be noted that the use of the finite optical system means that the optical beam incident to the objective lens is a divergent beam or convergent beam. Because changing of the diverging state of the optical beam incident to the objective lens is equivalent of changing the spherical aberration, a diverging state appropriate for reducing the spherical aberration may be used.

Figure 13:
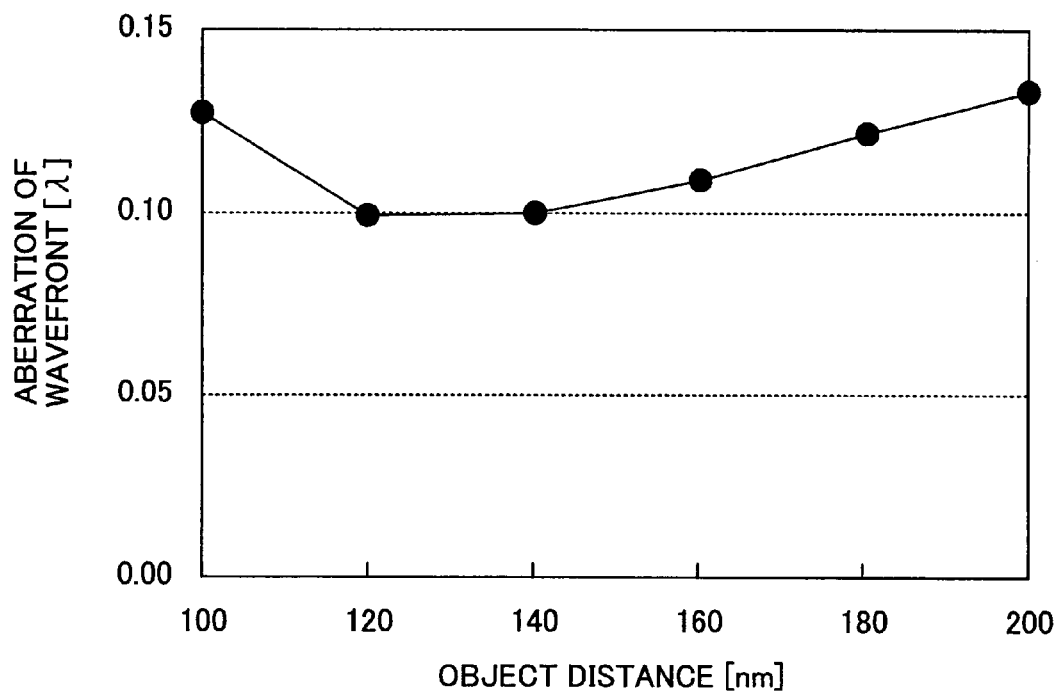
FIG. 13 is a diagram showing the relationship between the object distance and the wavefront aberration for the case of a finite DVD optical system.

As shown in FIG. 13, the wavefront aberration can be suppressed when the object distance of the DVD optical system (the distance between the optical source and the objective lens) is changed. According to FIG. 13, it can be seen that the wavefront aberration reduced when the object distance is set to the range of 110-160 mm.

While FIG. 10 represents the case in which no component is interposed between the objective lens and the optical source, the actual construction of the optical pickup such as the one shown in FIG. 7 disposes other component such as the coupling lens 202 therebetween, wherein the coupling lens 202 is provided for reducing the optical path length.

On the other hand, the use of the finite optical system alone is not sufficient for compensating for the wavefront aberration in the case the optical system for DVD is used.

In view of the foregoing, Example 1 proposes the use of the phase compensation element 203a in addition to the use of the finite optical system for suppressing the wavefront aberration caused in the DVD optical path.

More specifically, the phase compensation element 203a causes a +1th order diffraction in the optical beam of the 660 nm wavelength and induces thereby a spherical aberration capable of canceling out the sum of the spherical aberration in the exit optical beam of the objective lens caused as it passes through the DVD optical recording medium having the thickness of 0.6 mm and the spherical aberration and the spherical aberration of the objective lens 108. With this, the +1th order diffraction beam of the phase compensation element 203$a$ is focused upon the recording surface of the DVD recording medium 109$b$ by way of the objective lens 108 without aberration.

Figure 14A:
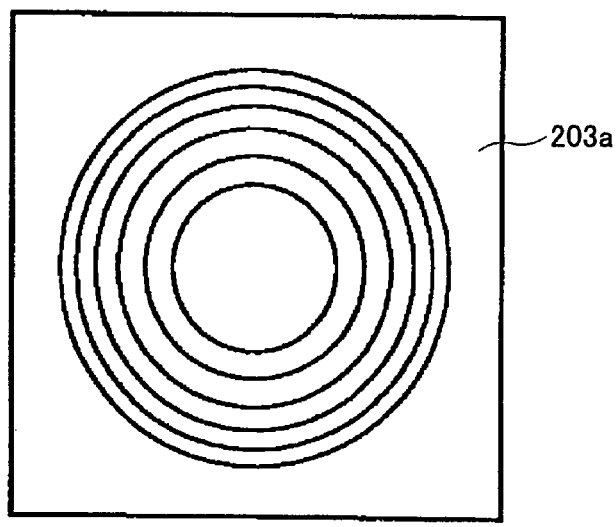
FIGS. 14A and 14B are respectively a plan view and a cross-sectional view showing the construction of a phase compensation element according to Example 1 of the first embodiment of the present invention.
Figure 14B:

FIG. 14A shows the phase compensation element in a plan view while FIG. 14B shows a cross sectional views FIG. 14A.

Referring to FIG. 14A, the phase compensation element 203$a$ has a concentric interference pattern and plays the role of the spherical aberration correction mentioned before with regard to the +1th diffraction beam.

Here, it should be noted that the phase compensation surface of Example 1 is optimized for a specific wavelength. As described in "INTRODUCTION TO DIFFRACTION OPTICAL ELEMENTS" Optical Design Study Group, Optical Society of Japan, (ed)., The Physical Society of Japan, not all the energy of the incident optical beam is converted to the exit optical beam in a diffraction element but only a part of the incident optical energy is converted to the exit optical energy with a factor called diffraction efficiency. In the case of so-called kinoform (sawtooth) pattern, which is thought ideal in the diffraction elements, a theoretical diffraction efficiency of 100% can be achieved at a specific wavelength when it is optimized (blazed) at that wavelength. Further, a diffraction efficiency of 90% or more can be achieved even in the case of using a diffraction grating that approximates the foregoing kinoform grating. In Example 1, such a blazing of the phase compensation element 203$b$ can be achieved to the DVD optical system.

Hereinafter, the actual construction and corresponding optical performance of the optical pickup of Example 1 will be explained.

Figure 11A:
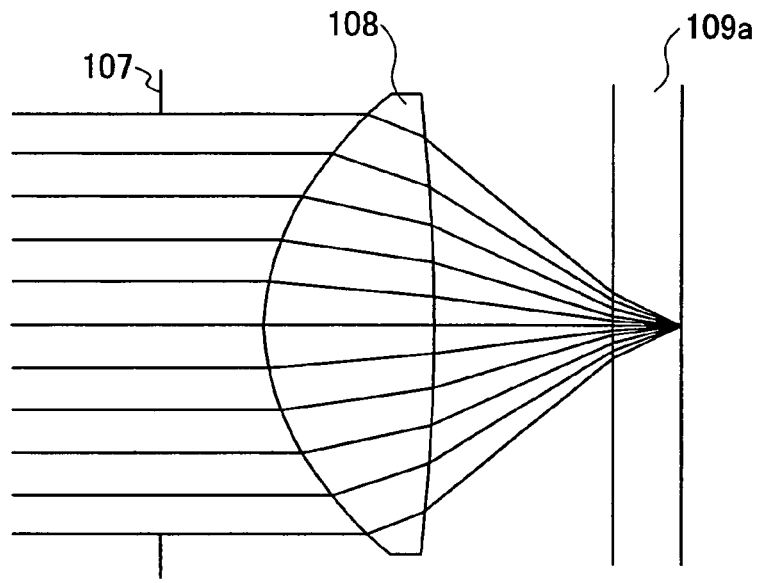
Figure 11B:
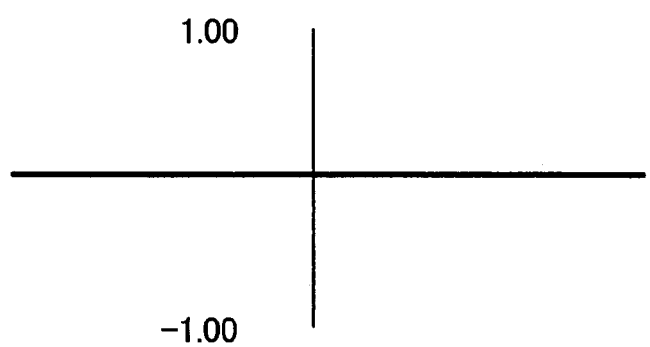
FIG. 11B shows the spherical aberration caused in the construction of FIG. 11A for the optical beam of the 407 nm wavelength.

First, the optical performance of the objective lens will be explained for the blue optical beam of the 407 nm wavelength while using FIG. 11A and Table 1.

It should be noted that the objective lens 108 of Example 1 is the objective lens designed so that the spherical aberration is minimized at the wavelength of 407 nm. Here, it should be noted that the numerical aperture value NA is set to 0.67, the focal distance f is set to 3 mm, and the refractive index n at the wavelength of 407 nm is set to 1.6049 by using BaCD5 of HOYA for the glass of the objective lens. The non-spherical form of the lens surface is given by a commonly known equation (1.4) of non-spherical surface by specifying the parameters of: coordinate X in the direction of the optical axis; coordinate Y in the direction perpendicular to the optical axis; paraxial curvature radius R; conical constant K; and higher coefficients A, B, C, D, E, F, . . . as follows.

$$X=(Y^2/R)/[1+\sqrt{\{1-(1+K)Y/R^2\}}+AY^4+BY^6+CY^8+DY^{10}+EY^{12}+FY^{14}+GY^{16}+HY^{18}+JY^{20}+$$ Eq. (1.4)

TABLE 1

| surface | RDY (curvature radius) | THI (thickness) | Glass (refractive index) |
|---|---|---|---|
| OBJ | INFINITY | INFINITY | |
| STO | INFINITY | 1.44 | |
| S2 | 2.01507 | 1.700000 | BaCD5 (1.6049) |
| | K: −0.674258 | | |
| | A: 0.364557E-02 B: 0.410494E-04; | | |
| | C: 0.815925E-04; D: −.444548E-04 | | |
| S3 | −18.13584 | 1.656788 | |
| | K: 69.056492 | | |
| | A: 0.132534E-01; B: −.410601E-02; | | |
| | C: 0.595437E-03; D: −.200993E-04 | | |

TABLE 1-continued

| surface | RDY (curvature radius) | THI (thickness) | Glass (refractive index) |
|---|---|---|---|
| S4 | INFINITY | 0.6 | PC (1.6202) |
| IMG | INFINITY | 0.0 | |
| EPD: entrance pupil diameter (mm) | | | 4.03 |
| WL: wavelength (nm) | | | 407 |

In Table 1, "OBJ" represents the object point (laser diode used for optical source). Because the objective lens 108 forms the infinite optical system, "INFINITY" for the curvature radius RDY and the thickness THI means that the optical source is located at the infinite distance. Further, "STO" represents the single aperture, wherein it will be noted that the curvature radius thereof is designated as "INFINITY" in Table 1. The thickness of the single aperture is set to zero for the convenience of the design. Here, all the quantities having the dimension of length is represented by "mm".

S2 represents the lens surface of the objective lens 108 at the side of the optical source, while "S3" represents the lens surface of the same objective lens 108 at the side of the optical recording medium. The objective lens 108 has a thickness of 1.7 mm, and the thickness value "1.656788 mm" at the right of "curvature" in the column for S3 represents the "working distance". Further, "S4" represents the surface of the optical recording medium 109$a$ irradiated with the optical beam and hence located at the side of the optical source, while IMG represents the surface coincident to the recording surface. It will be noted that the distance between the surfaces S4 and IMG corresponds to the substrate thickness at the side where the optical radiation is made, wherein the substrate thickness is 0.6 mm and the refractive index n is 1.6202.

Further, EPD: entrance pupil diameter represents the beam diameter (4.03 mm) of the incident optical beam, while WL: wavelength represents the wavelength (407 nm) used for the recording. In the representation of the non-spherical coefficients, the representation such as D:−.200993E-04 means D=−0.200993×10$^{-4}$.

Next, the numerals of the phase compensation element and the optical performance at the wavelength of 660 nm will be explained for the phase compensation element 203$a$ of the DVD optical system while using FIG. 12A, Table 2 and Table 3.

Figure 1A:
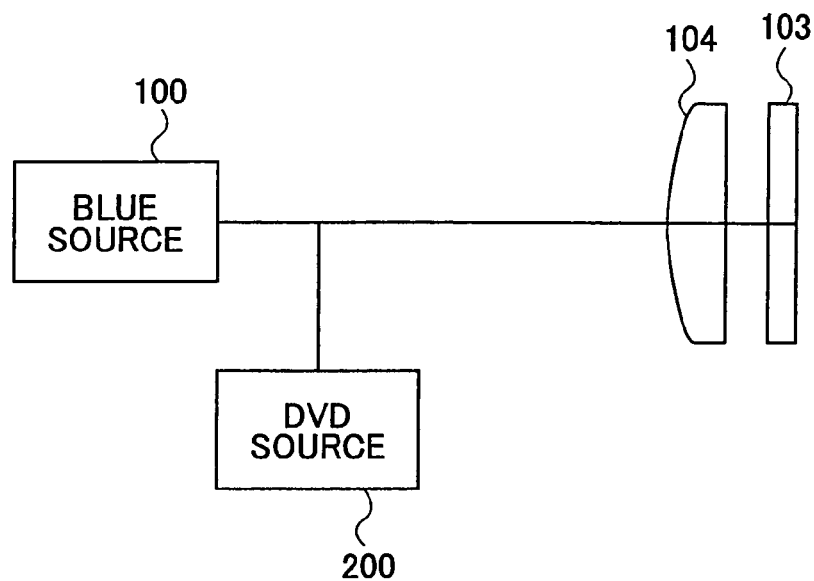
Figure 1B:
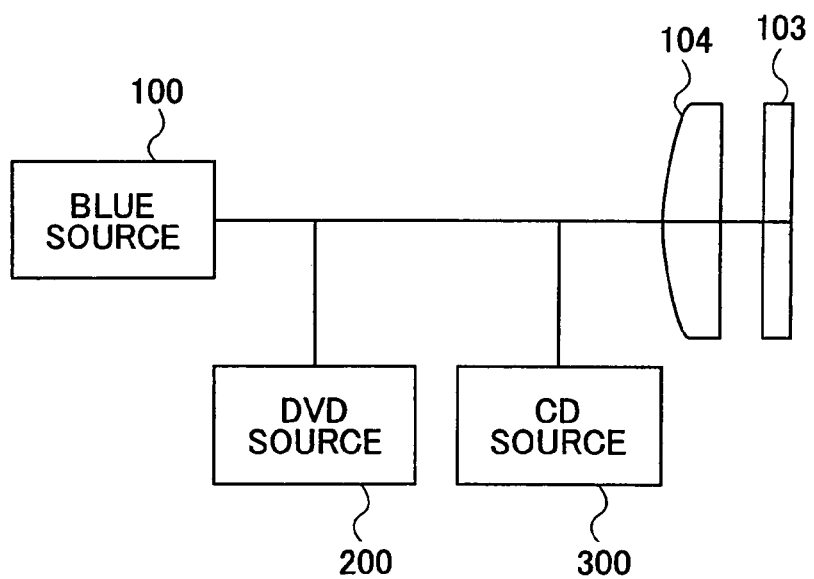
FIG. 1B is a diagram showing the construction of an optical pickup capable of achieving compatibility between the large-capacity optical recording technology that uses a blue wavelength band and a conventional DVD or CD recording technology.
Figure 2:
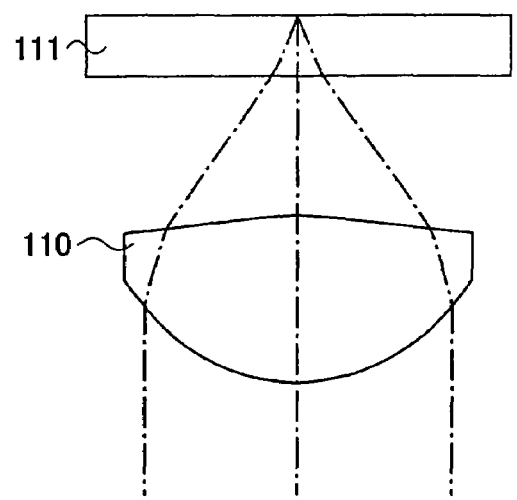
FIG. 2 is a diagram showing an exemplary construction of a conventional objective lens.
Figure 3:
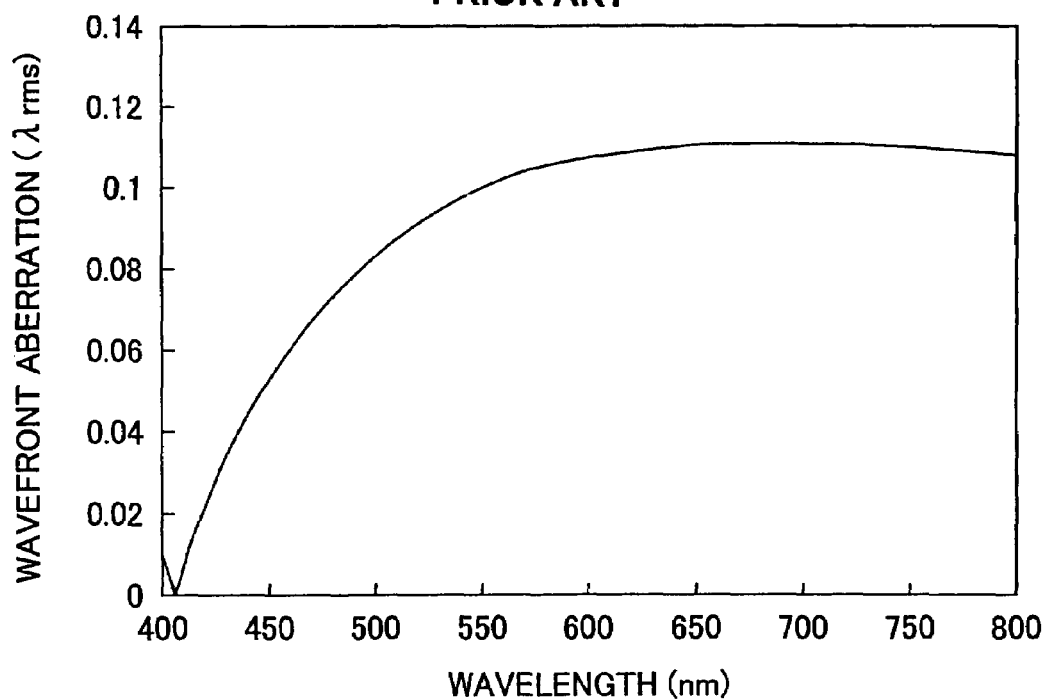
FIG. 3 is a diagram showing the relationship between the wavelength of a conventional optical source and the wave-front aberration characteristics.

Referring to Tables 2 and 3, it can be seen that the shape of the objective lens 108 is identical with that of the objective lens 108 of FIG. 1, while the refractive index an the working distance are different. Further, the phase increment caused by the increment of optical path length by the interference pattern formed on the phase compensation element 203$a$ at the side of the objective lens 108 is represented as $$\gamma(h)=(C1h^2+C2h^4+C3h^6+\ldots)\times m\times\lambda,$$ Eq. (1.5)

wherein h represents the height from the optical axis, Ci represents the optical path difference function coefficient of the nth (even number) order, m represents the order of the diffraction, and λ represents the wavelength. Here, the phase increment is defined such that it takes a positive value in the case the optical path length increases with regard to the optical path length on the optical axis.

Here, it should be noted that the concentric interference pattern of Example 1 formed on the phase compensation element 203$a$ is designed so as to use the +1th order diffraction. It is, however, possible to use the diffraction of any order. For example, it is possible to use a second order diffraction.

TABLE 2

| surface | RDY (curvature radius) | THI (thickness) | Glass (refractive index) |
|---|---|---|---|
| OBJ | INFINITY | 146.5 | |
| S1 | INFINITY | 0.5 | FCD1 (1.4951) |
| S2 (✱) | INFINITY | 10 | |
| STO | INFINITY | 1.44 | |
| S4 | 2.01507 | 1.700000 | BaCD5 (1.6049) |
| | K: −0.674258 | | |
| | A: 0.364557E−02 B: 0.410494E−04; | | |
| | C: 0.815925E−04; D: −.444548E−04 | | |
| S5 | −14.62096 | 1.800894 | |
| | K: 69.056492 | | |
| | A: 0.132534E−01; B: −.410601E−02; | | |
| | C: 0.595437E−03; D: −.200993E−04 | | |
| S6 | INFINITY | 0.6 | PC (1.5791) |
| IMG | INFINITY | 0.0 | |
| EPD: (mm) | | 4.03 | |
| WL: (nm) | | 660 | |

(✱) With regard to the phase correction surface date, reference should be made to Table 3.

In Example 1, the interference fringe pattern of the phase compensation element 203 is designed such that the spherical aberration is minimized at the wavelength of 660 nm, and the optical path difference coefficients $C_i$ are determined as represented in Table 3 below.

TABLE 3

| S2 (phase compensation plane) | C1: −6.3005E−04; C2: 1.9631E−03; C3: −2.4763E−03; C4: 1.4279E−03; C5: −3.7237E−03; C3: 3.5567E−03; |
|---|---|

Figure 12C:
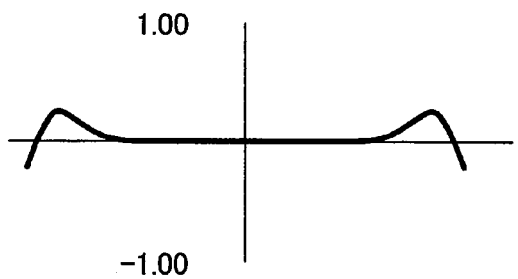
FIG. 12C is a diagram showing the spherical aberration for the case an optical beam of a 660 nm wavelength has been incident to the objective lens via a finite optical system.
Figure 12D:
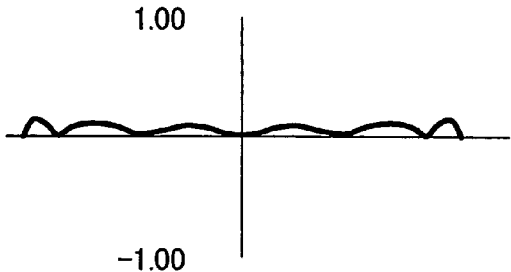
FIG. 12D is a diagram showing the spherical aberration caused in the optical beam of the 660 nm wavelength for the case the optical beam is incident via a finite optical system together with phase compensation.

FIG. 12D shows the wavefront aberration at the wavelength of 660 nm for the case the phase compensation element is inserted, wherein the horizontal axis represents the height from the optical axis while the vertical axis represents the spherical aberration. The RMS value of the spherical aberration is 0.001 λrms in this case, while this value satisfies the requested value of 0.030 λrms and excellent spot formation becomes possible.

EXAMPLE 2

Figure 15:
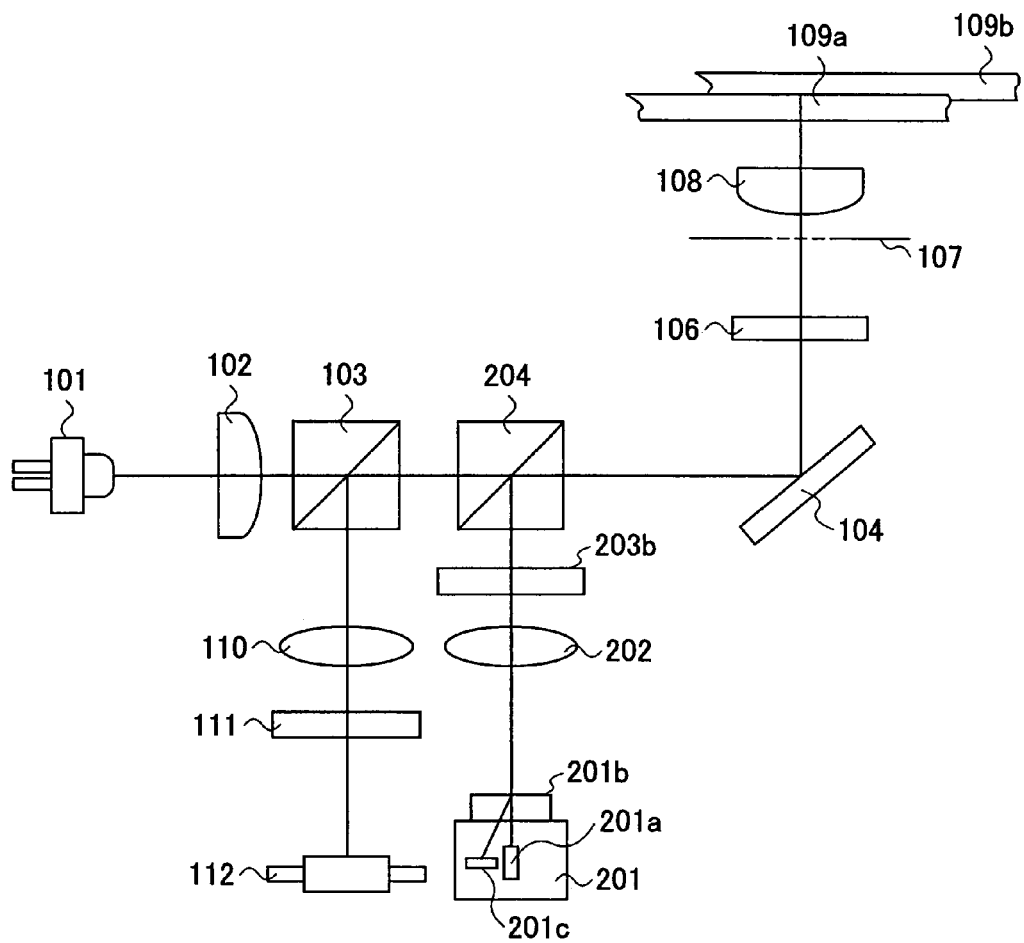
FIG. 15 is a diagram showing the general construction of an optical pickup according to Example 2 of the first embodiment of the present invention.

FIG. 15 is a diagram showing the schematic construction of the optical pickup according to Example 2 of the present invention.

Referring to FIG. 15, Example 2 shows an optical pickup capable of carrying out recording, playback and erasing of information to and from any of the blue optical recording medium by using the wavelength band of 407 nm, numerical aperture value NA of 0.67 and the substrate thickness of 0.6 mm at the side to which the optical irradiation is made and the red optical recording medium by using the wavelength band of 660 nm, numerical aperture value NA of 0.65 and the thickness of 0.6 mm at the side to which the optical irradiation is made.

Figure 16:
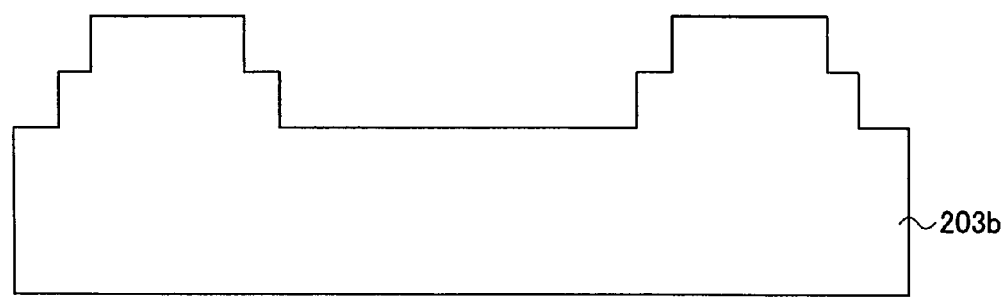
FIG. 16 is a cross-sectional diagram showing the construction of the phase compensation element according to Example 2 of the first embodiment of the present invention.

The difference of the optical pickup of FIG. 15 over the optical pickup of FIG. 7 is in the point that a phase compensation element of stepped shape shown in FIG. 16 is used in place of the phase compensation element 203a having a blazed pitch pattern shown in FIG. 14B. Associated with this, the present example achieves the aberration compensation by changing the phase of the transmission light ($0^{th}$ order light) itself, contrary to the case of Example 1 that uses the $+1^{st}$ diffraction light.

In the case the phase compensation element 203b is not used, there remains a spherical aberration at the time the exit beam of the 660 nm wavelength passes through the substrate of the 0.6 mm thickness, similar to the case explained before. In Example 2, the stepped phase compensation element 203b is used for the means of suppressing the spherical aberration, wherein the stepped form is formed in conformity with the residual aberration as shown in FIG. 12C.

FIG. 16 is a cross-sectional diagram of the phase compensation element 203b according to Example 2. As shown in FIG. 16, the phase compensation element 203b is formed by forming a concentric pattern on a glass substrate.

EXAMPLE 3

Figure 17:
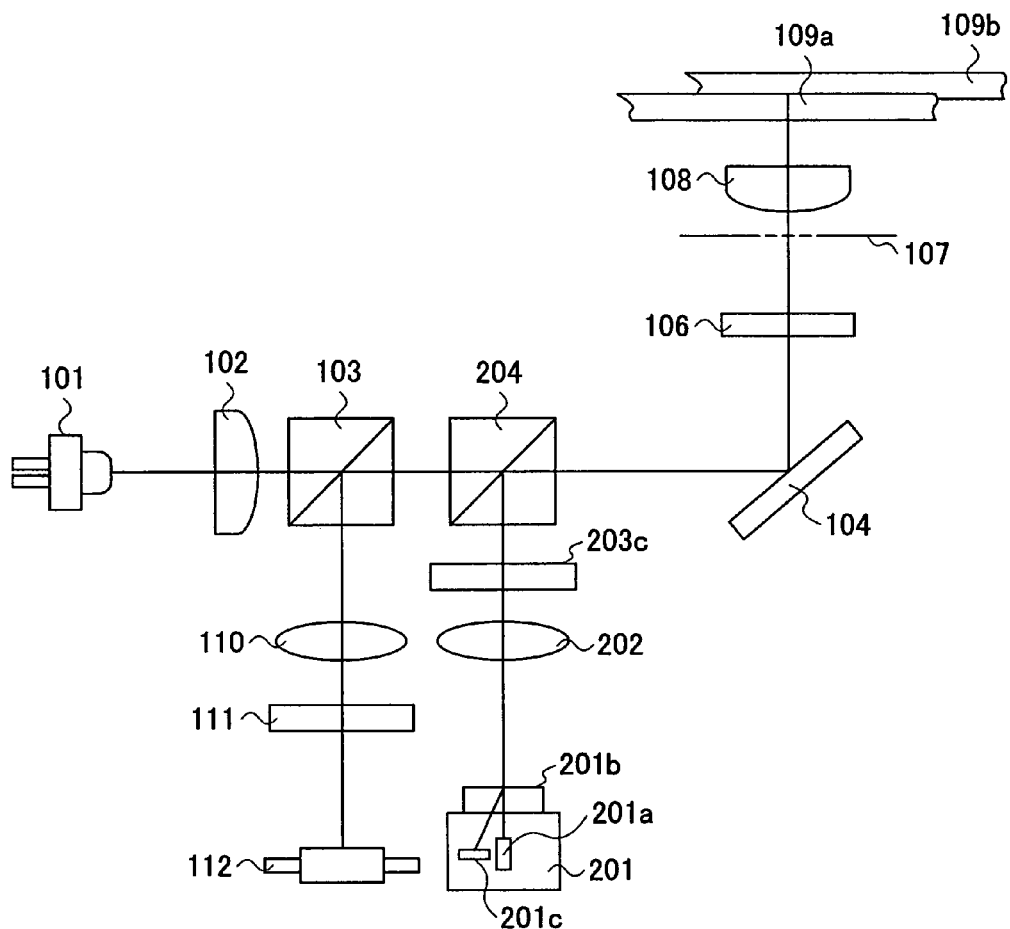
FIG. 17 is a diagram showing the general construction of an optical pickup according to Example 3 of the first embodiment of the present invention.

FIG. 17 is a diagram showing the schematic construction of an optical pickup according to Example 3 of the present embodiment.

Referring to FIG. 17, the optical pickup of Example 3 is an optical pickup capable of carrying out recording, playback or erasing of information to and from any of the blue optical recording medium by using the wavelength of 407 nm wavelength, numerical aperture value NA of 0.67 and the thickness of 0.6 nm for the substrate at the side where the optical irradiation is made and the DVD optical recording medium by using the wavelength of 660 nm wavelength, numerical aperture value NA of 0.65 and the thickness of 0.6 nm for the substrate at the side where the optical irradiation is made.

The difference of the optical pickup of Example 3 over the optical pickup of Example 1 or 2 is that the optical pickup of Example 2 uses a dynamic phase compensation element 302c for the compensation means of the spherical aberration.

For such a dynamic phase compensation element 302c, it is possible to use an electro-optic element such as a liquid crystal device.

Figure 18:
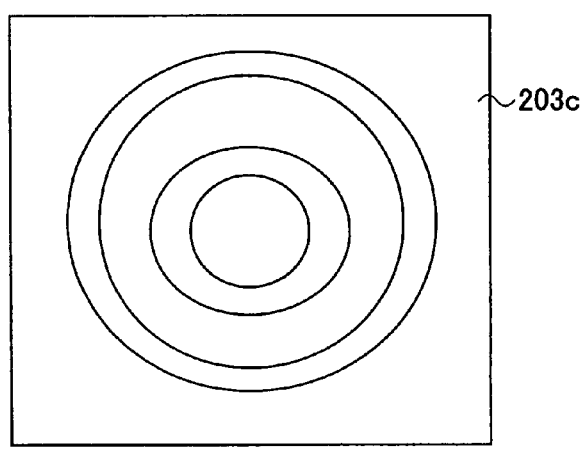
FIG. 18 is a front view diagram showing an electrode pattern used in a liquid crystal device used for the phase compensation element of Example 3.

As shown in FIG. 18, at least one of the transparent electrodes of the liquid crystal device is patterned to form a concentric pattern, and each of the concentric electrode patterns is driven by applying thereto a voltage independently from other concentric electrode patterns. Thereby, the refractive index n of the liquid crystal can be changed arbitrarily from n1 to n2 in the part corresponding to the concentric electrode.

By changing the refractive index n, there is induced a phase difference of $\Delta n \cdot d(2\pi/\lambda)$ for the optical beam passing through each part of the liquid crystal cell, wherein $\Delta n$ represents the refractive index change for that part of the liquid crystal cell constituting the liquid crystal device while d represents the cell thickness.

Figure 19:
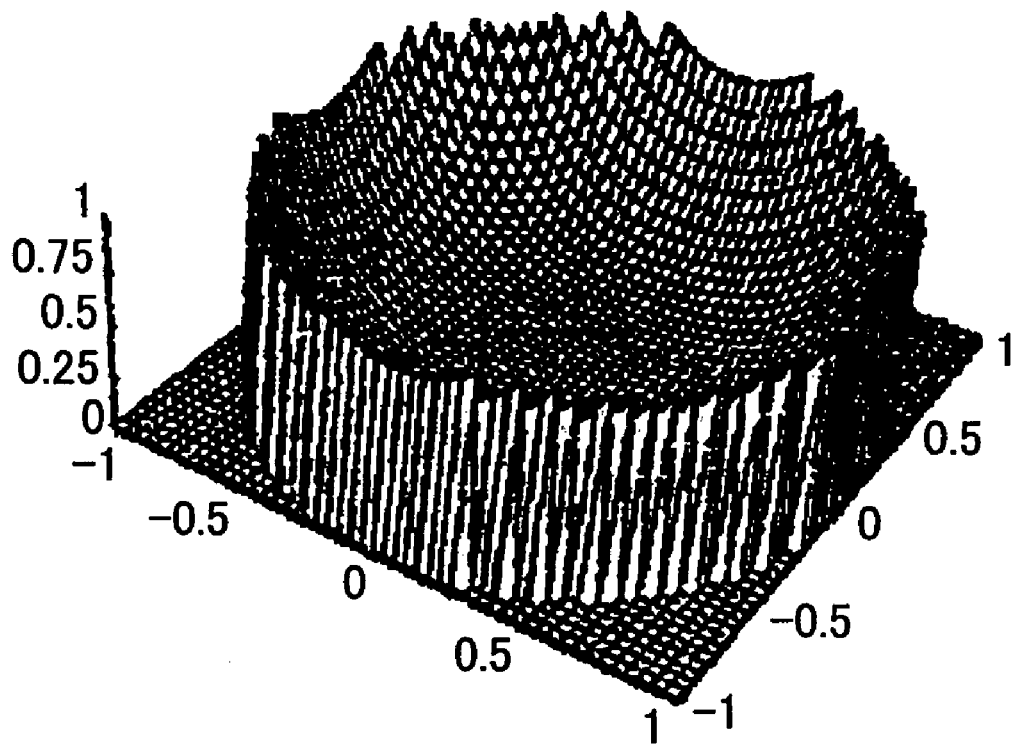
FIG. 19 is a diagram showing the spherical aberration caused as a result of difference of the wavelength of the used optical beam.

Consider now the case in which there is induced a spherical aberration shown in FIG. 19 as a result of the difference of wavelength of the optical beam.

Figure 20A:
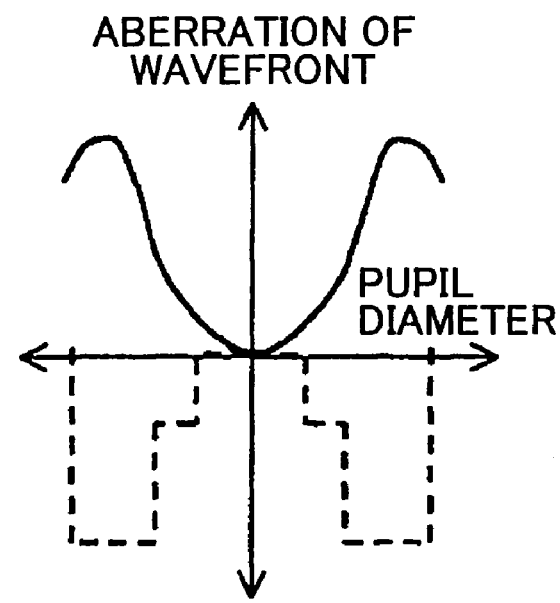
FIG. 20A is a diagram showing a wavefront of the spherical aberration (continuous line) and a phase shift pattern (broken line) in the form of a two-dimensional curve.

FIG. 20A shows the wavefront of the spherical aberration in the form of a two-dimensional curve by a continuous line. When a voltage is applied to the concentric electrodes of the liquid crystal cell such that there is provided a phase difference shown in FIG. 20A by a broken line in the optical beam incident to the objective lens from the optical source, it becomes possible to cancel out the foregoing aberration of wavefront as a result of the delay caused in the wavefront of the optical beam passing through the liquid crystal device.

Figure 20B:
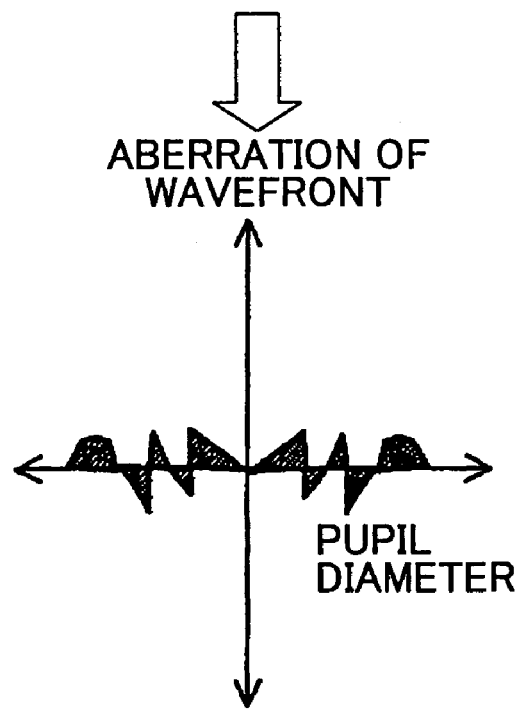
FIG. 20B is a diagram showing the wavefront after the correction of the aberration has been made.

FIG. 20B shows the sum of the wavefront aberration shown by the continuous line in FIG. 20A and the delay of the wavefront caused by the liquid crystal device shown in FIG.

20A by the broken line. In other words, FIG. 20B shows the wavefront after the foregoing phase correction by the liquid crystal device. As can be seen in FIG. 20B, the wavefront aberration is reduced significantly as compared with the original wavefront aberration shown by the continuous line in FIG. 20A.

In the phase compensation element 203c, it is further possible to compensate for the spherical aberration caused by a layer gap in the case of using a two-layer optical recording medium or the assembling error of the optical components in the optical pickup by adjusting the voltage applied to the liquid crystal device.

EXAMPLE 4

Figure 21:
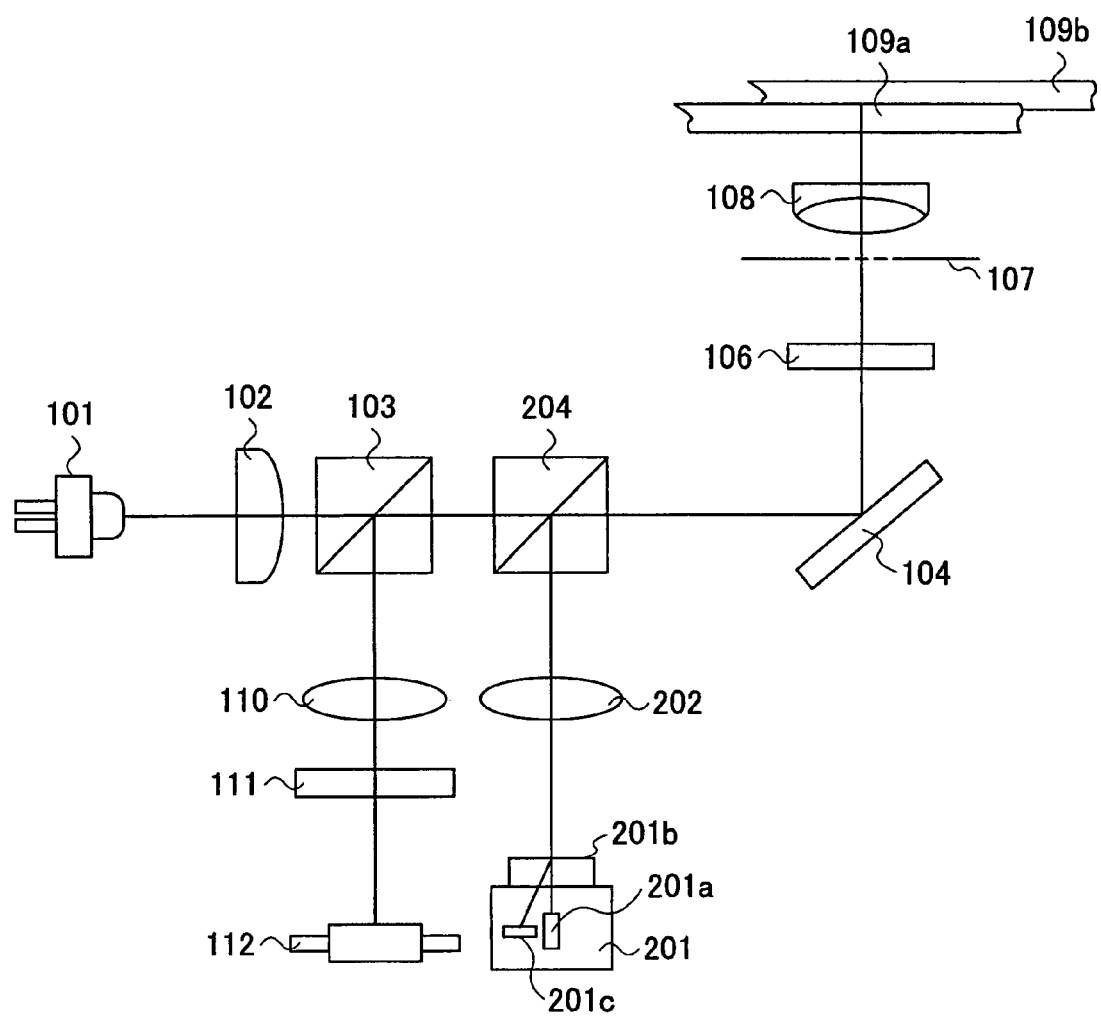
FIG. 21 is a diagram showing the general construction of an optical pickup according to Example 4 of the first embodiment of the present invention.
Figure 22A:
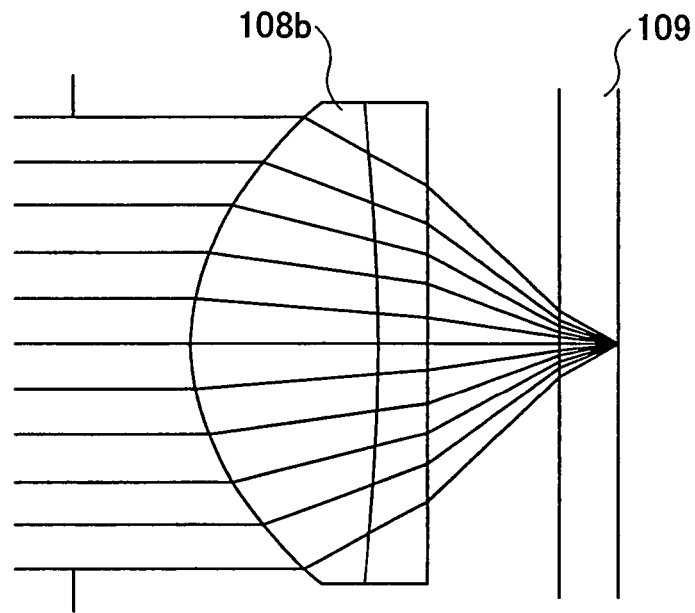
FIG. 22A is a diagram showing the focusing action of an optical beam by an optical system including a phase compensation element for the wavelength of 407 nm and an objective lens having a one group/two element construction.
Figure 22B:
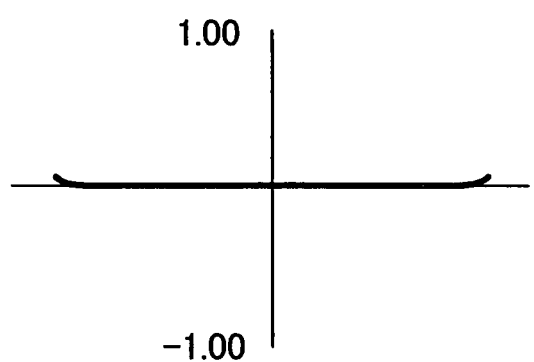
FIG. 22B is a diagram showing the spherical aberration caused in the optical system of FIG. 21A at the wavelength of 407 nm.
Figure 23A:
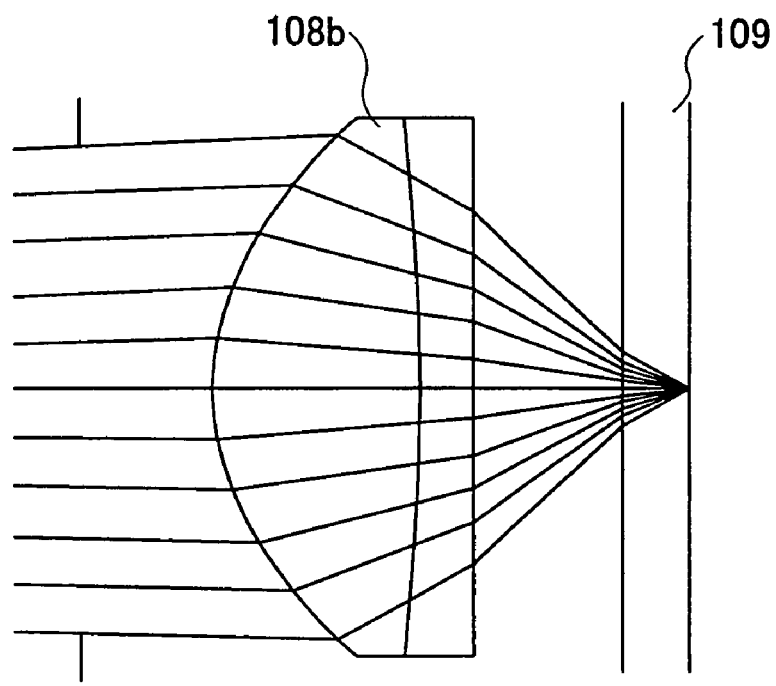
FIG. 23A is a diagram showing the focusing action of an optical beam by an optical system including a phase compensation element for the wavelength of 660 nm and an objective lens having a one group/two element construction.
Figure 23B:
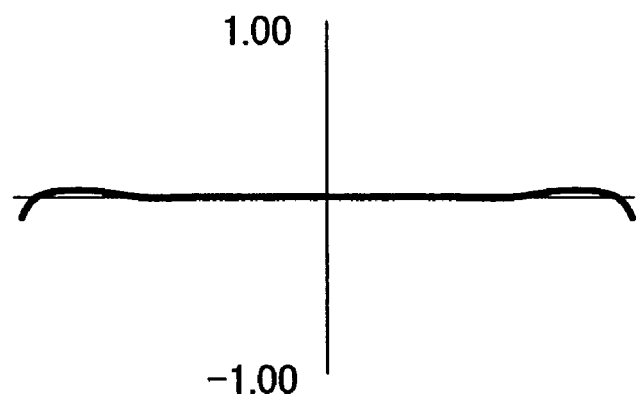
FIG. 23B is a diagram showing the spherical aberration caused in the optical system of FIG. 23A at the wavelength of 660 nm.
Figure 24:
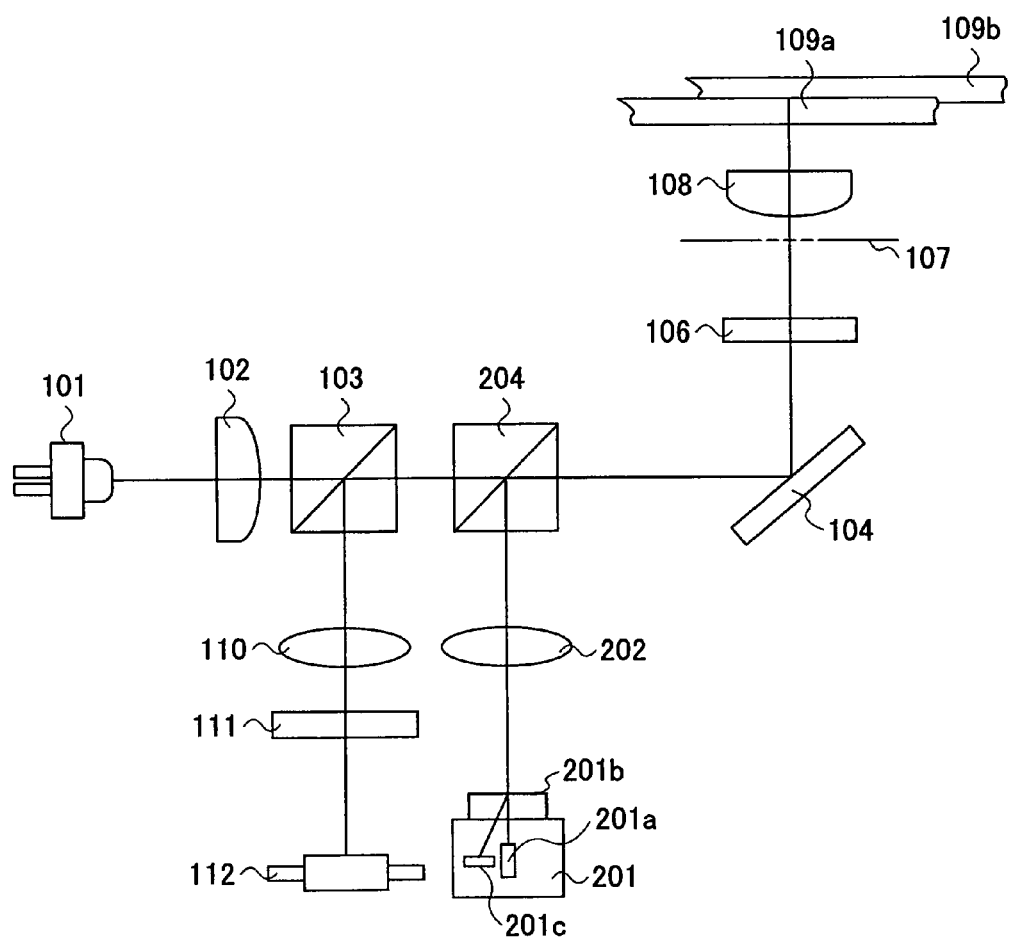
FIG. 24 is a diagram showing the general construction of an optical pickup according to Example 5 of the first embodiment of the present invention.

FIG. 21 is a diagram showing the schematic construction of an optical pickup according to Example 4 of the present embodiment.

Referring to FIG. 21, the optical pickup of Example 4 is an optical pickup capable of carrying out recording, playback or erasing of information to and from any of the blue optical recording medium by using the wavelength of 407 nm wavelength, numerical aperture value NA of 0.67 and the thickness of 0.6 nm for the substrate at the side where the optical irradiation is made and the DVD optical recording medium by using the red wavelength of 660 nm wavelength, numerical aperture value NA of 0.65 and the thickness of 0.6 nm for the substrate at the side where the optical irradiation is made.

The difference of the optical pickup of Example 4 over the optical pickup of Example 1, 2 or 3 s that the optical pickup of Example 4 suppresses the spherical aberration at the time of recording and playback of the DVD optical recording medium not by using the phase compensation element but by way of optimizing the objective lens. More specifically, Example 4 uses an objective lens 108b of one group/two element construction for the objective lens.

Generally, it is known that chromatic aberration can be reduced by bonding a lens of positive refraction power and a lens of a negative refraction power. In Example 4, a lens capable of compensating for the chromatic aberration in the wavelength band from the blue wavelength band to the red wavelength band is used.

Hereinafter, the actual numeric construction of the one group/two element objective lens used Example 4 with reference to FIGS. 22A, 22B and FIGS. 23A and 23B.

Referring to the drawings, the incident optical beam from the optical source (left side of FIGS. 22A and 23A) is passed through the aperture (beam diameter radius φ=4.03 mm) and is incident to the objective lens 108b, wherein the optical beam is focused upon a recording surface of the optical recording medium 109 after passing through the substrate to which the optical irradiation is made. It should be noted that the recording surface is provided coincident to the right surface of the optical recording medium 109.

Figure 4A:
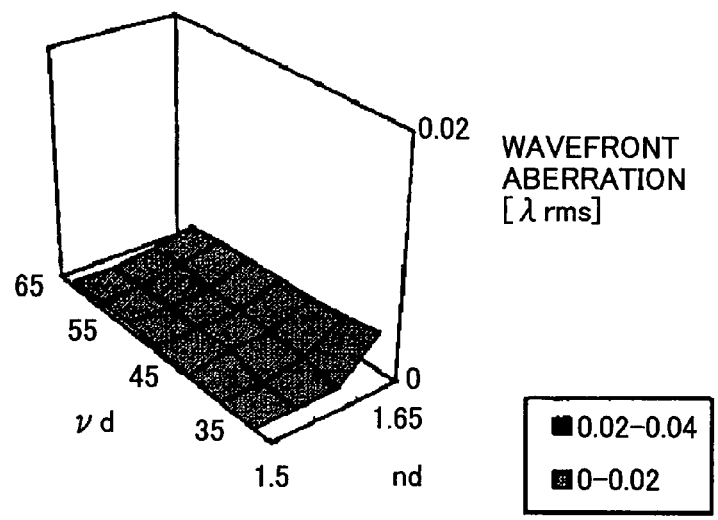
FIGS. 4A-4C are characteristic diagrams showing the distribution of wave-front aberration for various refractive index values and various the Abbe numbers for the case of a blue optical recording medium, DVD medium and CD medium.
Figure 4B:
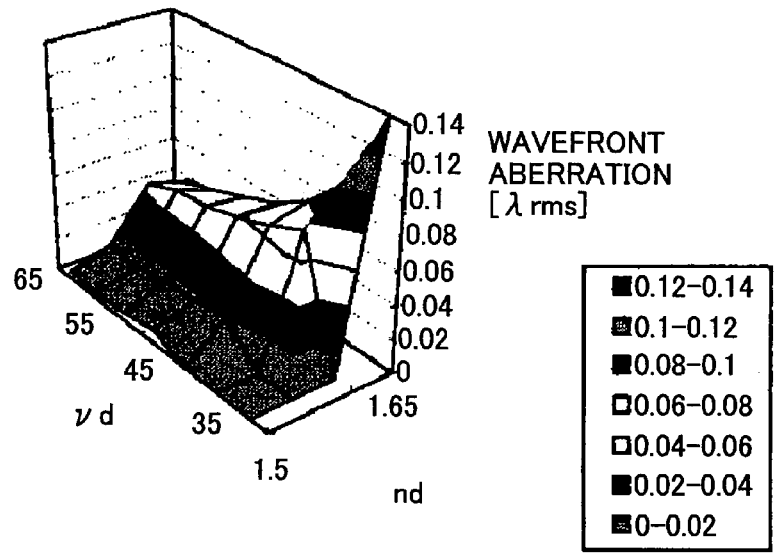
Figure 4C:
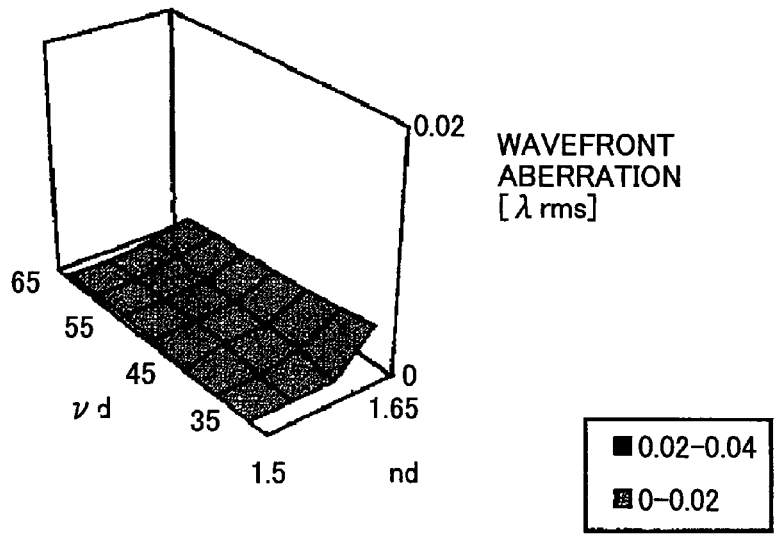
Figure 5:
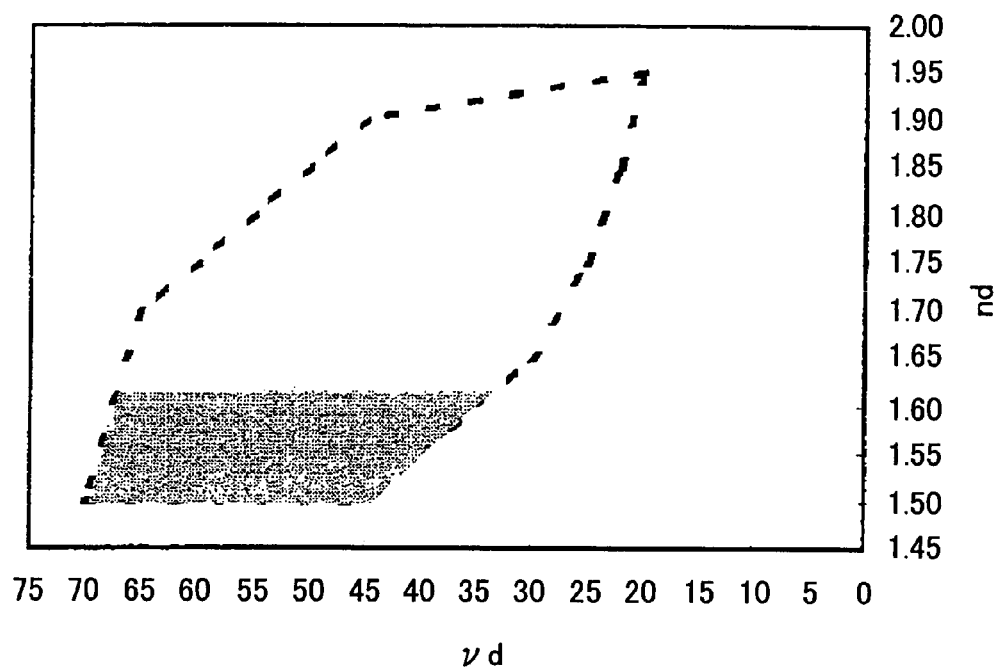
FIG. 5 is a characteristic diagram showing the constraint imposed on the glass composition from the relationship between the Abbe number and the refractive index.
Figure 6:
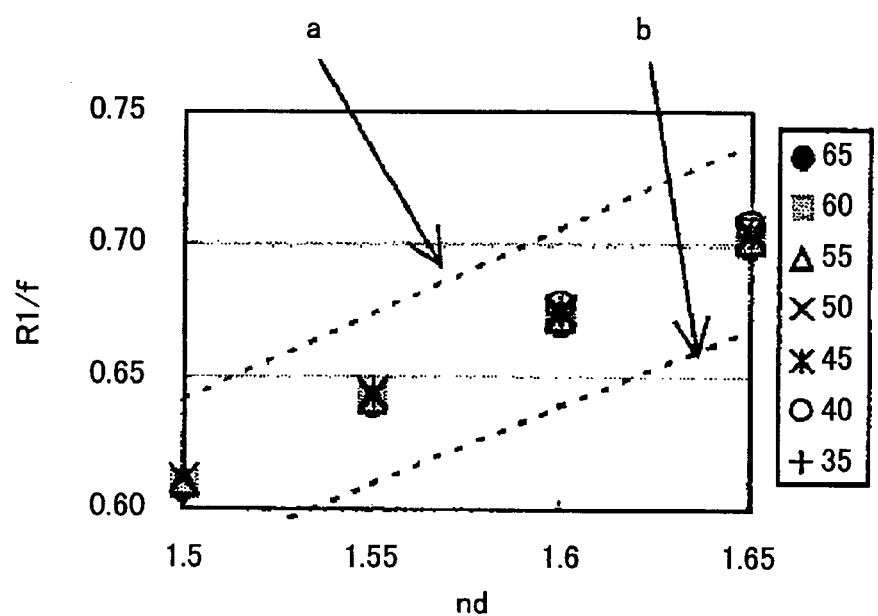
FIG. 6 is the characteristic diagram showing the relationship between the refractive index and a first surface curvature radius.

FIG. 4 shows the actual data for the case of using the blue wavelength band.

TABLE 4

| surface | RDY (curvature radius) | THI (thickness) | Glass (refractive index) |
|---|---|---|---|
| OBJ | INFINITY | 146.5 | |
| STO | INFINITY | 1.44 | |
| S2 | 2.31274 | 1.847986 | LAC8 (1.7364) |
| | K: −0.661400 | | |
| | A: 0.197340E−02 B: 0.756070E−04; | | |
| | C: 0.392551E−04; D: −.986201E−05 | | |
| S3 | −36.95971 | 0.615995 | EFD8 (1.7317) |
| S5 | −17.05615 | 1.232228 | |
| | K: −176.103564 | | |
| | A: 0.859781E−02; B: −1.87435E−02; | | |
| | C: −.171848E−03; D: 0.783833E−04 | | |
| S5 | INFINITY | 0.6 | PC (1.6202) |
| IMG | INFINITY | 0.0 | |
| EPD: (mm) | | 4.03 | |
| WL: (nm) | | 407 | |

The non-spherical surface of the lens is represented as $$X = (Y^2/R)/[1 + \sqrt{\{1-(1+K)Y/R^2\}} + AY^4 + BY^6 + CY^8 + DY^{10} + EY^{12} + FY^{14} + GY^{16} + HY^{18} + JY^{20} +$$ Eq. (1.6)

In Table 4, "OBJ" represents the object point (laser diode used for optical source). Because the objective lens forms the infinite optical system, "INFINITY" in the columns for the curvature radius RDY and the thickness THI means that the optical source is located at the infinite distance. Further, "STO" represents the single aperture, wherein it will be noted that the curvature radius thereof is designated as "INFINITY" in Table 4. The thickness of the single aperture is set to zero for the convenience of the design. Here, all the quantities having the dimension of length is represented by "mm".

S2 represents the lens surface of the objective lens at the side of the optical source, while "S3" represents the surface at which the two lenses are bonded and "S4" represents the surface of the same objective lens at the side of the optical recording medium. The separation between the surfaces S2 and S4 corresponds to the thickness of the lens having the value of 2.463981 mm, while the thickness 1.23228 mm at the right of the curvature radius of the column for S4 represents the "working distance".

Further, "S5 represents the surface of the optical recording medium 109 irradiated with the optical beam and hence located at the side of the optical source, while IMG represents the surface coincident to the recording surface. It will be noted that the distance between the surfaces S5 and IMG corresponds to the substrate thickness at the side where the optical radiation is made, wherein the substrate thickness is 0.6 mm and the refractive index n is 1.6202. Further, EPD: entrance pupil diameter represents the beam diameter (4.03 mm) of the incident optical beam, while WL: wavelength represents the wavelength (407 nm) used for the recording.

Table 5 represents the actual data for the case of using the red wavelength band.

TABLE 5

| surface | RDY (curvature radius) | THI (thickness) | Glass (refractive index) |
|---|---|---|---|
| OBJ | INFINITY | 156 | |
| STO | INFINITY | 1.44 | |
| S2 | 2.31274 | 1.847986 | LAC8 (1.7088) |
| | K: −0.661400 | | |
| | A: 0.197340E−02 B: 0.756070E−04; | | |
| | C: 0.392551E−04; D: −.986201E−05 | | |
| S3 | −36.95971 | 0.615995 | EFD8 (1.6822) |
| S5 | −17.05615 | 1.368239 | |
| | K: −176.103564 | | |
| | A: 0.859781E−02; B: −1.87435E−02; | | |
| | C: −.171848E−03; D: 0.783833E−04 | | |

TABLE 5-continued

| surface | RDY (curvature radius) | THI (thickness) | Glass (refractive index) |
|---|---|---|---|
| S5 | INFINITY | 0.6 | PC (1.5791) |
| IMG | INFINITY | 0.0 | |
| EPD: (mm) | | | 4.03 |
| WL: (nm) | | | 660 |

It should be noted that the shape of the objective lens 108b is identical with the case of Table 4. On the other hand, because a finite optical system is used, the THI of the OBJ is not infinity but is set to a finite distance of 156 mm. Further, the refractive index and working distance are different between the elements.

EXAMPLE 5

FIG. 21 shows the construction of an optical pickup according to Example 5 of the present embodiment.

It should be noted that the optical pickup according to Example 5 is used for carrying out recording, playback and erasing of information to and from any of the blue optical recording medium having the thickness of 0.6 mm at the side where irradiation of the optical beam is made by using a blue optical source of 407 nm wavelength with the numerical aperture value NA of 0.67 and a DVD optical recording medium having the thickness of 0.6 mm at the side where irradiation of the optical beam is made by using a blue optical source of 660 nm wavelength with the numerical aperture value NA of 0.65, similarly to the case of Example 1, wherein the optical pickup of Example 5 is different from the optical pickup of Examples 1-4 in the point that the function of the phase compensation element explained with Examples 1 and 2 is integrated with the objective lens.

Figure 25:
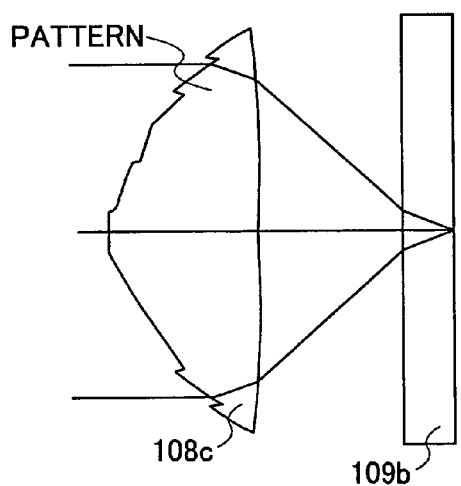
FIG. 25 is a diagram showing the construction of an objective lens carrying a phase pattern.

Thus, in Example 5, the spherical aberration caused when the optical beam of the 660 nm wavelength is passed through the substrate of the DVD recording medium having the thickness of 0.6 mm at the side where the optical irradiation is made, is suppressed by the phase pattern formed on an objective lens 108c as shown in FIG. 25, in place of using the phase compensation element 203a or 203b in combination with the objective lens 108 as shown in FIG. 7 or FIG. 15.

In the example of FIG. 25, a concentric pattern is formed about the optical axis on the lens surface of the objective lens at the side of the optical source, while the surface on which the foregoing pattern is formed is not limited to the lens surface at the side of the optical source. Thus, it is also possible to form such a concentric pattern on the lens surface at the side of the optical recording medium. Further, such a pattern may be formed on both of the lens surface at the side of the optical source and the optical recording medium.

Second Embodiment

Figure 26:
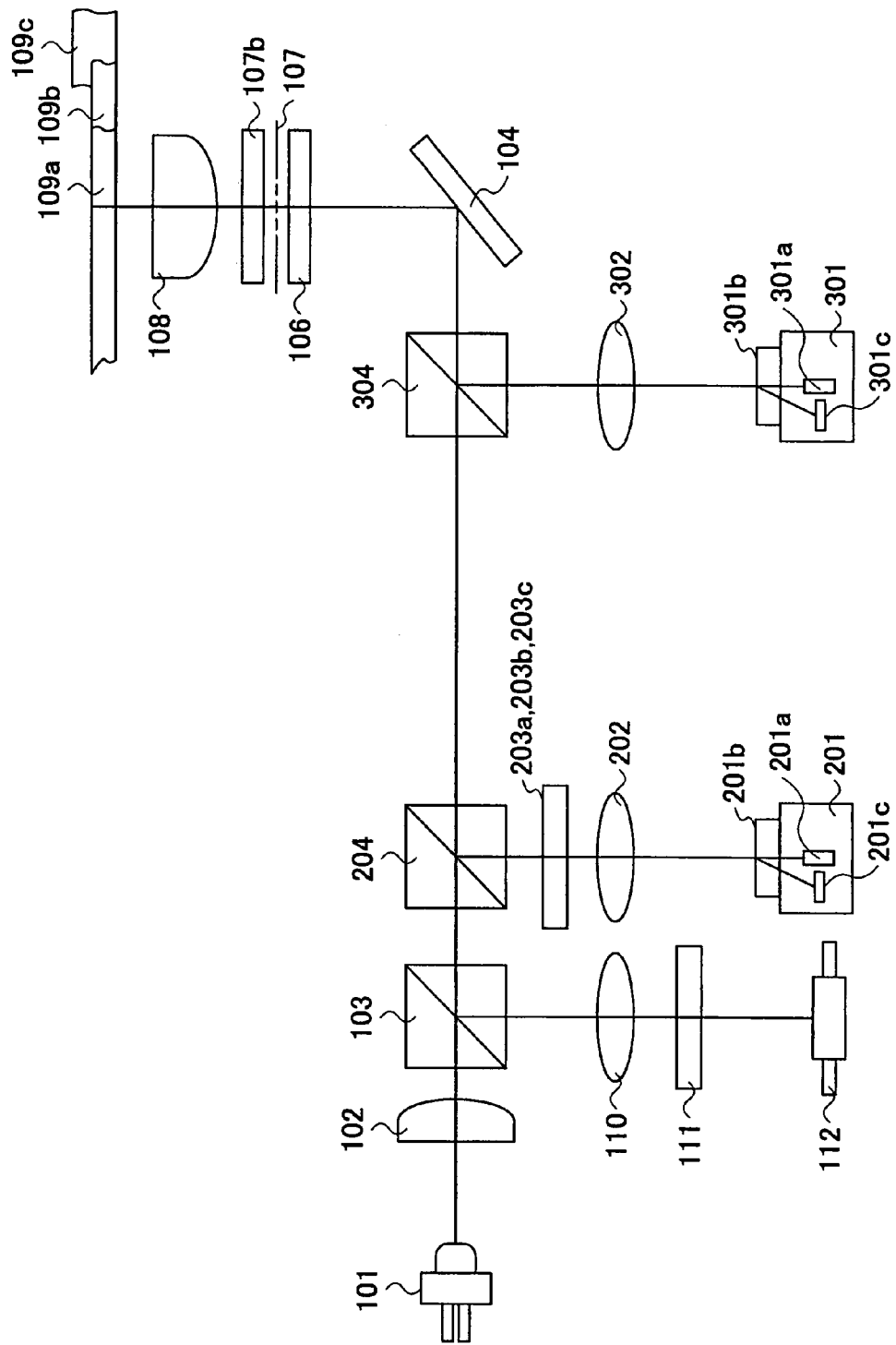
FIG. 26 is a diagram showing the general construction of an optical pickup according to a second embodiment of the present invention.

FIG. 26 is a diagram showing the general construction of an optical pickup capable of carrying out recording, playback and erasing of information to and from any of: a blue optical recording medium having a substrate thickness of 0.6 mm at the side where the irradiation of the optical beam of the 407 mm wavelength is made with the numerical aperture value of 0.67; a DVD optical recording medium having a substrate thickness of 0.6 mm at the side where the irradiation of the optical beam of the 660 mm wavelength is made with the numerical aperture value of 0.65; and a CD optical recording medium having a substrate thickness of 1.2 mm at the side where the irradiation of the optical beam of the 780 mm wavelength is made with the numerical aperture value of 0.50.

Referring to FIG. 26, the optical pickup includes a blue optical system similar to the one shown in FIG. 7 that includes the laser diode 101 oscillating at the wavelength of 407 nm, the collimator lens 102, the polarization beam splitter 103, the dichroic prism 204, the polarization prism 104, the quarter-wavelength plate 106, the single aperture 107, the objective lens 108, the detection lens 110, the beam splitter 111 and the photodetector 112, wherein the optical pickup of the present embodiment further includes a dichroic prism 304 and an aperture switching element 107b.

Further, the optical pickup includes a DVD optical system for the 660 nm wavelength similar to the one explained in FIG. 7 including the hologram unit 201, the coupling lens 202, the phase compensation element 203a (or 203b or 203c), the dichroic prisms 204 and 304, the quarter-wavelength plate 106, the single aperture 107, the aperture switching element 107b, and the objective lens 108.

Further, the optical pickup includes a CD optical system for the 780 nm wavelength including a hologram unit 301, a coupling lens 302, the dichroic prisms 304, the quarter-wavelength plate 106, the single aperture 107, the aperture switching element 107b, and the objective lens 108.

Thus, it will be noted that the dichroic prisms 204, 304, the polarization prism 104, the quarter wavelength plate 106, the single aperture 107, the aperture switching element 107b and the objective lens 108 are used commonly by the two or three optical systems.

Here, it should be noted that the objective lens 108 is designed so that eh spherical aberration is minimized when it is used for the blue optical recording medium having the substrate thickness of 0.6 mm at the side irradiated with the optical beam of the 407 nm for the case the optical beam is incident to the objective lens via an infinite optical system having a numerical aperture value NA of 0.65.

Further, it should be noted that the optical pickup cooperates with any of an optical recording medium 109a, an optical recording medium 109b and an optical recording medium 109c designed for different wavelengths, wherein the optical recording medium 109a is the blue optical recording medium having the substrate thickness of 0.6 mm, the optical recording medium 109b is the DVD optical recording medium having the substrate thickness of 0.6 mm, and the optical recording medium 109c is the CD optical recording medium having the substrate thickness of 1.2 mm. As the time of recording or playback, only one of the optical recording media 109a-109c is mounted on the rotating mechanism and rotated at high speed.

Hereinafter, explanation will be made for the case of carrying out recording, playback and erasing of information to or from a blue optical recording medium having the substrate thickness of 0.6 mm at the side where the irradiation by the optical beam having the wavelength of 407 nm is made while using the the numerical aperture value NA of 0.67 with reference to FIG. 26.

The optical beam emitted from the laser diode 101 oscillating at the wavelength of 407 nm in the form of a divergent beam having a linear polarization is shaped by the collimator lens 102 in the form of a parallel optical beam, wherein the parallel optical beam thus formed is passed through the polarization beam splitter 103 and the dichroic prisms 204 and 304 disposed along an optical path thereof consecutively, wherein the optical path of the optical beam thus passed through the polarization beam splitter 103 and the dichroic prisms 204 and 304 is deflected by 90 degrees by the polarization prism 104. Thereafter, the optical beam is passed through, the quarter-wavelength plate 106 and is converted to a circular polarization beam upon passage therethrough. Further, the optical beam is restricted by the single aperture 107 to the numerical aperture value NA of 0.67 and is incident to the objective lens 108, wherein the objective lens 108 focuses the optical beam on the optical recording medium 109a in the form of a minute beam spot. With this beam spot, the playback, recording or erasing of information is achieved.

The optical beam reflected back from the optical recording medium 109a forms a circular polarized beam opposite having an opposite rotating direction to the optical beam incident to the optical recording medium 109a and is shaped by the objective lens 108 in the form of a parallel optical beam. The parallel optical beam thus shaped travels in the opposite direction and passes through the foregoing quarter-wavelength plate 106 in the opposite direction. Thereby, the optical beam is converted to a linear polarized beam having a polarization plane perpendicular to the polarization plane of the optical beam traveling to the optical recording medium, wherein the optical beam is reflected by the polarization optical beam splitter to the detection lens 110. Thereby, the optical beam is converged by the detection lens 110 and is divided into plural paths leading to the photodetection element 112. Thereby, the photodetection element 112 detects an aberration signal, information signal and the servo signal from the optical beam thus focused thereon.

Next, explanation will be made for the case of carrying out recording, playback and erasing of information to or from a DVD optical recording medium having the substrate thickness of 0.6 mm at the side where the irradiation by the optical beam having the wavelength of 660 nm is made while using the numerical aperture value NA of 0.65.

Today, a DVD pickup generally uses a hologram unit 201 having a construction in which a light emitting device and a photodetection device are accommodated in a single. Thereby, separation of the optical beam is made by using a hologram.

Thus, as explained with reference to the first embodiment, the hologram unit 201 has a construction in which a laser diode chip 201a, a hologram 201b and a photodetection device 201c are integrated.

The optical beam having the wavelength of 660 nm emitted from the laser diode 201a is caused to pass through the hologram 201b and is converted to a predetermined divergent beam of a finite optical system by the coupling lens 202.

The optical beam thus processed is added with a predetermined spherical aberration by the phase compensation element 203a as will be described later and is reflected toward the deflection prism 104 by the dichroic prism 204, wherein the dichroic prism 204 passes an optical beam of blue wavelength band therethrough while causes reflection in an optical beam of red wavelength band.

The optical beam thus incident to the deflection prism 104 is deflected by the angle of 90 degrees and is passed through the ¼ wavelength. plate 106, and the optical beam is converted to a circular polarized optical beam upon passage through the ¼ wavelength plate 106.

Thereafter, the optical beam is restricted to the numerical aperture value NA of 0.65 by the single aperture 107 and is incident to the objective lens 108. The objective lens 108, in turn, focuses the optical beam upon the optical recording medium 109b in the form of a minute beam spot, and playback, recording or erasing of information is achieved with this beam spot.

The optical beam reflected from the optical recording medium 109b is then deflected by the deflection prism 104 and is reflected by the dichroic prism 204. Further, the optical beam thus reflected is converted to a converging beam by the coupling lens 202 and is directed to the photodetection device 201c inside the can that also accommodates the laser diode 201a by way of diffraction caused by the hologram 201b. Thereby, the photodetection device 201c detects the aberration signal, information signal and the servo signal.

It should be noted that the phase compensation elements 203a, 203b and 203c explained with reference to Examples 1-3 of the first embodiment of the present invention is applicable also to the present embodiment. Further, it is possible to carry out the compensation of the aberration by the objective lens 108b or 108c in place of using the phase compensation element 203a or 203b similarly to Examples 4 and 5 of the first embodiment explained with reference to FIG. 15 or 18.

Further, explanation will be made for the case of carrying out recording, playback and erasing of information to or from a CD optical recording medium having the substrate thickness of 1.2 mm at the side where the irradiation by the optical beam having the wavelength of 780 nm is made while using the numerical aperture value NA of 0.50.

Similarly to the case of DVD, a CD pickup generally uses a hologram unit 201 having a construction in which a light emitting device and a photodetection device are accommodated in a single. Thereby, separation of the optical beam is made by using a hologram.

Thus, similarly to the hologram unit 201 explained above, there is constructed a hologram unit 301 in which a laser diode chip 301a, a hologram 301b and a photodetection device 301c are integrated.

The optical beam having the wavelength of 780 nm emitted from the laser diode 301a of the hologram unit 301 is caused to pass through the hologram 301b and is converted to a predetermined divergent beam of a finite optical system by the coupling lens 302.

The optical beam thus processed is reflected toward the deflection prism 104 by the dichroic prism 304, wherein the dichroic prism 304 passes an optical beam of blue and red wavelength band therethrough while causes reflection in an optical beam of infrared wavelength band.

The optical beam thus incident to the deflection prism 104 is deflected by the angle of 90 degrees and is passed through the ¼ wavelength plate 106, and the optical beam is converted to an elliptical a circular polarized optical beam upon passage through the ¼ wavelength plate 106.

Thereafter, the optical beam is restricted to the numerical aperture value NA of 0.50 by the single aperture 107 and is incident to the objective lens 108. The objective lens 108, in turn, focuses the optical beam upon the optical recording medium 109c in the form of a minute beam spot, and playback, recording or erasing of information is achieved with this beam spot.

The optical beam reflected from the optical recording medium 109b is then deflected by the deflection prism 104 and is reflected by the dichroic prism 304. Further, the optical beam thus reflected is converted to a converging beam by the coupling lens 302 and is directed to the photodetection device 301c. Thereby, the photodetection device 301c detects the aberration signal, information signal and the servo signal.

Thus, the optical pickup according to the second embodiment of the present invention is a so-called three-generation optical pickup having three optical sources, one for the blue wavelength band, one for the DVD wavelength band and one for the infrared wavelength band.

In the optical pickup of the present embodiment, the desired three-generation compatibility is achieved by providing the aperture switching element 107b. On the other hand, it should be noted that the present embodiment uses the construction that uses the same aperture for the blue optical recording technology and the DVD technology when achieving the foregoing three-generation compatibility. Thereby, it becomes possible with the present embodiment to use the conventional three-step aperture switching technology used in the conventional DVD/CD compatible optical system also in the three-generation compatible optical system. It should be noted that the aperture switching element 107b may be the one that uses any of reflection, diffraction or absorption when carrying out the switching of the optical beam diameter in response to the wavelength band or polarization direction.

Further, according to the present embodiment, the three-generation compatibility is achieved by an optical pickup comprising:

a first optical source producing a first optical beam with a wavelength λ1;

a second optical source producing a second optical beam with a wavelength λ2;

a third optical source producing a third optical beam with a wavelength λ3 (λ1<λ2<λ3); and a single objective lens focusing any of said first through third optical beams to an optical recording medium, said first optical beam is incident to said objective lens in the form of a parallel optical beam when said first optical source is activated, said second optical beam and said third optical beam is incident to said objective lens in the form of a divergent optical beam when any of said second and third optical sources is activated, wherein there is provided an aperture switching element providing a first beam diameter φ1 when any of said first and second optical beams is passed therethrough and a second beam diameter φ2 (φ1>φ2) when said third optical beam is passed therethrough, such that said aperture switching element is disposed at a distance t from a principal point of said objective lens at a side away from said optical recording medium given as $$t = L - NA1 \cdot f / \tan(a\sin(NA2obj))$$ Eq. (1.7)

where f represents the focal distance of the objective lens, NA1 represents the numerical aperture value at the side of the image plane when the first optical source is turned on, NA2obj represents the numerical aperture value at the side away from the optical recording medium when the second optical source is turned on, and L represents the object distance for the case the second optical source is turned on.

With this, a three-generation compatibility between the blue optical recording technology, DVD technology and CD technology can be achieved by using a two-step aperture switching element, not a three-step aperture switching element.

For the aperture switching element of the present embodiment, it is possible to use the means for switching the beam diameter depending on the wavelength of the optical beam emitted from the optical source by reflection as represented in FIGS. 27A-27C.

More specifically, it is possible to use a dielectric optical multilayer film 107bf having wavelength selectivity for this purpose.

Referring to FIGS. 27A-27C, the aperture switching element 107b shows high transmissivity for any of the blue wavelength band, red wavelength band and infrared wavelength band at the central region φ2 where the dielectric optical multilayer film 107bf is not provided. On the other hand, the circumference region (outside of the central region φ2 shows high transmissivity for only the optical beam of the blue wavelength band and the red optical wavelength band while low transmissivity for the optical beam of the infrared wavelength band.

Similarly to the first embodiment, the optical beam of the blue wavelength band or red wavelength band is restricted to have the beam diameter of φ1 or less by the aperture (single aperture) formed on the actuator of the objective lens. Further, it is possible to restrict the optical beam of the blue wavelength band or red wavelength band by providing an opaque means such as rough surface on the surface of the aperture switching element.

As the aperture switching element of the present embodiment, it is also possible to provide the beam diameter by diffraction as shown in FIGS. 28A-28C. More specifically, it is possible to provide a diffraction grating 107bd having a wavelength selectivity for this purpose.

Referring to FIGS. 28A-28C, the aperture switching element 107 has a high transmissivity for any of the blue wavelength band, red wavelength band and infrared wavelength band at the central region having the diameter φ2 where there is formed no diffraction grating 107bd. In the region outside the central part φ2, the diffraction grating 107bd does not work on the blue and red wavelength beam and only the red wavelength beam experiences diffraction.

Similarly to the first embodiment, the optical beam of the blue wavelength band and the red wavelength band is restricted to have the beam diameter φ1 by the aperture (single aperture) formed on the objective lens actuator.

Further, it is possible to switch the optical beam diameter according to the wavelength of the optical beam emitted from the optical source by absorption as shown in FIGS. 29A-29C, wherein it will be noted that there is provided a selective absorption element 107ba on the aperture switching element 107b in the construction of FIGS. 29A-29C.

Heretofore, explanation has been made on the aperture switching element for switching the beam diameter depending on the wavelength, while the present invention is not limited to such a specific embodiment but other construction may be used. For example, it is possible to use the polarization of the optical beam. In this case, the optical source for the red wavelength and the optical source for the infrared wavelength are disposed so that the polarization directions cross with each other. Thereby, the switching of the aperture is achieved according to the mutually perpendicular polarization directions.

Further, it is possible to provide the means for restricting the beam diameter to φ2 in the infrared wavelength band as provided to the aperture switching element also on the objective lens surface. In this case, it is possible to eliminate the aperture switching element similarly to the first embodiment of the present invention. As the means for restricting the beam diameter, it is possible to provide a coating of thin film causing reflection or absorption as explained before. Alternatively, it is possible to provide a diffraction pattern.

Figure 30A:
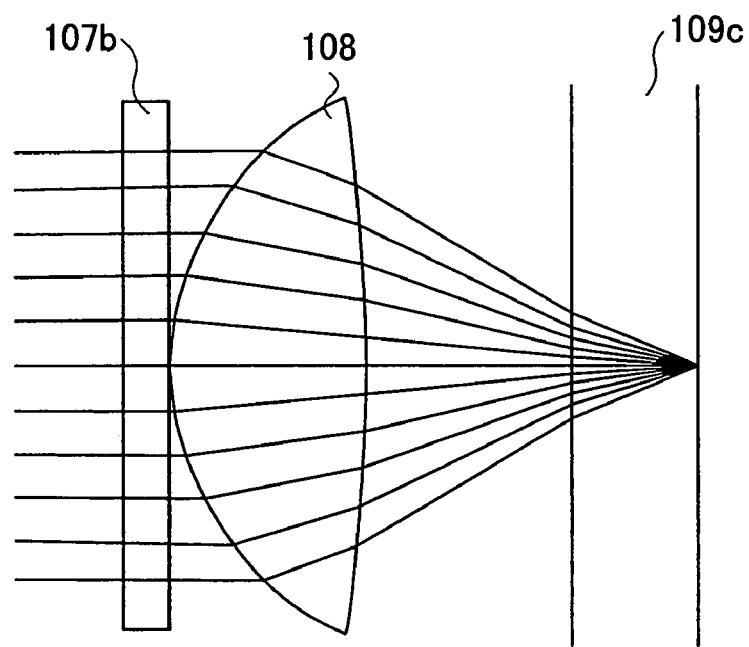

Next, explanation will be made on the finite construction of the CD optical system with reference to FIG. 30A and Table 6, wherein it should be noted that Table 6 shows the numerical parameters of the CD optical system and the optical performance at the wavelength of 780 nm.

Referring to Table 6, the objective lens has the same shape as that of the objective lens of Table 1, while it will be noted that the refractive index, working distance and the aperture diameter are changed. Further, a finite optical system is used for the CD optical system for minimizing the spherical aberration.

TABLE 6

| surface | RDY (curvature radius) | THI (thickness) | glass refractive index |
|---|---|---|---|
| OBJ | INFINITY | 52.26 | |
| STO | INFINITY | 1.44 | |
| S2 | 2.01507 | 1.700000 | BaCD5 (1.5825) |
| | K: −0.674258 | | |
| | A: 0.364557E−02 B: 0.410494E−04; | | |
| | C: 0.915925E−04; D: −.4445481E−04 | | |
| S3 | −14.62096 | 1.546207 | |
| | K: 69.056492 | | |
| | A: 0.132534E−02; B: −.410601E−02; | | |
| | C: 0.595437E−03; D: −.200993E−04 | | |
| S4 | INFINITY | 1.2 | PC (1.5728) |
| IMG | INFINITY | 0.0 | |
| EPD: (mm) | | 3.14 | |
| WL: (nm) | | 780 | |

As represented in Table 6, an optimum wavefront is achieved by setting the object distance (the distance from OBJ to S3) to 53.7 mm. In the actual construction, reduction of the optical path length is achieved by interposing a coupling lens 302 to the optical path between the optical source and the objective lens as shown in the construction of FIG. 23.

Figure 30B:
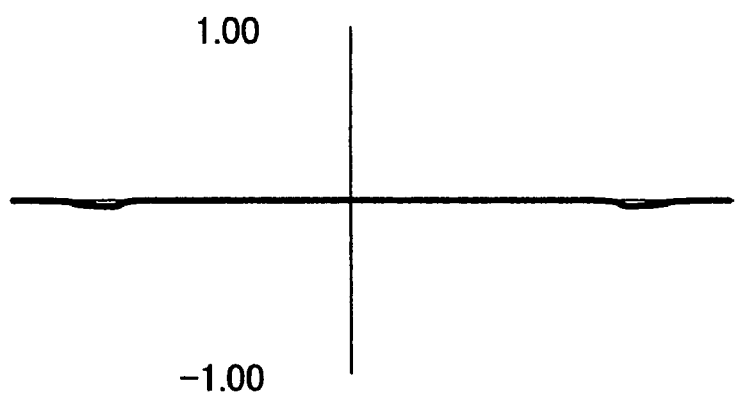
FIG. 30B shows the aberration caused in the optical system of FIG. 30A at the wavelength of 780 nm.

FIG. 30B shows the wavefront aberration at the wavelength of 780 nm, wherein the horizontal axis represents the height from the optical axis while the vertical axis represents the wavefront aberration. In the state of FIG. 30B, the RMS value of the wavefront is 0.006 λrms, while this value satisfies the condition of 0.030 λrms imposed from the viewpoint of actual use. Thus, excellent spot formation is achieved.

In the present embodiment, the optimum wavefront is achieved for the optical system of CD by using the finite construction, while the optimum wavefront is achieved also for the DVD optical path by using the aberration compensation element shown in Examples 1-5 of the first embodiment.

Figure 31A:
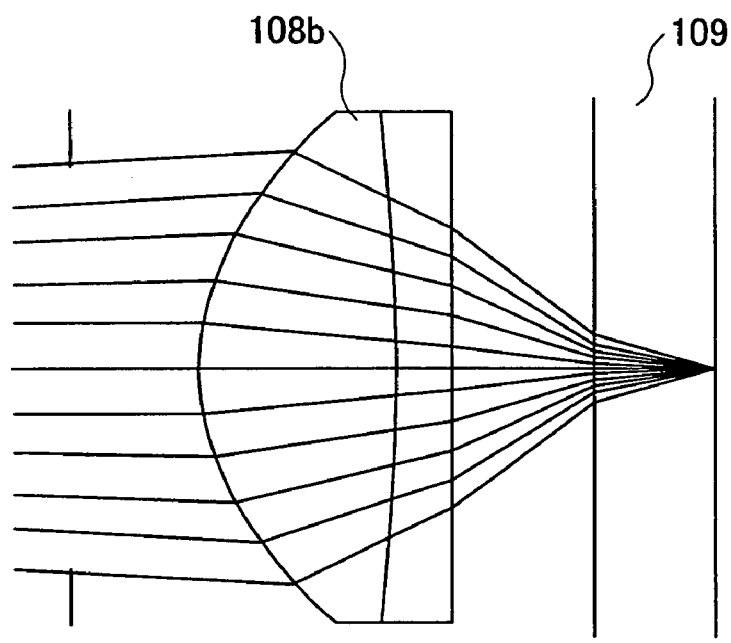
Figure 31B:
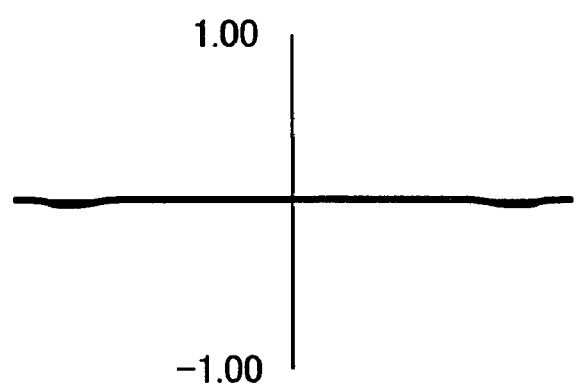
FIG. 31B shows the spherical aberration caused in the optical system of FIG. 31A at the wavelength of 780 nm.

It should be noted that the one group/two element construction used in Example 4 of the first embodiment is applicable also to the CD optical path as showing in FIG. 31A and Table 7.

TABLE 7

| surface | RDY (curvature radius) | THI (thickness) | glass (refractive index) |
|---|---|---|---|
| OBJ | INFINITY | INFINITY | |
| STO | INFINITY | 0.0 | |
| S2 | 2.31274 | 1.847986 | LAC8 (1.7040) |
| | K: −0.661400 | | |
| | A: 0.197340E−02; B: 0.756070E−04; | | |
| | C: 0.392551E−04; D: −.986201E−05 | | |
| S3 | −36.95971 | 0.615995 | EFD8 (1.6750) |
| S5 | −17.05615 | 1.204793 | |
| | K: −176.103564 | | |
| | A: 0.859781E−02; B: −1.87435E−02; | | |
| | C: −.171848E−03; D: 0.783833E−04 | | |
| S5 | INFINITY | 1.2 | PC (1.5728) |
| IMG | INFINITY | 0.0 | |
| EPD: (mm) | | 3.14 | |
| WL: (nm) | | 780 | |

Third Embodiment

Figure 32:
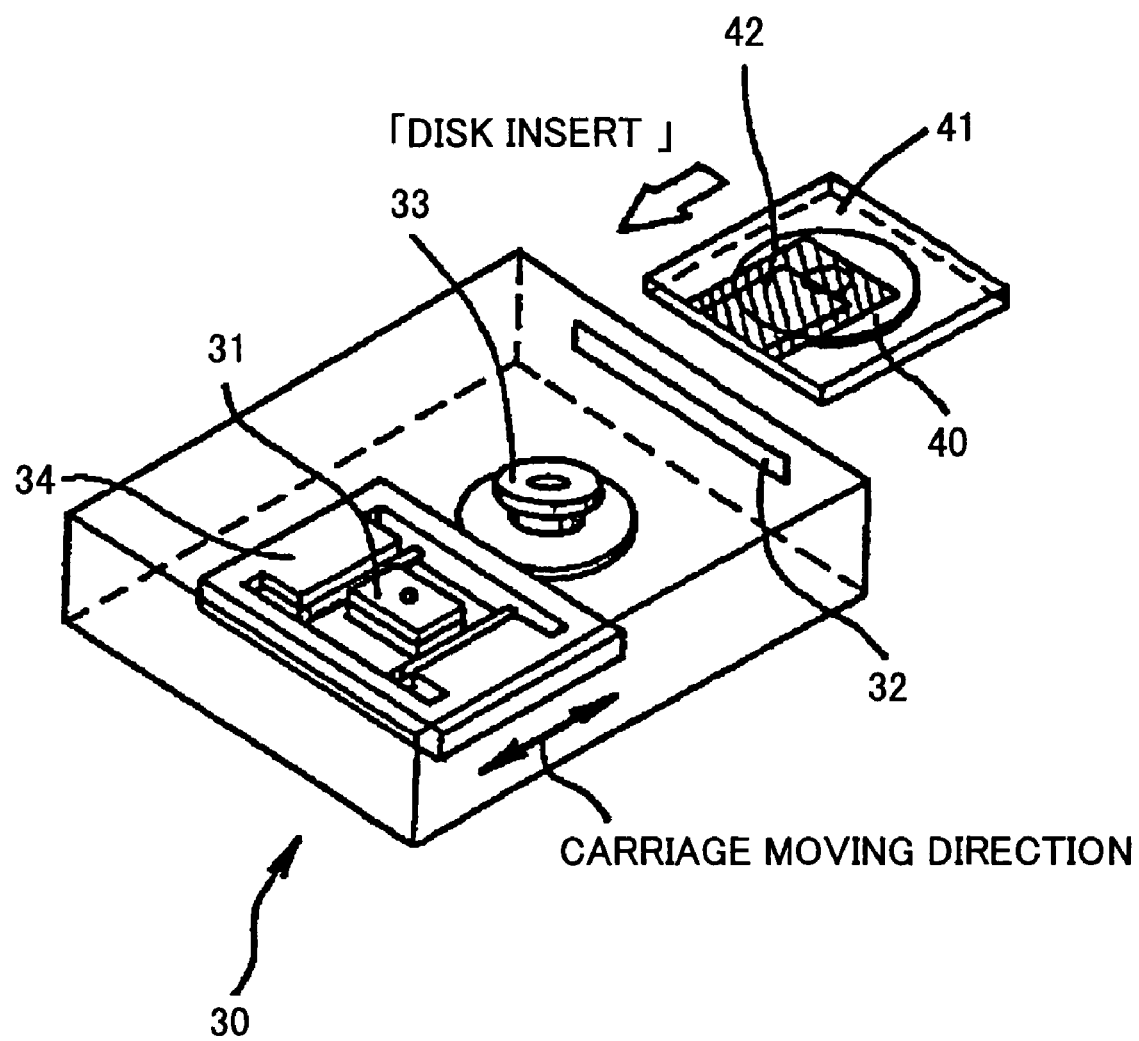
FIG. 32 is an oblique view diagram showing the general construction of an optical recording and playback apparatus according to a third embodiment of the present invention.

FIG. 32 is a diagram showing an information recording apparatus 30 realized by the optical information processing apparatus according to a third embodiment of the present invention.

Referring to FIG. 32, the information recording apparatus 30 is an apparatus carrying out at least one of recording, playback and erasing of information to and from an optical recording medium by using an optical pickup 31.

In the present embodiment, it should be noted that the optical recording medium 40 is implemented in the form of a disk accommodated in a cartridge 41 or protective case. Thus, the optical recording medium 40 is loaded to the information recording apparatus 30 by inserting the disk 40 into an insertion opening 32 of the information recording apparatus 30 in the direction of an arrow together with the cartridge 41. The disk 40 thus loaded is rotated by a spindle motor 33, and recording, playback or erasing of information is achieved by the optical pickup 31.

For such the optical pickup 31, it is possible to use the optical pickup described in first or second embodiment of the present invention. Further, any of the blue optical recording medium red optical recording medium or infrared optical recording medium can be used for the optical disk 40 when carrying out any of recording, playback or erasing of the information.

According to the present embodiment, it becomes possible to achieve the two-generation compatibility between blue/DVD technologies without using an aperture switching element. Further, it becomes possible to achieve the three-generation compatibility between blue/DVD/CD technologies while using the two-step aperture switching element, not the three-step aperture switching element. With this, it becomes possible to achieve multiple-generation compatibility with simple construction. Further, by using a static or dynamic phase compensation element or by optimizing the construction of the objective lens, it becomes possible to secure a satisfactory beam spot performance when carrying out recording or playback of DVD or CD. Thereby, a high S/N optical pickup compatible with plural generations of optical recording technologies and an optical information processing apparatus using such an optical pickup are obtained.

Fourth Embodiment

Hereinafter, an objective lens according to a fourth embodiment of the present invention will be described with reference to FIGS. 33A-33C and FIG. 34. While the description hereinafter will be made for the case of achieving three-generation compatibility between the blue/DVD/CD technologies, it is also applicable for achieving two-generation compatibility between blue/DVD technologies or blue/CD technologies.

It should be noted that the present embodiment relates to an objective lens used in an optical pickup carrying out any of recording, playback and erasing to and from any of: a blue optical recording medium having a substrate thickness of 0.6 mm and designed for use with the wavelength $\lambda 1$ of 405 nm and the numerical aperture value NA of 0.65; a DVD recording medium having a substrate thickness of 0.6 mm and designed for use with the wavelength $\lambda 2$ of 660 nm and the numerical aperture value NA of 0.65; and a CD recording medium having a substrate thickness of 1.2 mm and designed for use with the wavelength $\lambda 3$ of 785 nm and the numerical aperture value NA of 0.50.

First, the optical performance of an objective lens 2A will be explained for the case when it is used with the blue recording medium 1a designed for the wavelength $\lambda 1$ of 405 nm with reference to FIG. 33A and Table 8A. The objective lens 2A of the present embodiment has the numerical aperture value NA of 0.65, the focal distance f of 3.05 mm, the refractive index nd of a D-line of 1.50 and the Abbe number vd of 60 and is formed of a glass (500,000.600000).

Further, the objective lens 2A of the present embodiment has its non-spherical surface described in terms of the coordinate X in the optical axis direction, the coordinate Y in the direction perpendicular to the optical axis, the paraxial curvature radius R, conical constant K, and higher order coefficients A, B, C, D, E, F, ... according to the known relationship of $$X=(Y^2/R)\cdot[1+\sqrt{\{1-(1+K)Y/R^2\}}+AY^4+BY^6+CY^8+DY^{10}+EY^{12}+FY^{14}+GY^{16}+HY^{18}+JY^{20}+\ldots$$

Table 8A shows exemplary data, wherein "OBJ" represents the object point (laser diode used for optical source). Because the objective lens 108 forms the infinite optical system, "INFINITY" for the curvature radius RDY and the thickness THI means that the optical source is located at the infinite distance. Further, "STO" represents the incident pupil surface of which curvature radius is designated as "INFINITY" in Table 8A and the thickness thereof is set to zero for the convenience of the design. Here, all the quantities having the dimension of length is represented by "mm".

S2 represents the lens surface of the objective lens 108 at the side of the optical source, while "S3" represents the lens surface of the same objective lens 108 at the side of the optical recording medium. The objective lens 108 has a thickness of 1.85 mm, and the thickness value "1.651193 mm" at the right of "curvature radius" in the column for S3 represents the "working distance". Further, "S4" represents the surface of the optical recording medium 109a irradiated with the optical beam and hence located at the side of the optical source, while IMG represents the surface coincident to the recording surface. It will be noted that the distance between the surfaces S4 and IMG corresponds to the substrate thickness at the side where the optical radiation is made, wherein the substrate thickness is 0.6 mm and the refractive index n is 1.62.

Further, EPD: entrance pupil diameter represents the beam diameter (3.965 mm) of the incident optical beam, while WL: wavelength represents the wavelength (405 nm) used for the recording. In the representation of the non-spherical coefficients, the representation such as D:0.306790E-05 means D=0.306790×10$^{-5}$.

Further, it should be noted that the objective lens 2A of the present invention satisfies the conditions $$vd>35 \quad (2.1)$$

$$1.58>nd \quad (2.2)$$

$$0.58nd-0.29 \leq R1/f \leq 0.62nd-0.31 \quad (2.3)$$

Next, explanation will be made for the case of using the objective lens with a DVD medium 1b designed for the wavelength of 660 nm will be explained with reference to FIG. 33B and Table 8B.

Figure 33A:
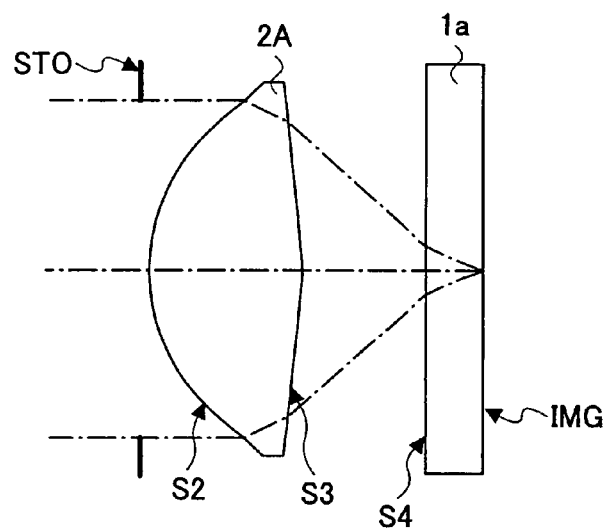
FIGS. 33A-33C are diagrams showing an objective lens according to a fourth embodiment of the present invention.
Figure 33B:
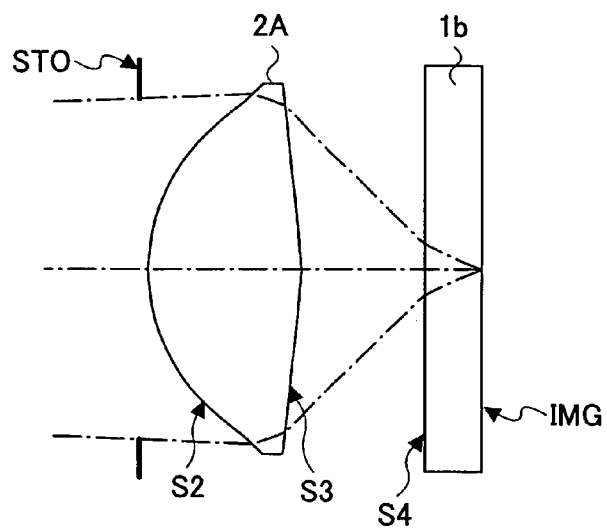

Referring to FIG. 33B and Table 8B, the shape of the objective lens 2A is the same as that of Table 8A, while the refractive index and the working distance are different. Further, the DVD medium 1b is used with a finite optical system in which the optical beam is incident to the objective lens in the form of a divergent beam, and thus, the distance between the object point OBJ (laser diode used for the optical source) and the single aperture of the first surface STO is set to 137 mm, while it should be noted that this value is chosen for minimizing the wavelength aberration.

Next, the case of using the objective lens with the CD medium 1c designed for the wavelength of 785 nm will be explained with reference to FIG. 33C and Table 8C.

Figure 33C:
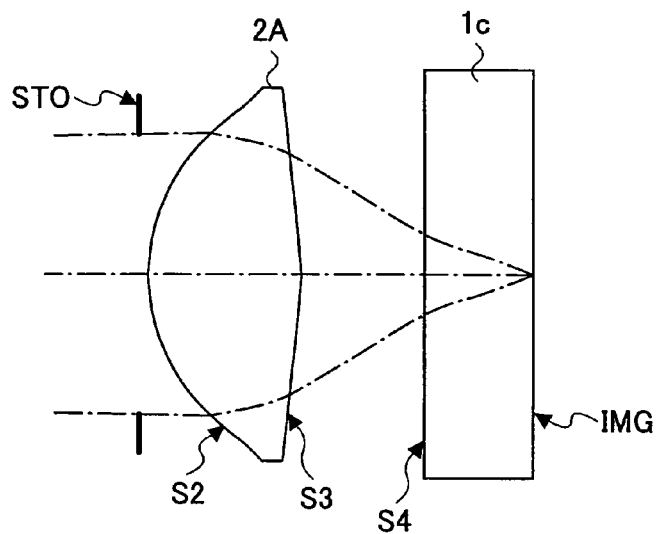

Referring to FIG. 33C and Table 8C, the shape of the objective lens 2A is identical with the case of FIG. 33A and Table 8A, while it will be noted that the refractive index, working distance and the substrate thickness at the side where the optical irradiation is made are different. Further, the CD medium 1c is used with a finite optical system in which the optical beam is incident to the objective lens in the form of a divergent beam, and the distance from the object point OBJ (laser diode used for the optical source) to the single aperture in the first surface STO is set to 45.0 mm. It should be noted that this value is chosen for minimizing the wavefront aberration similarly to the case of DVD.

TABLE 8A

| Surface | RDY (curvature radius) | THI (thickness) | glass (refractive index) |
|---|---|---|---|
| OBJ | INFINITY | INFINITY | |
| STO | INFINITY | 0.0 | |
| S2 | 1.85765 | 1.85 | 500000.600000 (1.514) |
| | K: −0.677487 | | |
| | A: 0.273561E−02 B: 0.386515E−03; C: 0.536182E−04; D: 0.306790E−05 | | |
| S3 | −6.68963 | 1.651193 | |
| | K: −10.002091 | | |
| | A: 0.138585E−01; B: −.255540E−02; C: 0.277769E−03; D: −.140136E−04 | | |
| S4 | INFINITY | 0.6 | PC (1.621) |
| IMG | INFINITY | 0.0 | |
| EPD: (mm) | | | 3.965 |
| WL: (nm) | | | 405 |

TABLE 8B

| Surface | RDY (curvature radius) | THI (thickness) | Glass (refractive index) |
|---|---|---|---|
| OBJ | INFINITY | 137 | |
| STO | INFINITY | 0.0 | |
| S2 | 1.85765 | 1.85 | 500000.600000 (1.497) |
| | K: −0.677487 | | |
| | A: 0.273561E−02 B: 0.386515E−03; C: 0.536182E−04; D: 0.306790E−05 | | |
| S3 | −6.68963 | 1.801922 | |
| | K: −10.002091 | | |
| | A: 0.138585E−01; B: −.255540E−02; C: 0.277769E−03; D: −.140136E−04 | | |
| S4 | INFINITY | 0.6 | PC (1.579) |
| IMG | INFINITY | 0.0 | |
| EPD: (mm) | | | 4.095 |
| WL: (nm) | | | 660 |

TABLE 8C

| surface | RDY (curvature radius) | THI (thickness) | glass (refractive index) |
|---|---|---|---|
| OBJ | INFINITY | 45.0 | |
| STO | INFINITY | 0.0 | |
| S2 | 1.85765 | 1.85 | 500000.600000 (1.494) |
| | K: −0.677487 | | |
| | A: 0.273561E−02 B: 0.386515E−03; C: 0.536182E−04; D: 0.306790E−05 | | |
| S3 | −6.68963 | 1.651193 | |
| | K: −10.002091 | | |
| | A: 0.138585E−01; B: −.255540E−02; C: 0.277769E−03; D: −.140136E−04 | | |

TABLE 8C-continued

| surface | RDY (curvature radius) | THI (thickness) | glass (refractive index) |
|---|---|---|---|
| S4 | INFINITY | 1.2 | PC (1.573) |
| IMG | INFINITY | 0.0 | |
| EPD: (mm) | | | 3.28 |
| WL: (nm) | | | 785 |

Figure 34:
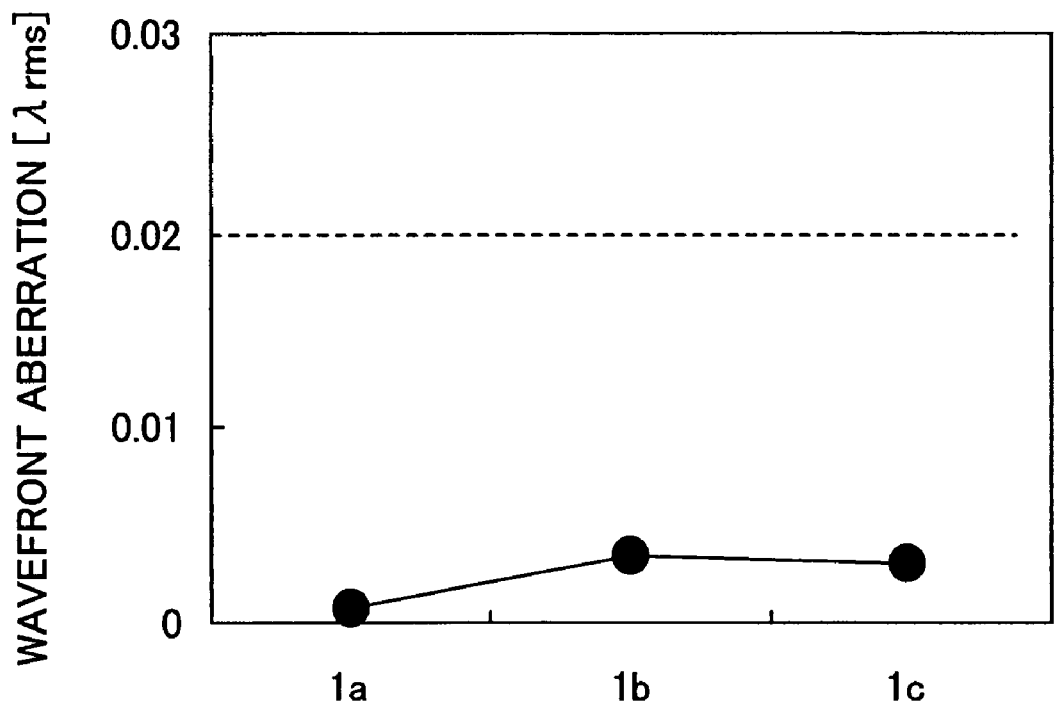
FIG. 34 is a characteristic diagram showing the wave-front aberration of the objective lens of the fourth embodiment.

FIG. 34 is a characteristic diagram showing the wavefront aberration caused when the objective lens 2A of the present invention is used with the blue recording medium 1a, DVD medium 1b and the CD medium with respective, predetermined wavelengths, wherein the horizontal axis represents the optical recording media 1a, 1b and 1c, while the vertical axis represents the wavefront aberration on the optical axis for the best image point.

It will be noted from FIG. 34 that there is achieved excellent wavefront aberration of 0.02 λrms for each of the optical recording media 1a, 1b and 1c.

Fifth Embodiment

Next, an objective lens 2B according to a fifth embodiment of the present invention will be explained with reference to FIGS. 35A-35C and FIG. 36, wherein the present embodiment uses the objective lens 2B with: the blue recording medium la having the substrate thickness of 0.6 mm and designed for use with the wavelength λ1 of 405 nm and the numerical aperture value NA of 0.70; the DVD medium having the substrate thickness of 0.6 mm and designed for use with the wavelength λ2 of 660 nm and the numerical aperture value NA of 0.65; and the CD medium having the substrate thickness of 1.2 mm and designed for use with the wavelength λ3 of 785 nm and the numerical aperture value NA of 0.50, for carrying out recording, playback and erasing to and from any of these three different optical recording media.

It should be noted that the objective lens 2B of the present embodiment has the focal distance f of 3.05 mm, the refractive index nd and the Abbe number vd of respectively 1.55 and 60 for the D-line, and the glass type of (550000.600000). Similarly to the fourth embodiment, the objective lens 2B of the present embodiment is used with the infinite optical system when used with the blue optical recording medium 1a, while it is used with a finite optical system in the case of using the objective lens 2B with the DVD or CD medium.

Figure 35A:
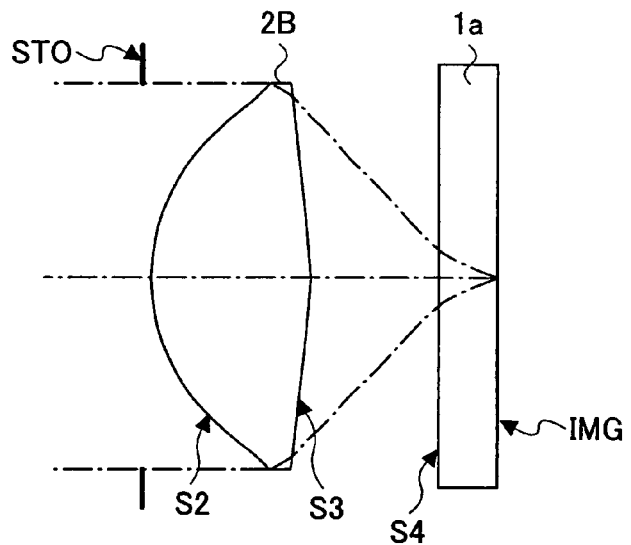
FIGS. 35A-35C are diagrams showing an objective lens according to a fifth embodiment of the present invention.
Figure 35B:
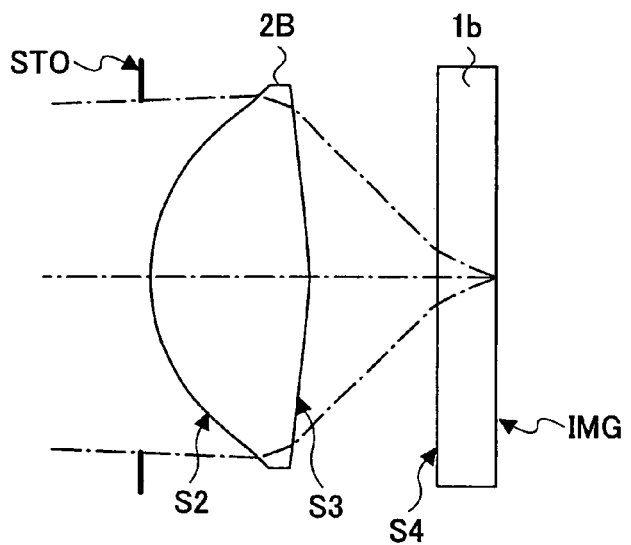
Figure 35C:
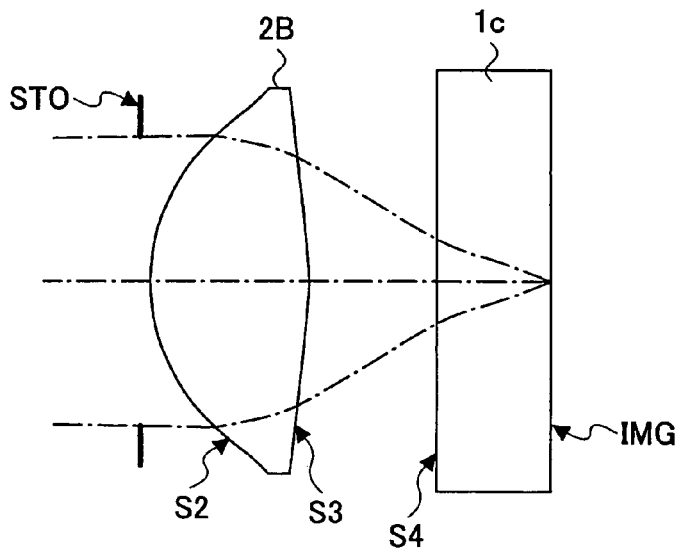

FIG. 35A and Table 9A show the construction for the case of using the objective lens 2B with the blue optical recording medium 1a, while FIG. 35B and Table 9B show the construction for the case of using the objective lens 2B with the DVD medium 1b. Further, FIG. 35C and Table 9C show the construction for the case of using the objective lens 2B with the CD medium 1c. Here, it should be noted that the non-spherical shape of the objective lens 2B and the items shown in Tables 9A-9C are identical with the case of the fourth embodiment explained before.

Further, it should be noted that the objective lens 2B of the present embodiment also satisfies the foregoing conditions of $$vd>35 \quad (2.1)$$

$$1.58>nd \quad (2.2)$$

$$0.58nd-0.29 \leq R1/f \leq 0.62nd-0.31. \quad (2.3)$$

TABLE 9A

| surface | RDY (curvature radius) | THI (thickness) | glass (refractive index) |
|---|---|---|---|
| OBJ | INFINITY | INFINITY | |
| STO | INFINITY | 0.0 | |
| S2 | 1.9547 | 1.85 | 550000.600000 (1.565) |
| | K: −0.679252 | | |
| | A: 0.311827E−02 B: 0.382688E−03; | | |
| | C: 0.272528E−04; D: 0.200561E−05 | | |
| S3 | −9.67786 | 1.662831 | |
| | K: −15.331354 | | |
| | A: 0.128339E−01; B: −.272936E−02; | | |
| | C: 0.365079E−03; D: −.233260E−04 | | |
| S4 | INFINITY | 0.6 | PC (1.621) |
| IMG | INFINITY | 0.0 | |
| EPD: (mm) | | | 4.271 |
| WL: (nm) | | | 405 |

TABLE 9B

| surface | RDY (curvature radius) | THI (thickness) | glass (refractive index) |
|---|---|---|---|
| OBJ | INFINITY | 153 | |
| STO | INFINITY | 0.0 | |
| S2 | 1.9547 | 1.85 | 550000.600000 (1.547) |
| | K: −0.679252 | | |
| | A: 0.311827E−02 B: 0.382688E−03; | | |
| | C: 0.272528E−04; D: 0.200561E−05 | | |
| S3 | −9.67786 | 1.781112 | |
| | K: −15.331354 | | |
| | A: 0.128339E−01; B: −.272936E−02; | | |
| | C: 0.365079E−03; D: −.233260E−04 | | |
| S4 | INFINITY | 0.6 | PC (1.5791) |
| IMG | INFINITY | 0.0 | |
| EPD: (mm) | | | 4.095 |
| WL: (nm) | | | 660 |

TABLE 9C

| surface | RDY (curvature radius) | THI (thickness) | glass (refractive index) |
|---|---|---|---|
| OBJ | INFINITY | 47 | |
| STO | INFINITY | 0.0 | |
| S2 | 1.9547 | 1.85 | 550000.600000 (1.544) |
| | K: −0.679252 | | |
| | A: 0.311827E−02 B: 0.382688E−03; | | |
| | C: 0.272528E−04; D: 0.200561E−05 | | |
| S3 | −9.67786 | 1.577408 | |
| | K: −15.331354 | | |
| | A: 0.128339E−01; B: −.272936E−02; | | |
| | C: 0.365079E−03; D: −.233260E−04 | | |
| S4 | INFINITY | 1.2 | PC (1.573) |
| IMG | INFINITY | 0.0 | |
| EPD: (mm) | | | 3.275 |
| WL: (nm) | | | 785 |

Figure 36:
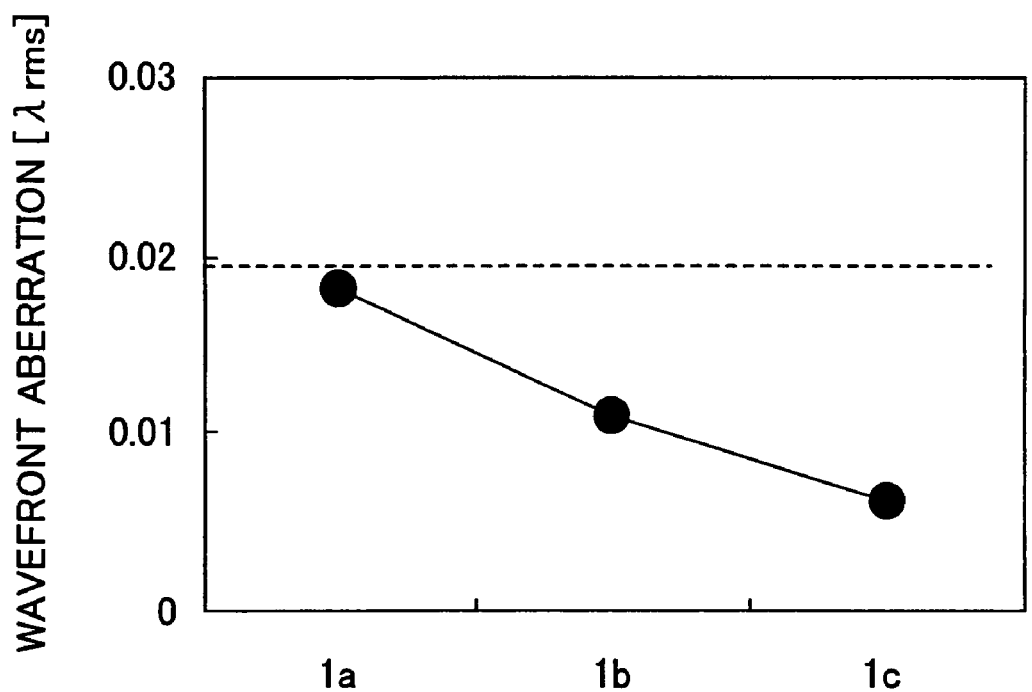
FIG. 36 is a characteristic diagram showing the wave-front aberration of the objective lens of the fifth embodiment.

FIG. 36 is a characteristic diagram showing the wavefront aberration caused when the objective lens 2B of the present invention is used with the blue recording medium 1a, DVD medium 1b and the CD medium with respective, predetermined wavelengths, wherein the horizontal axis represents the optical recording media 1a, 1b and 1c, while the vertical axis represents the wavefront aberration on the optical axis for the best image point.

It will be noted from FIG. 34 that there is achieved excellent wavefront aberration of 0.02 λrms for each of the optical recording media 1a, 1b and 1c.

Sixth Embodiment

Next, an objective lens 2C according to a sixth embodiment of the present invention will be explained with reference to FIGS. 37A-37C and FIG. 38, wherein the present embodiment uses the objective lens 2C with: the blue recording medium 1a having the substrate thickness of 0.6 mm and designed for use with the wavelength λ1 of 405 nm and the numerical aperture value NA of 0.70; the DVD medium having the substrate thickness of 0.6 mm and designed for use with the wavelength λ2 of 660 nm and the numerical aperture value NA of 0.65; and the CD medium having the substrate thickness of 1.2 mm and designed for use with the wavelength λ3 of 785 nm and the numerical aperture value NA of 0.50, for carrying out recording, playback and erasing to and from any of these three different optical recording media.

It should be noted that the objective lens 2C of the present embodiment has the focal distance f of 3.05 mm, the refractive index nd and the Abbe number vd of respectively 1.55 and 55 for the D-line, and the glass type of (550000.600000). Similarly to the fourth embodiment, the objective lens 2B of the present embodiment is used with the infinite optical system when used with the blue optical recording medium 1a, while it is used with a finite optical system in the case of using the objective lens 2B with the DVD or CD medium.

Figure 37A:
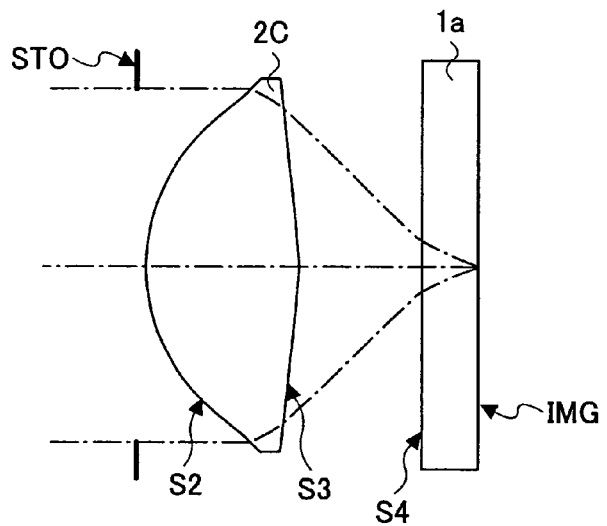
FIGS. 37A-37C are diagrams showing an objective lens according to a sixth embodiment of the present invention.
Figure 37B:
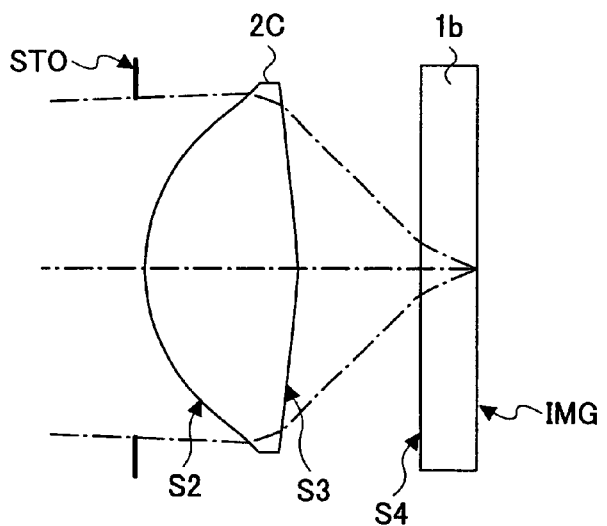
Figure 37C:
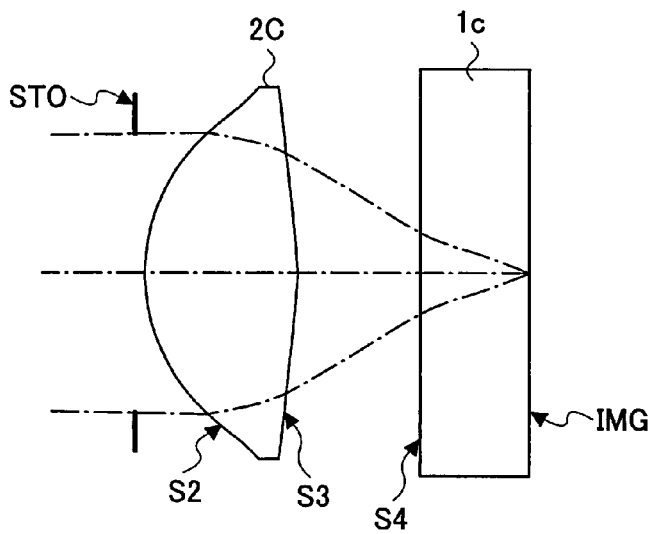

FIG. 37A and Table 10A show the construction for the case of using the objective lens 2C with the blue optical recording medium 1a, while FIG. 37B and Table 10B show the construction for the case of using the objective lens 2C with the DVD medium 1b. Further, FIG. 37C and Table 10C show the construction for the case of using the objective lens 2C with the CD medium 1c. Here, it should be noted that the non-spherical shape of the objective lens 2B and the items shown in Tables 10A-10C are identical with the case of the fourth embodiment explained before.

Further, it should be noted that the objective lens 2C of the present embodiment also satisfies the foregoing conditions of $$vd > 35 \quad (2.1)$$

$$1.58 > nd \quad (2.2)$$

$$0.58 nd - 0.29 \leq R1/f \leq 0.62 nd - 0.31. \quad (2.3)$$

TABLE 10A

| surface | RDY (curvature radius) | THI (thickness) | glass (refractive index) |
|---|---|---|---|
| OBJ | INFINITY | INFINITY | |
| STO | INFINITY | 0.0 | |
| S2 | 1.95795 | 1.85 | 550000.600000 (1.567) |
| | K: −0.677791 | | |
| | A: 0.313034E-02 B: 0.374056E-03; | | |
| | C: 0.278874E-04; D: 0.796110E-05 | | |
| S3 | −9.78389 | 1.627965 | |
| | K: −12.939440 | | |
| | A: 0.133065E-01; B: −.290188E-02; | | |
| | C: 0.395558E-03; D: −.254794E-04 | | |
| S4 | INFINITY | 0.6 | PC (1.621) |
| IMG | INFINITY | 0.0 | |
| EPD: (mm) | | 4.11 | |
| WL: (nm) | | 405 | |

TABLE 10B

| surface | RDY (curvature radius) | THI (thickness) | glass (refractive index) |
|---|---|---|---|
| OBJ | INFINITY | 142 | |
| STO | INFINITY | 0.0 | |
| S2 | 1.95795 | 1.85 | 550000.600000 (1.547) |
| | K: −0.677791 | | |
| | A: 0.313034E-02 B: 0.374056E-03; | | |
| | C: 0.278874E-04; D: 0.796110E-05 | | |
| S3 | −9.78389 | 1.795218 | |
| | K: −12.939440 | | |
| | A: 0.133065E-01; B: −.290188E-02; | | |
| | C: 0.395558E-03; D: −.254794E-04 | | |
| S4 | INFINITY | 0.6 | PC (1.5791) |
| IMG | INFINITY | 0.0 | |
| EPD: (mm) | | 4.11 | |
| WL: (nm) | | 660 | |

TABLE 10C

| surface | RDY (curvature radius) | THI (thickness) | glass (refractive index) |
|---|---|---|---|
| OBJ | INFINITY | 48 | |
| STO | INFINITY | 0.0 | |
| S2 | 1.95795 | 1.85 | 550000.600000 (1.543) |
| | K: −0.677791 | | |
| | A: 0.313034E-02 B: 0.374056E-03; | | |
| | C: 0.278874E-04; D: 0.796110E-05 | | |
| S3 | −9.78389 | 1.584558 | |
| | K: −12.939440 | | |
| | A: 0.133065E-01; B: −.290188E-02; | | |
| | C: 0.395558E-03; D: −.254794E-04 | | |
| S4 | INFINITY | 1.2 | PC (1.573) |
| IMG | INFINITY | 0.0 | |
| EPD: (mm) | | 3.285 | |
| WL: (nm) | | 785 | |

Figure 38:
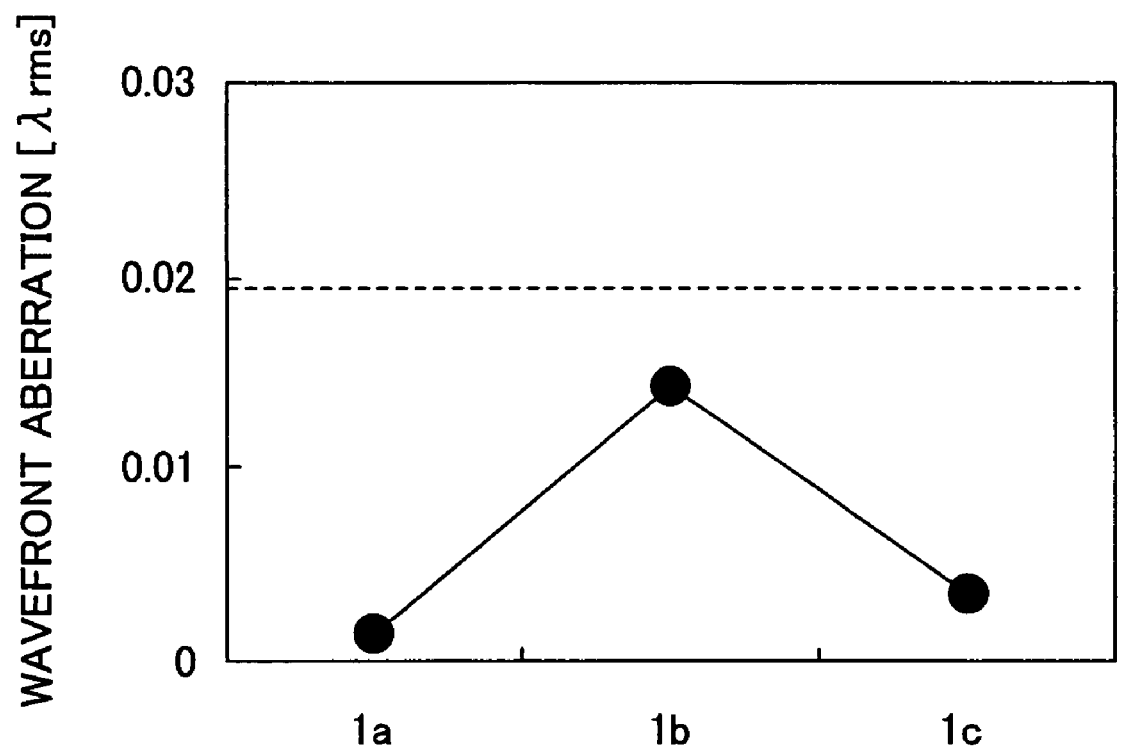
FIG. 38 is a characteristic diagram showing the wave-front aberration of the objective lens of the sixth embodiment.

FIG. 38 is a characteristic diagram showing the wavefront aberration caused when the objective lens 2C of the present invention is used with the blue recording medium 1a, DVD medium 1b and the CD medium with respective, predetermined wavelengths, wherein the horizontal axis represents the optical recording media 1a, 1b and 1c, while the vertical axis represents the wavefront aberration on the optical axis for the best image point.

It will be noted from FIG. 38 that there is achieved excellent wavefront aberration of 0.02 λrms for each of the optical recording media 1a, 1b and 1c.

Seventh Embodiment

Next, the application of an optical pickup 11 to the NA0.65 blue/DVD/CD technologies will be described as a seventh embodiment of the present invention.

First, the overall construction of the optical system that uses the optical pickup 11 of the present embodiment will be described with reference to FIG. 39.

It should be noted that the optical pickup 11 of the present embodiment is an optical pickup having an optical source 12 of the wavelength λ1 of 405 nm for the blue wavelength band, an optical source 13 of the wavelength λ2 of 660 nm for the red wavelength band, and an optical source 14 of the wavelength λ3 of 785 nm for the infrared wavelength band, wherein the optical pickup 11 is capable of carrying out recording, playback and erasing to and from any of: the blue optical recording medium 1a having the substrate thickness of 0.6 mm at the side irradiated with the optical beam and designed for use with the numerical aperture value NA of 0.65; the DVD medium having the substrate thickness of 0.6 mm at the side irradiated with the optical beam and designed for use with the numerical aperture value NA of 0.65; and the CD medium having the substrate thickness of 1.2 mm at the side irradiated with the optical beam and designed for use with the numerical aperture value NA of 0.50.

It should be noted that the optical pickup 11 of the present embodiment comprises: a blue optical system 26 for the blue wavelength band including a laser (optical source) 12 of the blue wavelength band, a collimator lens 15, a polarization beam splitter 16, dichroic prisms 17 and 18, a deflection prism 19, a quarter wavelength plate 20, an aperture 21, an aperture switching means 22, an objective lens 2 (the lens 2A in the present embodiment), a detection lens 23, a beam splitter 24 and a photodetector 25; a red optical system 29 for DVD including a hologram unit 27, a coupling lens 28, the dichroic mirrors 17 and 18, the deflection prism 19, the quarter-wavelength plate 20, the aperture 21, the aperture switching means 22 and the objective lens 2A; and an infrared optical system 32 for CD including a hologram unit 30, a coupling lens, the dichroic prism 18, the deflection prism 19, the quarter-wavelength plate 20, the aperture 21, the aperture switching means 22 and the objective lens 32. Thus, the dichroic prisms 17 and 18, the deflection prism 19, the quarter-wavelength plate 20, the aperture 20, the aperture switching means 22 and the objective lens 2A are used commonly between the two or three optical systems.

In the hologram unit 27, it should be noted that the chip of the laser diode 13, hologram 33 and the photodetection device 34 are integrated. Further, the hologram unit 30 integrates the chip of the laser diode 14, the hologram 35 an the photodetection device 36.

Further, as noted before, the optical recording medium 1a is a blue optical recording medium having a substrate thickness of 0.6 mm, the optical recording medium 1b is a DVD medium having a substrate thickness of 0.6 mm, while the optical recording medium 1c is a CD optical recording medium having the substrate thickness of 1.2 mm. Any one of these optical recording media 1a, 1b or 1c is mounted on a rotating mechanism not illustrated and rotated at high speed at the time of recording, playback or erasing.

Here, it should be noted that the aperture 21 can be formed on a bobbin that holds the objective lens 2 on the actuator that moves the objective lens 2 in the focusing direction or tracking direction, and it is not necessary to provide a separate optical component for this purpose.

Hereinafter, operation of the optical system will be explained for each of the wavelength bands.

First, explanation will be made for the case of carrying out recording, playback or erasing of information to and from the optical recording medium 1a having the substrate thickness of 0.6 mm at the side where the optical irradiation is made while using optical source 12 that produces the blue wavelength $\lambda 1$ of 405 nm together with the numerical aperture value NA of 0.65.

The divergent optical beam of the 405 nm wavelength emitted from the laser diode 12 with linear polarization is converted to a generally parallel beam by the collimator lens 15 and is deflected by the deflection prism 19 by the angle of 90 degrees after passing through the polarization bam splitter 16 and the dichroic prisms 17 and 18.

The optical beam is then converted to a circular polarization beam upon passage through the quarter wavelength plate 20 and is passed through the aperture 21. Thereby, the numerical aperture is restricted to the numerical aperture value NA of 0.65 by the aperture switching means 22 and is incident to the objective lens 2A. Thereby, the objective lens 2A focuses the optical beam on the optical recording medium 1a in the form of a minute spot. With this spot, playback, recording or erasing of information is performed.

The optical beam thus focused on the optical recording medium 1a is reflected by the optical recording medium 1a, and there is formed a reflection optical beam of generally parallel beam having a circular polarization of opposite rotating direction, and the reflection optical beam thus formed is converted to a linear polarization beam having a polarization plane perpendicularly to the polarization plane incident to the optical recording medium upon passage through the quarter wavelength plate 20 in the reverse direction.

The linear polarized reflection optical beam thus formed is then passed through the deflection prism 19 and the dichroic prisms 18 and 17 consecutively and is reflected to the detection lens 23 by the polarization beam splitter 16. Thereby, the reflected optical beam is divided into plural optical paths by the beam splitter 24, and detection of information and servo signal is achieved by the photodetector 25.

Next, recording, playback or erasing of information to and from the DVD optical recording medium 1b having the thickness of 0.6 mm at the side where the optical irradiation is made by using the red optical beam of the 660 nm wavelength from the optical source 13 with the numerical aperture value NA of 0.65 will be explained.

The optical beam of the 660 nm wavelength emitted from the laser diode chip 13 in the hologram unit is passed through the hologram 33 and is converted to a predetermined divergent beam by the coupling lens 28.

Thereafter, the optical beam is reflected toward the polarization prism 19 by the dichroic prism 17 that passes through the blue wavelength beam but reflects the red optical beam selectively, wherein the optical beam is deflected by the deflection prism 19 by 90 degrees after passing through the dichroic prism 14. Thereafter, the optical beam is converted to a circular polarization beam upon passage through the quarter wavelength plate 20, and the numerical aperture value NA is restricted to 0.65 at the aperture 21. The optical beam is then incident to the objective lens 2A and is focused upon the optical recording medium 1b in the form of minute spot. Playback, recording or erasing of information is achieved by using this optical spot.

Further, the optical beam reflected by the optical recording medium 1b is deflected by the deflection prism and is reflected by the dichroic prism 17 after passing through the dichroic prism 18. The optical beam is then converted to a converging beam by the coupling lens 28 and is diffracted by the hologram 22 toward the photodetection device 34 provided in the same can in which the laser diode 13 is provided. Thereby, the photodetection device 34 detects the information signal and the servo signal.

Next, recording, playback or erasing of information to and from the CD optical recording medium 1c having the thickness of 1.2 mm at the side where the optical irradiation is made by using the red optical beam of the 785 nm wavelength from the optical source 14 with the numerical aperture value NA of 0.50 will be explained.

The optical beam of the 785 nm wavelength emitted from the laser diode chip 14 in the hologram unit is passed through the hologram 35 and is converted to a predetermined divergent beam by the coupling lens 31.

Thereafter, the optical beam is reflected toward the polarization prism 19 by the dichroic prism 18 that passes through the blue wavelength beam but reflects the infrared optical beam selectively, wherein the optical beam is deflected by the deflection prism 19 by 90 degrees after passing through the dichroic prism 18. Thereafter, the optical beam is converted to a circular polarization beam upon passage through the quarter wavelength plate 20, and the numerical aperture value NA is restricted to 0.65 at the aperture 21. The optical beam is then incident to the objective lens 2A and is focused upon the optical recording medium 1c in the form of minute spot. Playback, recording or erasing of information is achieved by using this optical spot.

Further, the optical beam reflected by the optical recording medium 1b is deflected by the deflection prism and is reflected by the dichroic prism 17 after passing through the dichroic prism 18. The optical beam is then converted to a converging beam by the coupling lens 28 and is diffracted by the hologram 22 toward the photodetection device 34 provided in the same can in which the laser diode 13 is provided. Thereby, the photodetection device 34 detects the information signal and the servo signal.

Further, the optical beam reflected by the optical recording medium 1c is deflected by the deflection prism and is reflected by the dichroic prism 18. The optical beam is then converted to a converging beam by the coupling lens 31 and is diffracted by the hologram 35 toward the photodetection device 36 provided in the same can in which the laser diode 14 is provided. Thereby, the photodetection device 36 detects the information signal and the servo signal.

Hereinafter, the aperture switching part in the vicinity of the objective lens 2A will be explained.

First, the beam diameter of the incident optical beam for the case of DVD will be explained.

When a red optical beam is incident to an objective lens optimized to provide an optimum wavefront in the blue wavelength band with the same beam diameter, the refraction power of the lens is decreased and there occurs decrease of the numerical aperture value NA.

In view of this, the present embodiment uses a beam diameter $\phi2$ in the red wavelength band larger than the beam diameter $\phi1$ used in the blue wavelength band.

Figure 40:
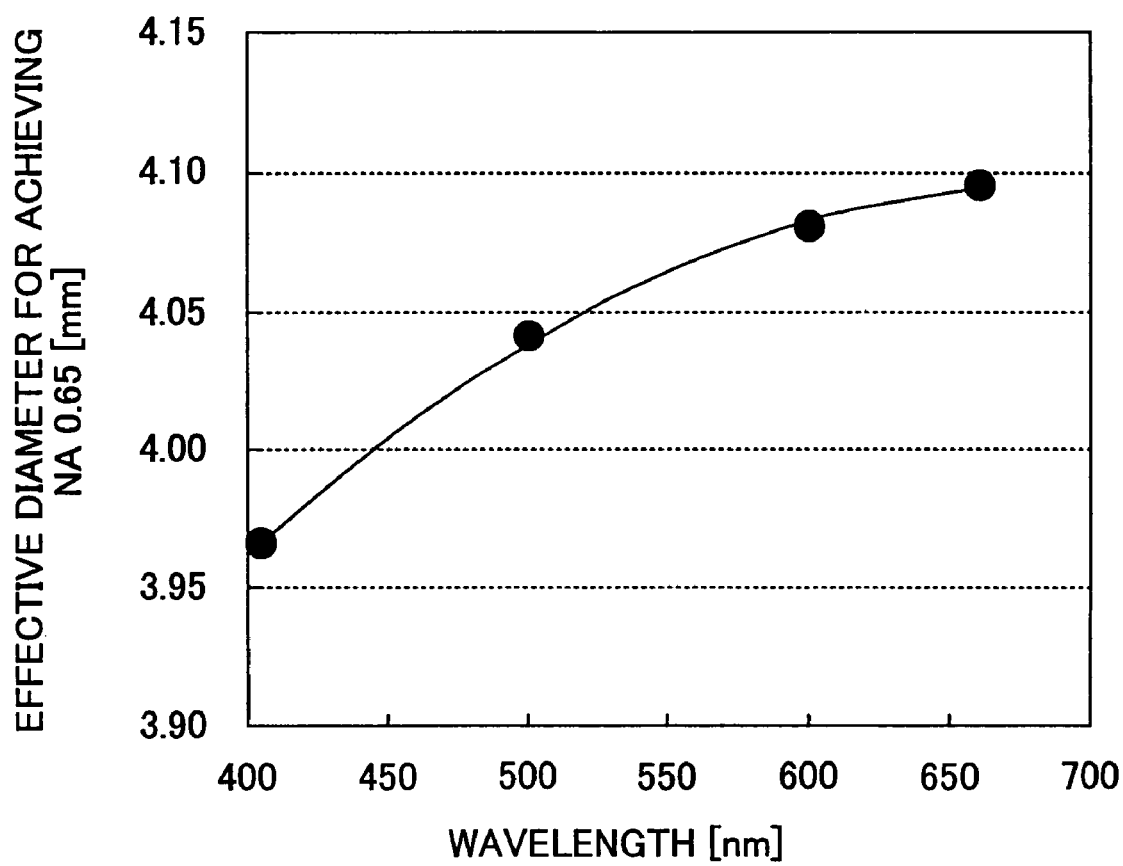
FIG. 40 is a diagram showing the relationship between the wavelength and the effective diameter for achieving the numerical aperture of 0.65.

FIG. 40 shows the relationship between the wavelength and the effective diameter for the case of obtaining the numerical aperture value NA of 0.65 in the objective lens having the following characteristics in the blue wavelength band $\phi$: 3.965 mm
NA: 0.65
F: 3.05 mm
glass type : 500000.600000, for the case a different wavelength is used.

From FIG. 40, it can be seen that it is necessary to set the beam diameter $\phi2$ to about 4.095 mm in the case of carrying out recording, playback or erasing of information for the DVD recording medium 1b by using the wavelength of 660 nm. Further, the wavefront aberration is optimized in the case of using the wavelength other than 405 nm by changing the object distance.

Next, explanation will be made on the incident optical beam diameter used for the case of CD.

In the case of carrying out recording, playback or erasing to or from the CD optical recording medium 1c, the optimum aperture number NA is about 0.5. On the other hand, the optimum effective beam diameter $\phi3$ for such a case of CD is estimated to be about 3.28 mm by the similar process explained with reference to FIG. 40.

Figure 41C:
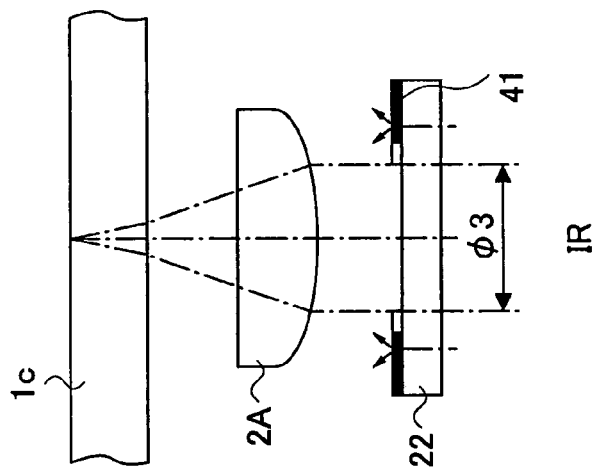
FIGS. 41A-41C are diagrams showing the construction of switching the aperture of the optical pickup according to the seventh embodiment.

Thus, it is necessary to carry out three-step switching for the aperture for achieving the beam diameter of any of $\phi1$, $\phi2$ or $\phi3$ for the optical beam incident to the objective lens 2A. In the present embodiment, the incident optical beam diameter $\phi2$ is restricted by the aperture 21 provided to the actuator part, and a wavelength selective diffraction element formed with a wavelength-selective diffraction pattern is used as the aperture switching element 22 that switches the optical beam diameters $\phi1$ and $\phi3$ in response to the wavelength of the optical beam emitted from the optical source as shown in FIGS. 41A-41C.

The aperture switching means 22 has a central region having a diameter $\phi3$ where there is provided no wavelength-selective diffraction element while this central region is surrounded by a wavelength-selective diffraction element 41. Reference should be made to FIGS. 41A-41C.

Figure 41B:
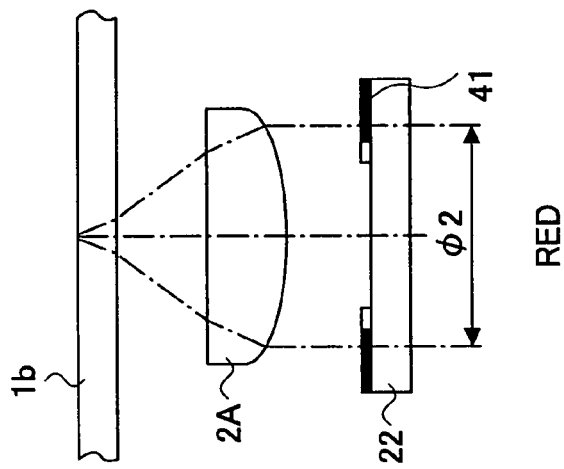
Figure 41A:
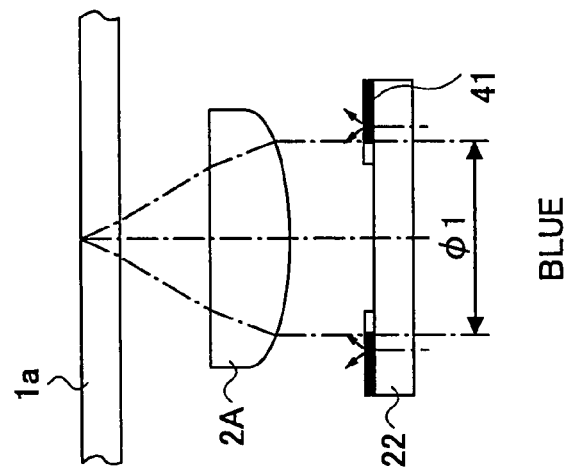

Thus, the optical beam of any of the blue wavelength and the red wavelength having the beam diameter $\phi1$ or $\phi2$ can pass through the aperture switching element 22 freely as shown in FIGS. 41A and 41B, while the infrared optical beam is reflected back by the wavelength-selective diffraction element 41 surrounding the central region, and the beam size of the infrared optical beam is restricted to the beam diameter of $\phi3$.

Of course, the aperture switching means 22 is not limited to the one having the wavelength-selective diffraction element 41 but may be a device having a wavelength-selective transmission/reflection coating.

Eight Embodiment

Next, the application of an optical pickup 11 to the NA0.70blue/DVD/CD technologies will be described as an eighth embodiment of the present invention.

It should be noted that the optical pickup of the present embodiment is an optical pickup having an optical source 12 of the wavelength $\lambda1$ of 405 nm for the blue wavelength band, an optical source 13 of the wavelength $\lambda2$ of 660 nm for the red wavelength band, and an optical source 14 of the wavelength $\lambda3$ of 785 nm for the infrared wavelength band, wherein the optical pickup is capable of carrying out recording, playback and erasing to and from any of: the blue optical recording medium 1a having the substrate thickness of 0.6 mm at the side irradiated with the optical beam and designed for use with the numerical aperture value NA of 0.70; the DVD medium having the substrate thickness of 0.6 mm at the side irradiated with the optical beam and designed for use with the numerical aperture value NA of 0.65; and the CD medium having the substrate thickness of 1.2 mm at the side irradiated with the optical beam and designed for use with the numerical aperture value NA of 0.50.

The difference of the present embodiment over the seventh embodiment is that the numerical aperture value of 0.70 is used for the blue optical system in place of the numerical aperture value of 0.65, and thus, the beam diameter of the blue optical beam is increased as compared with the case of the red optical beam used for DVD.

Figure 39:
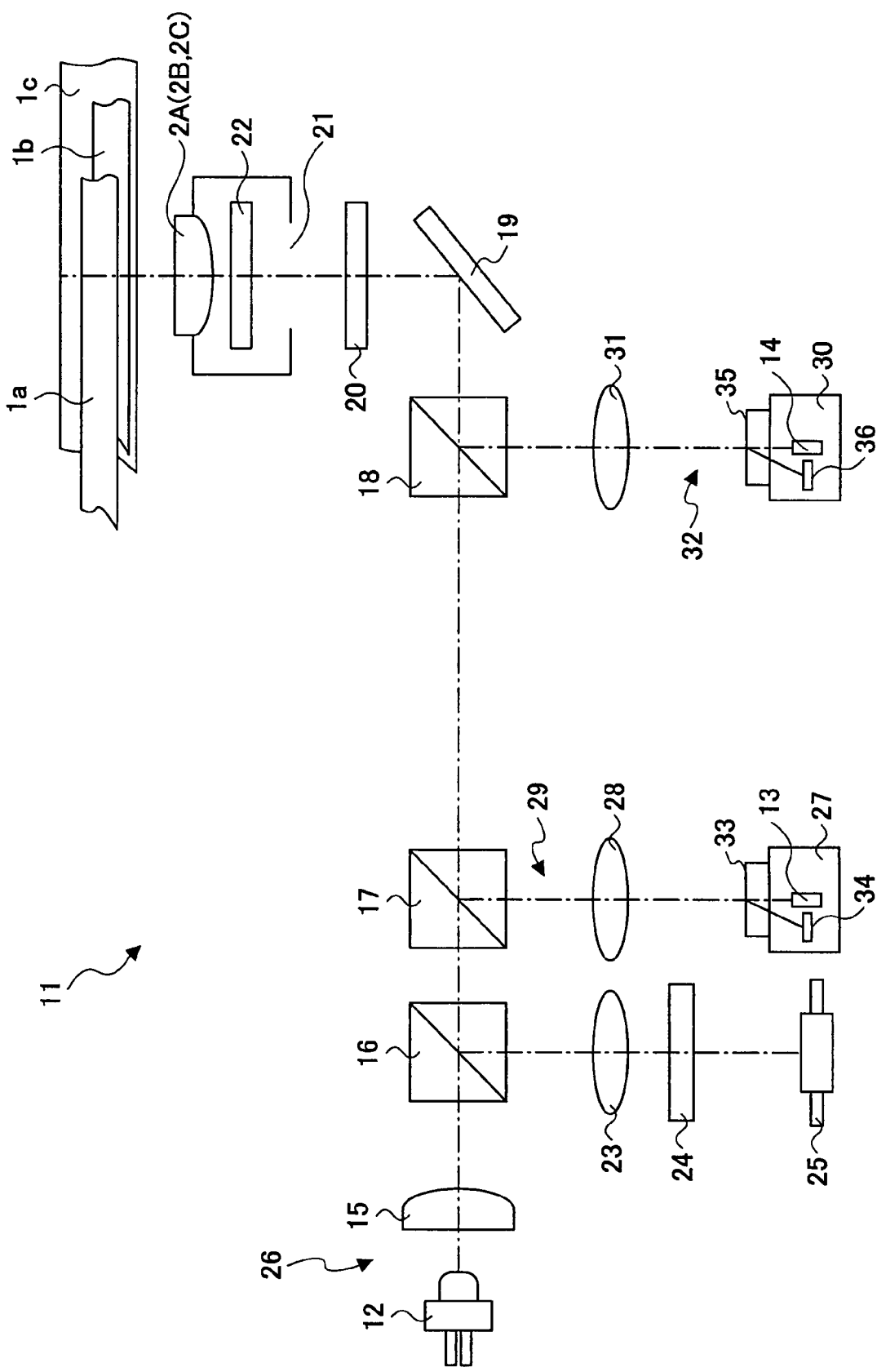
FIG. 39 is a diagram showing an optical system constructing an optical pickup according to a seventh embodiment of the present invention.

Thus, although the overall construction is identical to that of FIG. 39, the present embodiment uses the objective lens 1B in place of the objective lens 1A. It should be noted that, with the numerical aperture value NA of about 0.70, the degradation of tolerance caused by various variations is not significant and it is possible to increase the storage capacity of the optical recording medium. By using the numerical aperture value of 0.70, the storage capacity can be increased by about 15% as compared with the case of using the numerical aperture value of 0.65.

Figure 42A:
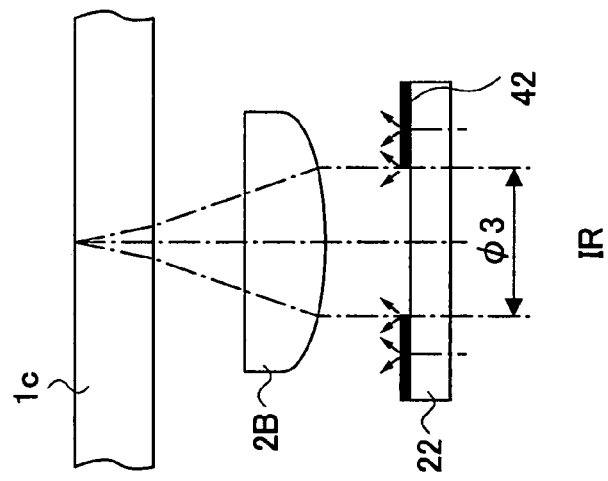
FIGS. 42A-42C are diagrams showing the construction of switching the aperture of the optical pickup according to an eighth embodiment.
Figure 42B:
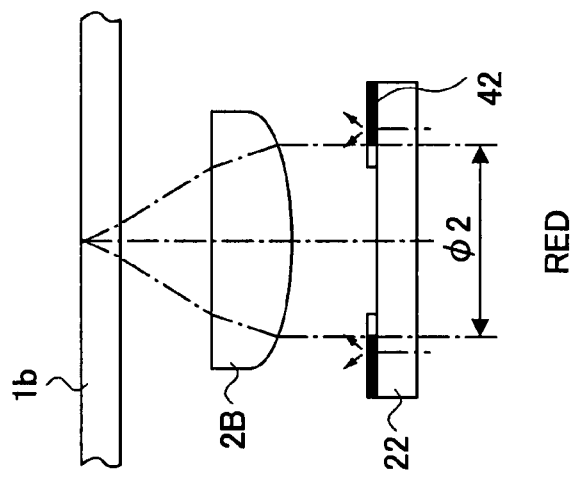
Figure 42C:
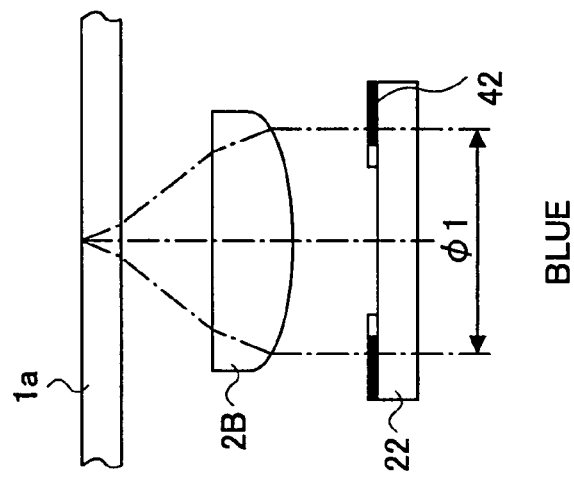

In the present embodiment, the incident optical beam diameter $\phi1$ is restricted by the aperture provided on the actuator part, while the aperture switching means 22 carries a wavelength-selective diffraction element 42 having a wavelength-selective diffraction pattern for changing the beam diameter of the optical beam emitted from the optical source between the beam diameter φ2 and the beam diameter φ3 as shown in FIGS. 42A-42C.

Referring to FIG. 42A, the blue optical beam having the beam diameter φ1 passes freely through the wavelength-switching means 22 in view of the fact that the wavelength-selective diffraction element 42 does not cause diffraction in the blue optical beam.

In the case of the red optical beam shown in FIG. 42B, on the other hand, the incident optical beam is reflected by the wavelength-selective diffraction element 42 in the part thereof outside the region having the diameter φ2, and the beam diameter of the red optical beam is restricted to the diameter of φ2.

In the case of the infrared optical beam showing in FIG. 42C, the incident optical beam is reflected by the wavelength-selective diffraction element 42 in the part hereof outside the region having the diameter φ3, and the beam diameter of the infrared optical beam is restricted to the diameter of φ3.

Ninth Embodiment

Next, the application of an optical pickup 11 to the NA0.67blue/DVD/CD technologies will be described as an eighth embodiment of the present invention.

It should be noted that the optical pickup of the present embodiment is an optical pickup having an optical source 12 of the wavelength λ1 of 405 nm for the blue wavelength band, an optical source 13 of the wavelength λ2 of 660 nm for the red wavelength band, and an optical source 14 of the wavelength λ3 of 785 nm for the infrared wavelength band, wherein the optical pickup is capable of carrying out recording, playback and erasing to and from any of: the blue optical recording medium 1a having the substrate thickness of 0.6 mm at the side irradiated with the optical beam and designed for use with the numerical aperture value NA of 0.67; the DVD medium having the substrate thickness of 0.6 mm at the side irradiated with the optical beam and designed for use with the numerical aperture value NA of 0.65; and the CD medium having the substrate thickness of 1.2 mm at the side irradiated with the optical beam and designed for use with the numerical aperture value NA of 0.50.

The difference of the present embodiment over the seventh embodiment is that the numerical aperture value of 0.67 is used for the blue optical system in place of the numerical aperture value of 0.65, and thus, the beam diameter of the blue optical beam is increased as compared with the case of the red optical beam used for DVD.

Thus, although the overall construction is identical to that of FIG. 39, the present embodiment uses the objective lens 1C in place of the objective lens 1A.

When a red optical beam is incident to an objective lens optimized to provide an optimum wavefront in the blue wavelength band with the same beam diameter, the refraction power of the lens is decreased and there occurs decrease of the numerical aperture value NA. This means that there occurs increase of the numerical aperture value NA when the optical beam of the blue wavelength is used as compared with the case the optical beam of the red wavelength band is used, and a large capacity optical pickup is realized together with the effect of reduction of the wavelength. On the other hand, the numerical aperture value NA for the DVD generation is determined to be about 0.65.

Figure 43:
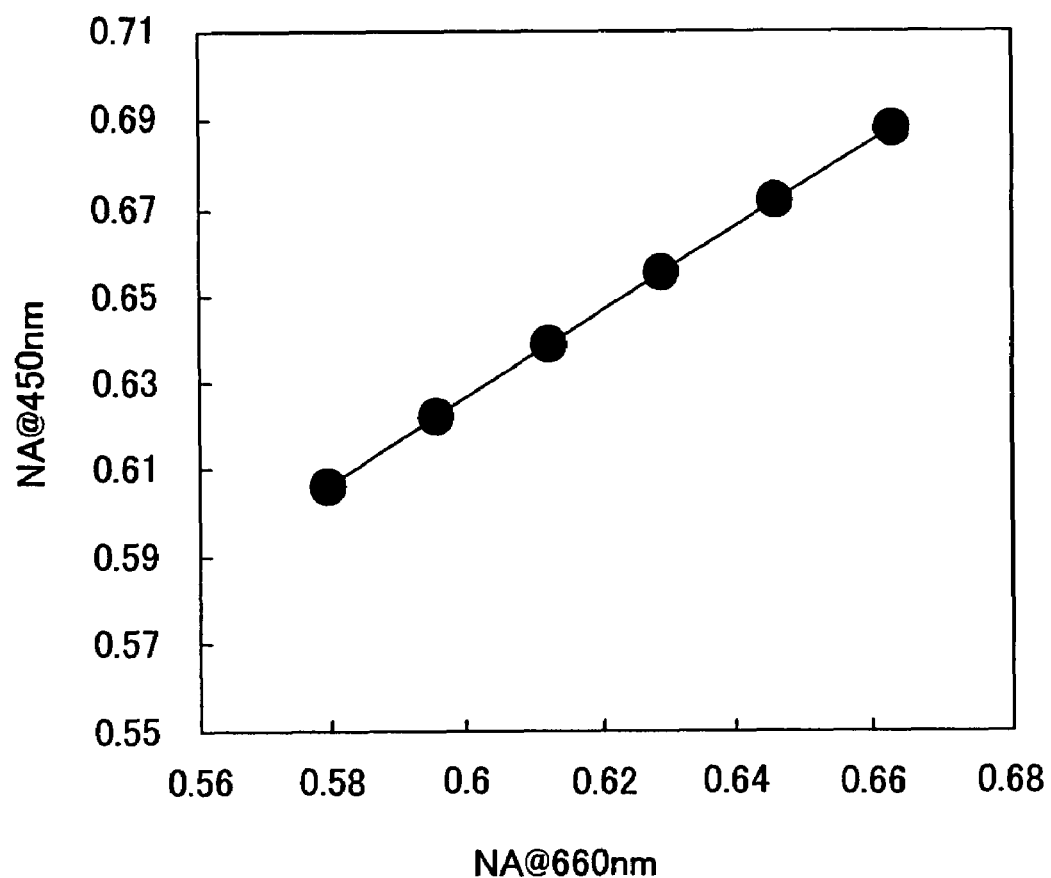
FIG. 43 is a diagram showing the relationship between the numerical aperture value for the blue wavelength band and the numerical aperture value for the red wavelength band.

FIG. 43 shows the relationship between the numerical aperture values NA for the case a blue optical beam having the 405 nm wavelength and a red optical beam of the 660 nm wavelength are incident to the objective lens having the following characteristics:

focal distance F at the blue wavelength: 3.05 mm glass type: 550000.550000, optical recording medium substrate thickness: 0.6 mm.

From FIG. 43, it can be seen that, in the case the numerical aperture value NA of 0.65 is achieved for the red optical beam for DVD, the numerical aperture value NA of about 0.67 can be achieved for the optical beam of the blue wavelength and having the same beam diameter.

Thus, by using such a relationship, it is possible to use the two-step aperture switching similar to the one used for the compatibility between the DVD generation and the CD generation, not the three-step aperture switching as in the case of the fourth or fifth embodiment of the present invention. Thereby simplification of the device is achieved.

Figure 44C:
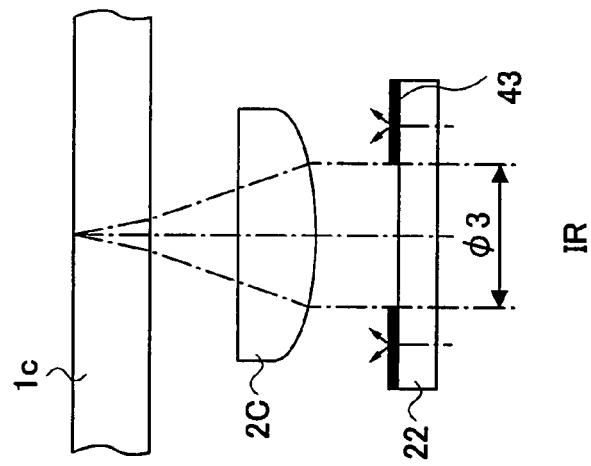
FIGS. 44A-44C are diagrams showing the schematic construction of numerical aperture switching of an optical pickup according to a ninth embodiment of the present invention.
Figure 44B:
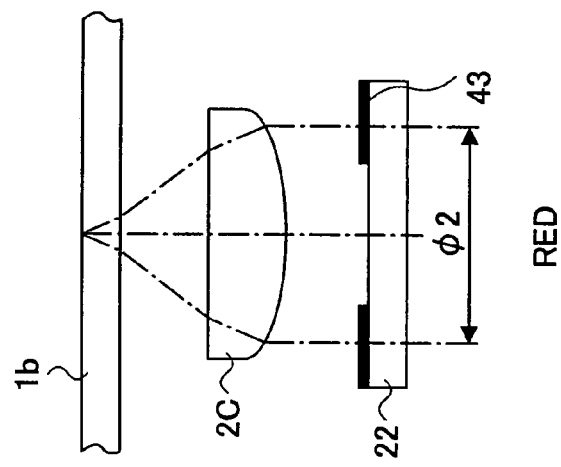
Figure 44A:
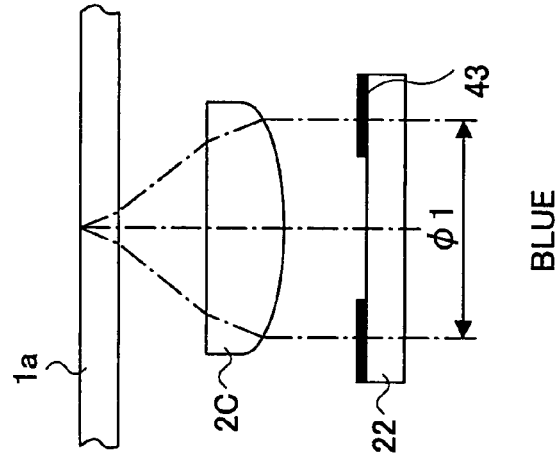

For the aperture switching means 22 of the present embodiment, it is possible to use a wavelength-selective diffraction element 43 including a wavelength-selective diffraction pattern for the switching of the optical beam diameter as shown in FIGS. 44A-44C in response to the wavelength of the optical beam emitted from the optical source.

Referring to FIGS. 44A and 44B, the blue optical beam having the diameter φ1 or the red optical beam having the diameter φ2 can pass freely through the aperture switching element 22 while the infrared optical beam is reflected by the wavelength-selective diffraction element 43 at the region outside the central part having the diameter φ3, and thus, the diameter of the infrared optical is restricted to the foregoing diameter φ3.

Figure 45:
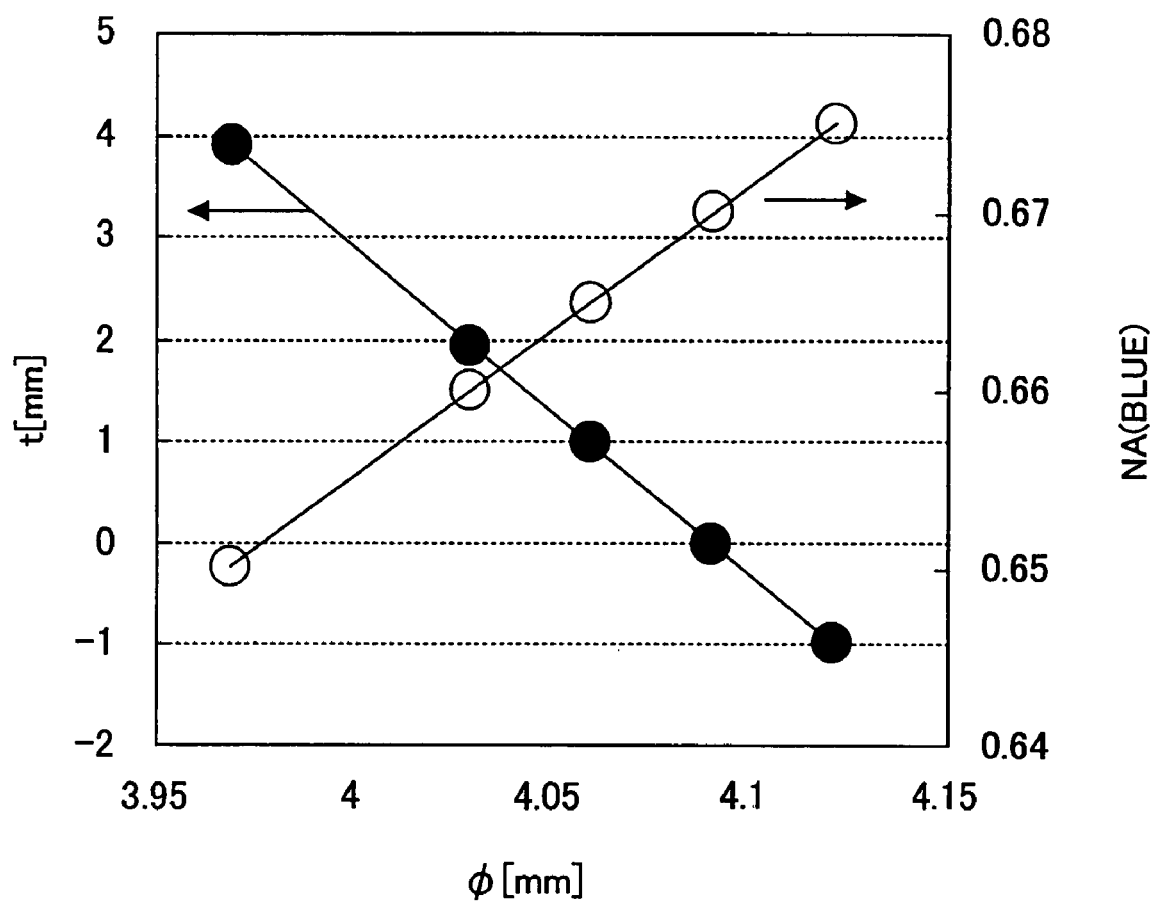
FIG. 45 is a characteristic diagram showing the relationship between the diameter of the optical beam incident to an objective lens and the distance of the aperture from the objective lens.

FIG. 45 shows the relationship between the incident beam diameter for the case the red optical beam of the 660 nm wavelength is passed through the objective lens 2C of the present embodiment. (X-axis) and the distance between the aperture switching means 22 and the front-side principal point of the objective lens 2C (first Y-axis at the left) for the case of achieving the numerical aperture value NA of 0.65 with regard to the incident optical beam radius. Further, the second Y axis at the right of FIG. 45 shows the numerical aperture value NA for the case the blue optical beam of the 405 nm wavelength is passed through the same lens as the function of the incident optical beam diameter.

In view of the use of the numerical aperture value NA of 0.67 for the case of using the blue optical recording medium 1a in the present embodiment, the optimum beam diameter φ for the incident optical beam and the optimum distance t between the aperture switching means 22 and the front side principal point of the objective lens 2C is given as φ=4.1 mm and t=0 mm.

Hereinafter, the relationship of FIG. 45 will be explained.

In the present embodiment, the optical pickup includes the first optical source 12 producing the first optical beam with the first wavelength λ1, the second optical source 13 producing the second optical beam with the second wavelength λ2, and the single objective lens 2C that focuses any of the first and second optical beams to the optical recording medium 1, wherein the first optical beam of the 405 nm wavelength is used with an infinite optical system upon activation of the first optical source 12 and the second optical beam of the 660 nm wavelength is used with the finite optical system upon activation of the second optical source 13, wherein the predetermined aperture is provided with an offset from the principal point at the front side (incident side) of the objective lens with the distance t in the direction toward the optical source given as $$t \approx L - NA1 \cdot f / \tan(a \sin(NA2obj))$$

where f represents the focal distance of the objective lens, NA1 represents the numerical aperture value at the side of the image surface at the time the optical source 12 of the wavelength λ1 (=405 nm) is turned on, NA2obj represents the numerical aperture value at the side of the optical source at the time the optical source 13 of the wavelength λ2 (=660 nm) is turned on, and the L represents the object distance at the time the optical source 13 of the wavelength λ2 (=660 nm) is turned on. As a result, switching of the aperture between the case of using the wavelength of 405 nm and the case of using the wavelength of 660 nm is not necessary.

Here, the foregoing relationship $$t \approx L - NA1 \cdot f / \tan(a \sin(NA2obj))$$

will be explained with reference to FIG. 46.

Figure 46:
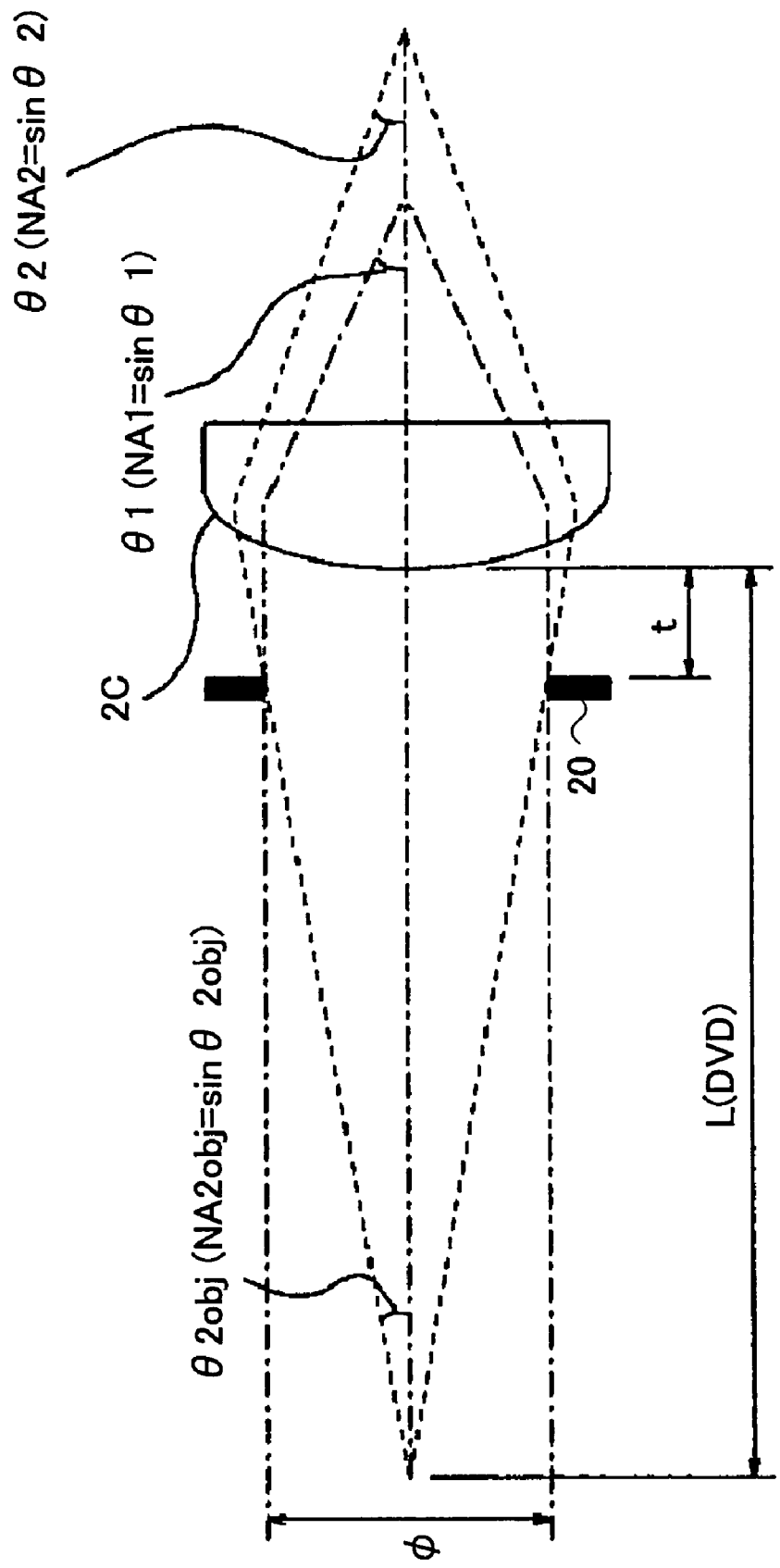
FIG. 46 is a diagram showing the principle of the calculation for calculating the aperture position.

Referring to FIG. 46, the optical path of the first optical beam of the first wavelength λ1 incident to the objective lens 1C via the infinite optical system and focused upon the optical recording medium with the numerical aperture value NA1 is represented by the one-dotted chain line.

Generally, it is known that there exists a relationship $$NA1 = 2/f$$

between the focal distance f of the objective lens 1C, the numerical aperture value NA1 and the incident beam diameter φ.

On the other hand, the optical path of the second optical beam of the second wavelength λ2 incident to the objective lens 1C via the finite optical system and focused upon the optical recording medium with the numerical aperture value NA2 is represented by the one-dotted chain line.

Thus, in the case the aperture is disposed at the location offset from the front side principal point of the objective lens such that the second optical beam of the wavelength λ2 is φ, the relationship $$\phi/2 = (L-t) \times \tan(a \sin(NA2obj))$$

is obtained. By substituting this to the equation for NA1, the foregoing equation for t is obtained.

Incidentally, the present embodiment uses the construction of λ1=405 nm, NA1=0.67 for the blue optical beam and the construction of λ2=660 nm, NA2=0.65, L=142 mm, NA2obj=0.015 for the red optical beam and φ=4.1 mm, t=0.0 mm.

Next, the example of using the object distance determined so as to minimize the wavefront aberration in the case of using the finite optical system for the DVD technology and the CD technology will be explained.

Figure 47:
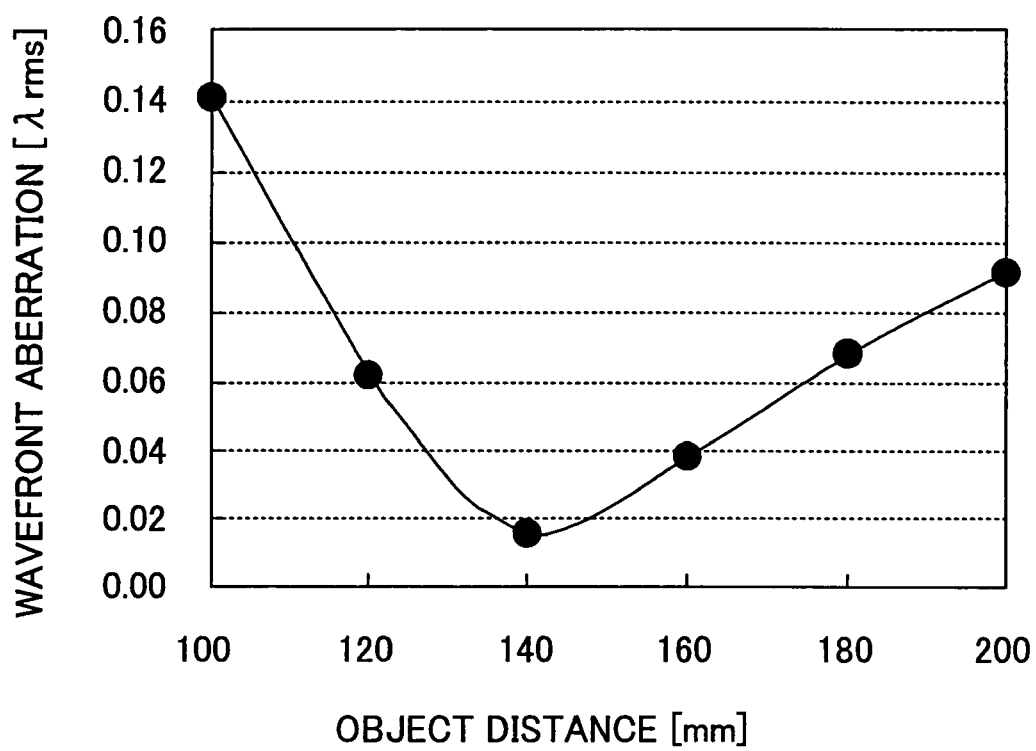
FIG. 47 is a characteristic diagram showing the relationship between the wavefront aberration and the object distance for the case of the objective lens of which wavelength is 660 nm.

For example, in the case of the sixth embodiment for the objective lens, the relationship between the object distance and the wavefront aberration is represented as shown in FIG. 47 when the optical beam of the 660 nm for the DVD is used. Thus, in this case the object distance of 142 mm is used so as to minimize the wavefront aberration.

For the aperture switching means 22, not only the one that uses diffraction but also the elements that use reflection or absorption or polarization may be used.

In the case of using reflection, a dielectric multilayer film having wavelength selectivity may be provided similarly to the case of the wavelength-selective diffraction element 43.

More specifically, it is possible to construct the aperture switching means 22 such that the central part where the dielectric multilayer film is not provided shows high transmissivity to any of the blue, red and infrared wavelength bands while the region outside the central region shows a high transmissivity only to the blue and red wavelength bands and shows low transmissivity to the infrared optical wavelength band.

Similarly, it is possible to change the beam diameter in the aperture switching means 22 in response to the wavelength thereof by using optical absorption.

Further, it is possible to use polarization in the aperture switching element 22 for changing the beam diameter in response to the wavelength. In this case, the red optical beam and the infrared optical beam are disposed such that the polarization directions intersect perpendicularly with each other. Thereby, the aperture is switched by switching the polarization direction between the mutually perpendicular polarization directions.

For the aperture switching means 22, it is also possible to provide a coating or diffraction grating on the surface of the objective lens 2 (2A, 2B, 2C), not in the form of a separate element as shown in FIGS. 41A-41C.

Figure 48A:
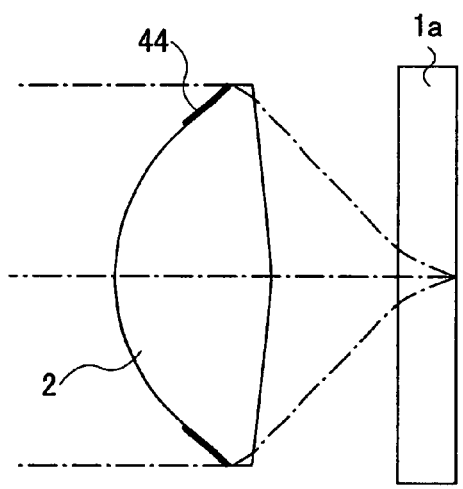
FIGS. 48A-48C are schematic diagram showing an example of the coating applied to an objective lens.
Figure 48B:
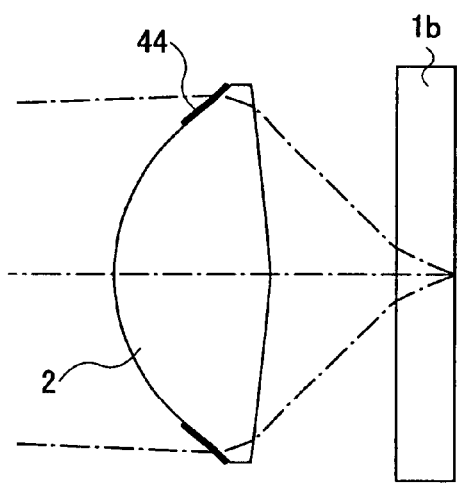
Figure 48C:
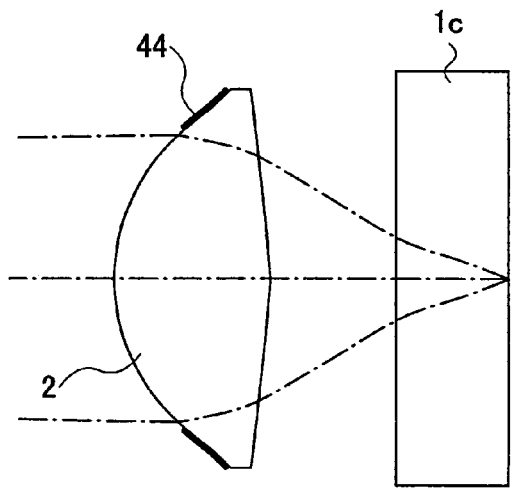

For example, FIGS. 48A-48C show the case of forming the transmission/reflection coating 44 having wavelength selectivity on the lens surface of the objective lens 2 at the side facing the optical source.

Thus, FIG. 48A shows the case the optical beam having the wavelength of 405 nm is irradiated upon the blue optical recording medium 1a, while FIG. 48B shows the case the optical beam having the wavelength of 660 nm is irradiated upon the DVD medium 1b and FIG. 18C shows the case the optical beam having the wavelength of 785 nm is irradiated upon the CD medium 1c.

Here, the coating 44 passes the optical radiation at the wavelength of 405 nm and 660 nm while it reflects the optical radiation at the wavelength of 785 nm selectively.

Tenth Embodiment

Next, the construction of an optical information processing apparatus according to a tenth embodiment of the present invention will be explained with reference to FIG. 49.

Figure 49:
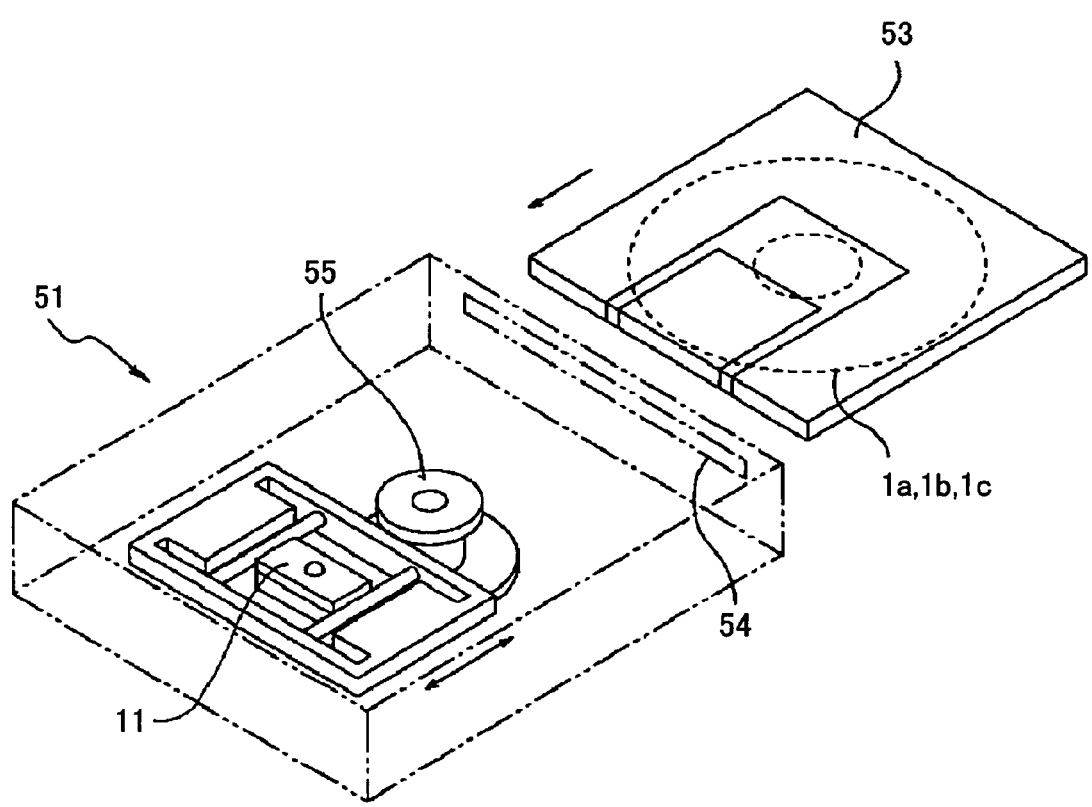
FIG. 49 is a schematic oblique view diagram showing an optical information processing apparatus according to a tenth embodiment of the present invention.

Referring to FIG. 49, the information processing apparatus 51 is an apparatus carrying out at least one of recording, playback and erasing of information to and from an optical recording medium by using an optical pickup 52 shown in FIG. 39.

In the present embodiment, it should be noted that the optical recording medium 1 is implemented in the form of a disk accommodated in a cartridge 53 or protective case. Thus, the optical recording medium 1 is loaded to the information recording apparatus 51 by inserting the disk 1 into an insertion opening 54 of the information recording apparatus 51 in the direction of an arrow together with the protective case 53. The disk 1 thus loaded is rotated by a spindle motor 55, and recording, playback or erasing of information is achieved by the optical pickup 52. Further, it should be noted that the optical recording medium 1 (1a, 1b or 1c) is not necessarily accommodated in the protective case but may be used in the bare state.

For the optical pickup 52, it is possible to use the optical pickup described in the foregoing embodiments, and the optical information processing apparatus 51 can achieve the three-generation compatibility between blue/DVD/CD technologies without using an aperture switching element (or two-generation compatibility between blue/DVD technology) by using the objective lens or optical pickup in which the spherical aberration is effectively suppressed.

Further, the present invention is by no means limited to the embodiments described heretofore, but various variations and modifications may be made without departing from the scope of the invention.

What is claimed is:

1. An objective lens focusing any of a first optical beam having a wavelength $\lambda 1$ and a first beam diameter $\phi 1$, a second optical beam having a wavelength $\lambda 2$ and a second beam diameter $\phi 2$ and a third optical beam having a wavelength $\lambda 3$ and a third beam diameter $\phi 3$ incident to an incident side of said objective lens to an optical recording medium provided at an exit side of said objective lens, where $\lambda 1 < \lambda 2 < \lambda 3$, said objective lens having a single-lens construction and defined by a non-spherical convex surface at said incident side and said exit side, wherein the objective lens satisfies a condition:

$$vd > 35 \qquad (1)$$

$$1.58 > nd \qquad (2)$$

$$0.58nd - 0.29 \leq R1/f \qquad (3)$$

where nd and vd represent respectively the refractive index and Abbe number for a D-line, R1 represents the paraxial radius of curvature and f represents the focal distance of the objective lens, said objective lens having a first effective numerical aperture value $NA(\lambda 1)$ for said first optical beam, a second effective numerical aperture value $NA(\lambda 2)$ for said second optical beam and a third effective numerical aperture value $NA(\lambda 3)$ for said third optical beam, wherein the first, second and third effective numerical aperture values $NA(\lambda 1)$, $NA(\lambda 2)$ and $NA(\lambda 3)$ satisfy a condition:

$$NA(\lambda 1) > NA(\lambda 2) > NA(\lambda 3) \qquad (4),$$

and wherein the first, second and third beam diameters $\phi 1$, $\phi 2$ and $\phi 3$ satisfy a condition:

$$\phi 1 = \phi 2 > \phi 3 \qquad (5).$$

2. The objective lens as claimed in claim 1, wherein said conditions (1), (2) and (3) are set for a substantially parallel optical beam when said optical beam is incident to said objective lens from an optical source of said wavelength $\lambda 1$, and wherein said conditions (1), (2) and (3) are set for a divergent optical beam when said divergent optical beam is incident to said objective lens from an optical source of any of said wavelength $\lambda 2$ and $\lambda 3$.

3. The objective lens as claimed in claim 1, wherein said conditions (1), (2) and (3) are set for the case said wavelength $\lambda 1$ is in a blue wavelength band, said wavelength $\lambda 2$ is in a red wavelength band and said wavelength $\lambda 3$ is in an infrared wavelength band.

\* \* \* \* \*